United States Patent
Ghoshal et al.

(10) Patent No.: US 11,853,705 B2
(45) Date of Patent: Dec. 26, 2023

(54) SMART CONTENT RECOMMENDATIONS FOR CONTENT AUTHORS

(71) Applicant: Oracle International Corporation, Redwood Shores, CA (US)

(72) Inventors: Sandip Ghoshal, Hyderabad (IN); Nalini Pattanayak, Hyderabad (IN); Vivek Peter, Hyderabad (IN); Hareesh Kadlabalu, Plainview, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 137 days.

(21) Appl. No.: 17/463,287

(22) Filed: Aug. 31, 2021

(65) Prior Publication Data

US 2021/0390108 A1  Dec. 16, 2021

Related U.S. Application Data

(63) Continuation of application No. 16/581,138, filed on Sep. 24, 2019, now Pat. No. 11,163,777.

(30) Foreign Application Priority Data

Oct. 18, 2018 (IN) .............................. 201841039495

(51) Int. Cl.
*G06F 3/048* (2013.01)
*G06F 40/30* (2020.01)
(Continued)

(52) U.S. Cl.
CPC ............ *G06F 40/30* (2020.01); *G06F 3/0482* (2013.01); *G06F 3/0484* (2013.01);
(Continued)

(58) Field of Classification Search
CPC ............ G06F 16/24573; G06F 16/248; G06F 40/279; G06F 40/247; G06F 40/30;
(Continued)

(56) References Cited

U.S. PATENT DOCUMENTS

| 5,873,107 A | 2/1999 | Borovoy |
| 7,028,253 B1 | 4/2006 | Liebermann |

(Continued)

FOREIGN PATENT DOCUMENTS

| EP | 1128276 | 8/2001 |
| JP | 2006285656 | 10/2006 |

(Continued)

OTHER PUBLICATIONS

United States Patent and Trademark Office, Notice of Allowance and Fee(s) Due dated Oct. 13, 2022 for U.S. Appl. No. 17/547,774, 6 pages.

(Continued)

*Primary Examiner* — David Phantana-angkool
(74) *Attorney, Agent, or Firm* — TUCKER ELLIS LLP

(57) ABSTRACT

Techniques describes herein include using software tools and feature vector comparisons to analyze and recommend images, text content, and other relevant media content from a content repository. A digital content recommendation tool may communicate with a number of back-end services and content repositories to analyze text and/or visual input, extract keywords or topics from the input, classify and tag the input content, and store the classified/tagged content in one or more content repositories. Input text and/or input images may be converted into vectors within a multi-dimensional vector space, and compared to a plurality of feature vectors within a vector space to identify relevant content items within a content repository. Such comparisons may include exhaustive deep searches and/or efficient tag- (Continued)

based filtered searches. Relevant content items (e.g., images, audio and/or video clips, links to related articles, etc.), may be retrieved and presented to a content author and embedded within original authored content.

18 Claims, 41 Drawing Sheets

(51) Int. Cl.
| | |
|---|---|
| G06F 16/2457 | (2019.01) |
| G06F 3/0484 | (2022.01) |
| G06F 3/0482 | (2013.01) |
| G06F 16/248 | (2019.01) |
| G06F 40/247 | (2020.01) |
| G06F 40/279 | (2020.01) |
| G06F 18/24 | (2023.01) |
| G06V 10/40 | (2022.01) |

(52) U.S. Cl.
CPC ...... *G06F 16/248* (2019.01); *G06F 16/24573* (2019.01); *G06F 18/24* (2023.01); *G06F 40/247* (2020.01); *G06F 40/279* (2020.01); *G06V 10/40* (2022.01)

(58) Field of Classification Search
CPC ..... G06F 3/0482; G06F 3/0484; G06V 10/40; G06K 9/6267
See application file for complete search history.

(56) References Cited

U.S. PATENT DOCUMENTS

| | | | |
|---|---|---|---|
| 8,095,523 B2 | 1/2012 | Brave | |
| 8,990,235 B2 | 3/2015 | King | |
| 9,519,883 B2 | 12/2016 | Childs | |
| 9,898,773 B2 | 2/2018 | Nice | |
| 10,191,990 B2 | 1/2019 | Sayyadi-Harikandehei | |
| 10,331,744 B2 | 6/2019 | Boyd | |
| 10,387,526 B2 | 8/2019 | Jones | |
| 10,565,222 B2 * | 2/2020 | Murray | G06F 16/2456 |
| 10,628,633 B1 | 4/2020 | Geng | |
| 10,798,193 B2 | 10/2020 | Wu | |
| 10,798,446 B2 | 10/2020 | Delaney | |
| 10,970,314 B2 | 4/2021 | Sims | |
| 11,017,156 B2 | 5/2021 | Hwang | |
| 11,153,253 B2 | 10/2021 | Zhang | |
| 11,163,777 B2 | 11/2021 | Ghoshal | |
| 11,200,240 B2 | 11/2021 | Ghoshal | |
| 11,310,539 B1 * | 4/2022 | Yun | G06V 20/48 |
| 2012/0254310 A1 | 10/2012 | Kamimaeda | |
| 2012/0330932 A1 | 12/2012 | Boyd | |
| 2014/0172961 A1 | 6/2014 | Clemmer | |
| 2014/0278957 A1 | 9/2014 | Ram | |
| 2014/0280223 A1 | 9/2014 | Ram | |
| 2015/0066954 A1 | 3/2015 | Jones | |
| 2016/0092416 A1 | 3/2016 | Kohlmeier | |
| 2016/0117072 A1 | 4/2016 | Sharifi | |
| 2016/0232922 A1 | 8/2016 | Hickey | |
| 2016/0357770 A1 | 12/2016 | Wu | |
| 2016/0379123 A1 | 12/2016 | Younessian | |
| 2017/0161279 A1 | 6/2017 | Franceschini | |
| 2018/0075115 A1 * | 3/2018 | Murray | G06F 16/248 |
| 2018/0144052 A1 | 5/2018 | Sayyadi-Harikandehei | |
| 2018/0349388 A1 | 12/2018 | Skiles | |
| 2019/0065991 A1 | 2/2019 | Guggilla | |
| 2019/0208264 A1 | 7/2019 | Delaney | |
| 2019/0221204 A1 | 7/2019 | Zhang | |
| 2020/0125575 A1 * | 4/2020 | Ghoshal | G06F 3/0482 |
| 2021/0081475 A1 | 3/2021 | Pham | |
| 2021/0326718 A1 * | 10/2021 | Olson | G06N 20/00 |
| 2021/0390108 A1 * | 12/2021 | Ghoshal | G06F 3/0484 |
| 2022/0012268 A1 * | 1/2022 | Ghoshal | G06F 16/285 |
| 2022/0027578 A1 * | 1/2022 | Chorakhalikar | G06N 5/022 |
| 2022/0100767 A1 * | 3/2022 | Ghoshal | G06F 40/237 |
| 2022/0207073 A1 * | 6/2022 | Sohail | G10L 15/22 |
| 2022/0207484 A1 * | 6/2022 | Saha | G06Q 10/1053 |
| 2022/0237374 A1 * | 7/2022 | Wilde | G06F 3/04842 |
| 2022/0358181 A1 * | 11/2022 | Narth | G06F 16/358 |
| 2022/0405621 A1 | 12/2022 | Ankaret | |
| 2023/0206076 A1 | 6/2023 | Xu | |
| 2023/0244744 A1 * | 8/2023 | Narth | G06F 40/284 715/234 |
| 2023/0266863 A1 * | 8/2023 | Govind | G06F 3/04842 707/706 |

FOREIGN PATENT DOCUMENTS

| | | |
|---|---|---|
| JP | 2012027788 | 2/2012 |
| JP | 2019008440 | 1/2019 |

OTHER PUBLICATIONS

European Patent Office, International Searching Authority, International Search Report and Written Opinion dated Jan. 4, 2022 for International Application No. PCT/US2021/052351 , 16 pages.

European Patent Office, International Searching Authority, International Search Report and Written Opinion dated Jan. 9, 2020 for International Application No. PCT/US2019/56992 ,9 pages.

Christian Wartena et al., (2010). "Selecting Keywords for Content Based Recommendation". Conference: Proceedings of the 19th ACM Conference on Information and Knowledge Management, CIKM 2010, Toronto, Ontario, Canada, Oct. 26-30, 2010, pp. 1533-1536, DOI:10.1145/1871437.1871665.

Marcela Kunova, "Getty Images Launches a New AI Tool That Helps Publishers Find the Right Picture for the Story" © 2022 Mousetrap Media Ltd, 4 pages, retrieved on Jan. 11, 2022 from <https://wwwjournalism.co.uk/news/getty-images-launches-a-new-ai-tool-that-helps-publishers-find-the-right-picture-for-the-story/s2/a725797/>.

Keqian Li et al., "HierCon: Hierarchical Organization of Technical Documents Based on Concepts" 2019 IEEE International Conference on Data Mining (ICDM), Nov. 8, 2019, DOI: 10.1109/ICDM.2019.00048, pp. 379-388.

Intellectual Property India, Examination report under sections 12 & 13 of the Patents Act, 1970 and the Patents Rules, 2003 dated Oct. 21, 2022 for Indian Patent Application No. 202147014916 , 8 pages.

Japan Patent Office, Notice of Reasons for Refusal dated Jul. 10, 2023 for Japanese Patent Application No. 2021-521193 , 8 pages.

United States Patent and Trademark Office, Office Communication dated Aug. 31, 2023 for U.S. Appl. No. 17/486,524 , 8 pages.

* cited by examiner

FIG. 2

Mountain Runner

Mountain Runner
Type
Article
Author Scranger
Comment

The Mountain Runner scaled Everest Twice in Under a Week Fueled by a love of the mountains and a drive to push his physical limits, Killian Jornet achieved what no other mountain runner has before -two Everest summits without oxygen in about five days. Killian Jornet arrived to Everest base camp with the goal of setting a Fastest Known Time (FKT) for a roundtrip ascent of the world's tallest mountain from the Tibetan side. What the 30-year-old mountain runner from Spain actually achieved on Mount Everest (8,848 meters) in May 2017, however, defies easy categorization. "I came into this project not knowing if it was even possible to climb Everest without oxygen," he says.

"It was all about learning from the beginning". The headlining details are that Jornet reached Everest's Summit twice within a single week, first on May 22, then again on May 27. Both times he climbed solo, without the use of supplemental oxygen, without fixed ropes, and without reliance on supplies or support. Climbing Everest without oxygen twice in the same week has been done before, in 2007 by Pemba Dorje Sherpa, whose ascents were seven days apart. Jornet's ascents, meanwhile, were separated by just over five days.

He also had another acclimatization run, sometime between Cho You and his first Everest summit, which brought him above 8,000 meters, meaning he actually climbed to above 8,000 meters four times in just three weeks. When it comes to assessing Jornet's Everest speed times, however, it gets harder to set the record straight. Other climbers who have attempted speed ascents on Everest have typically begin timing their summit bids at Advanced Base Camp at 6,400 meters. Jornet, however, initially made the decision to start his stopwatch at Rongbuk Monastery, where the paved Chinese road ends and the trail to Everest basecamp begins. This, in part, was an attempt to bring a fixed landmark to the often arbitrary practice of claiming Fastest Known Times.

Jornet's time of 26 hours from the monastery, with an elevation of 5,100 meters, to the summit of Everest, at 8,848 meters, is extremely impressive, but also difficult to compare. Further, Jornet had Close Topics (Wikipedia) → Mountaineer, Cappuccino, Mount Everest

SMART CONTENT RECOMMENDATIONS FOR CONTENT AUTHORS

CLAIM OF PRIORITY AND CROSS-REFERENCE TO RELATED APPLICATIONS

This application is a continuation of U.S. patent application titled "SMART CONTENT RECOMMENDATIONS FOR CONTENT AUTHORS", application Ser. No. 16/581,138 filed Sep. 24, 2019; which claims the benefit of and priority to India Provisional patent application titled "SMART CONTENT RECOMMENDATIONS FOR AUTHORS", Application No. 201841039495, filed Oct. 18, 2018; the contents of which applications are herein incorporated by reference.

BACKGROUND

Generators and authors of original content for online publication and/or transmission may use a variety of different software-based tools and techniques for generating, editing, and storing the newly generated content. For example, new original content may include on-line articles, newsletters, emails, blog entries, and the like, and such content may be generated via software-based word processor tools, email client applications, web-development tools, etc. During the generation of new authored content, it may be useful for the author to identify and incorporate additional relevant items within the content, such as topical images and links to related articles, etc.

However, even when using search engines, keyword searching, and the like, locating and incorporating relevant images, links, and other related content may prove difficult and manually time-consuming. For example, when a generator or author of new content would like to incorporate related items into their newly authored text, the author must locate desired and relevant items, assure that the items are safe to insert into the authored content (e.g., free of viruses and malware), confirm that the author and/or organization are authorized to use the items, and then embed the items within the newly authored content. Each of these processes may be technically challenging, manually intensive, and inefficient.

BRIEF SUMMARY

Aspects of the present disclosure relate to an artificial intelligence (AI) driven tool configured to function as a smart digital assistant to recommend images, text content, and other relevant media content from a content repository. Certain embodiments, may include front-end software tools having graphical user interfaces to supplement the content authoring interfaces being used to author the original media content (e.g., blog entries, online articles, etc.). In some cases, the additional GUI screens and features may be incorporated into an existing content authoring software tool, for example, as software plug-ins. The smart digital content recommendation tool may communicate with a number of back-end services and content repositories, for example, to analyze text and/or visual input, extract keywords or topics from the input, classify and tag the input content, and store the classified/tagged content in one or more content repositories.

Additional techniques performed in various embodiments of the smart digital content recommendation tool (e.g., either directly by the software tool, and/or indirectly by invoking back-end services), may include converting input text and/or images into vectors within a multi-dimensional vector space, and comparing input content to a plurality of repository content to find a number of relevant content options within the content repository. Such comparisons may include thorough and exhaustive deep searches and/or more efficient tag-based filtered searches. Finally, relevant content items (e.g., images, audio and/or video clips, links to related articles, etc.), may be retrieved and presented to the content author to be reviewed and embedded within the original authored content.

BRIEF DESCRIPTION OF THE DRAWINGS

A further understanding of the nature and advantages of embodiments according to the present disclosure may be realized by reference to the remaining portions of the specification in conjunction with the following appended figures.

FIG. 2 is an example screen of a customized dashboard in a user interface used to configure, monitor, and control a service instance, in accordance with certain embodiments of the present disclosure.

FIGS. 29-30 are example diagrams of a text document illustrating a topic extraction process, in accordance with certain embodiments of the present disclosure.

FIGS. 37-38 are example user interface screens showing image recommendations provided to a user during the creation of content, in accordance with certain embodiments of the present disclosure.

Figure 1:
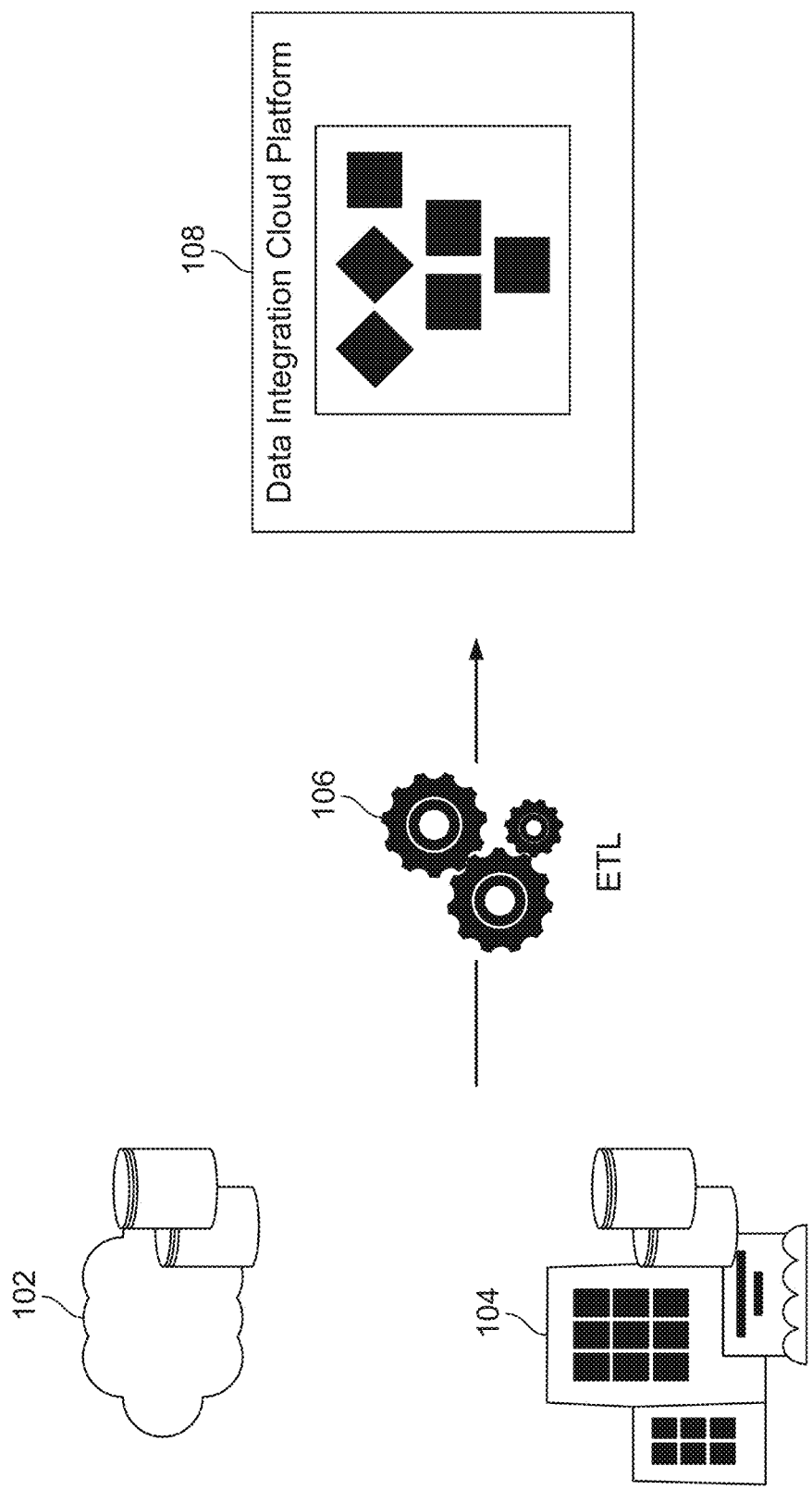
FIG. 1 is a diagram of an example computer system architecture including a data integration cloud platform in which certain embodiments of the present disclosure may be implemented.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

Certain embodiments described herein may be implemented as part of a Data Integration Platform Cloud (DIPC). In general, data integration involves combining data residing in different data sources and providing users with unified access and a unified view of the data. This process often arises and becomes significant in many situations, such as merging commercial entities with existing legacy databases. Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIPC to combine many heterogeneous data sources such that they can be presented in a unified view to the user.

The DIPC is a cloud-based platform for data transformation, integration, replication, and governance. It provides batch and real-time data movement between cloud and on-premises data sources while maintaining data consistency with default-tolerance and resiliency. The DIPC may be used to connect to various data sources and prepare, transform, replicate, govern, and/or monitored data from these various sources as they are combined into one or more data warehouses. The DIPC can work with any type of data source and support any type of data in any format. The DIPC can use a Platform as a Service (PaaS) or Infrastructure as a Service (IaaS) architecture to provide cloud-based data integration for an Enterprise.

The DIPC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery that maintains availability.

FIG. 1 illustrates a computer system architecture that utilizes the DIPC to integrate data from various existing platforms, according to some embodiments. A first data source 102 may include a cloud-based storage repository. A second data source 104 may include an on-premises data center. In order to provide uniform access and views to the first data source 102 and the second data source 104, the DIPC 108 can use an existing library of high-performance ELT functions 106 to copy data from the first data source 102 and the second data source 104. The DIPC 108 can also extract, enrich, and transform the data as it is stored in a new cloud platform. The DIPC 108 can then provide access to any big data utilities that are resident in or accessible by the cloud platform. In some embodiments, the original data sources 102 and 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

Figure 2:
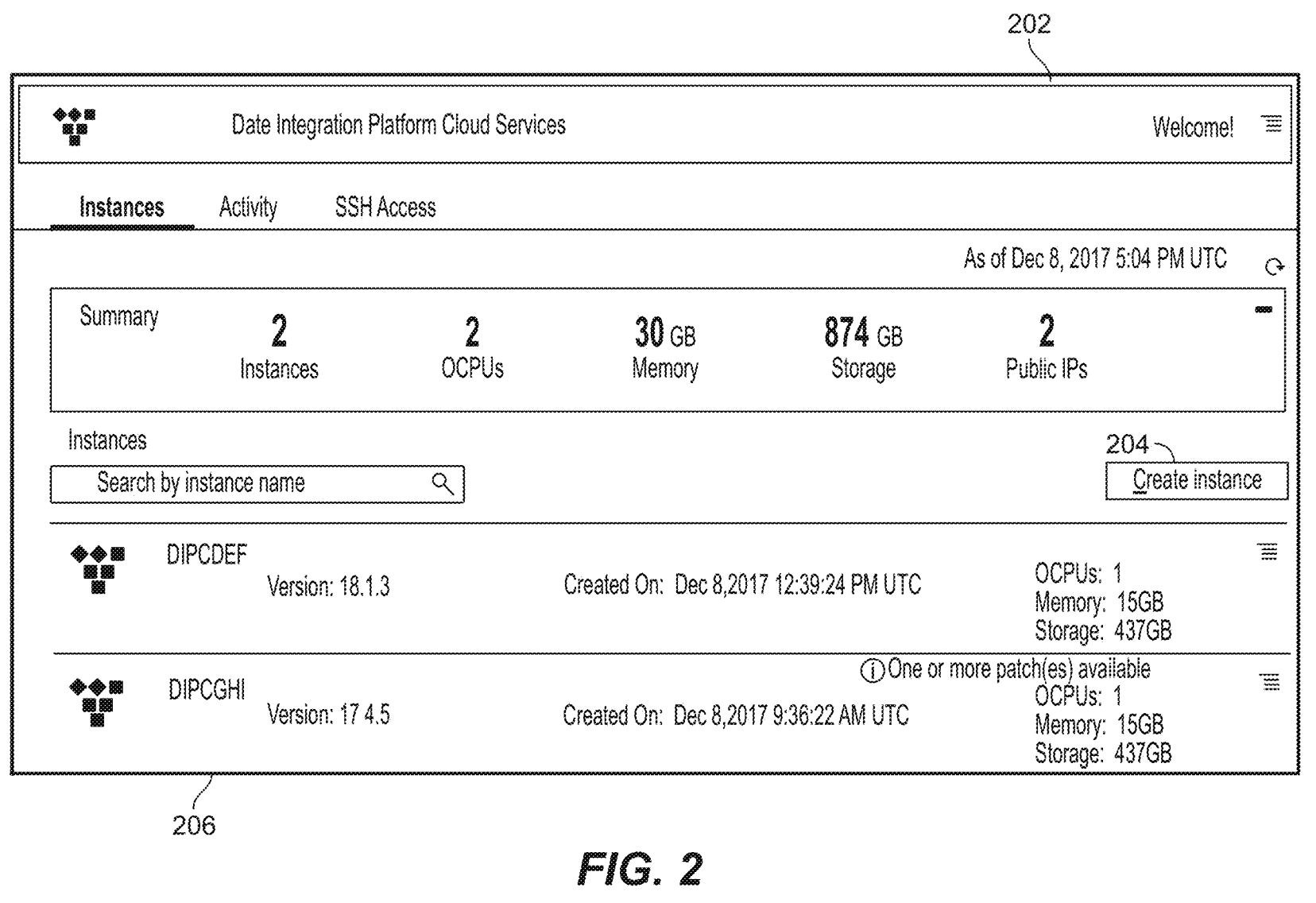

FIG. 2 illustrates one of the customized dashboards in a user interface that can be used to configure, monitor, and control a service instance in the DIPC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIPC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
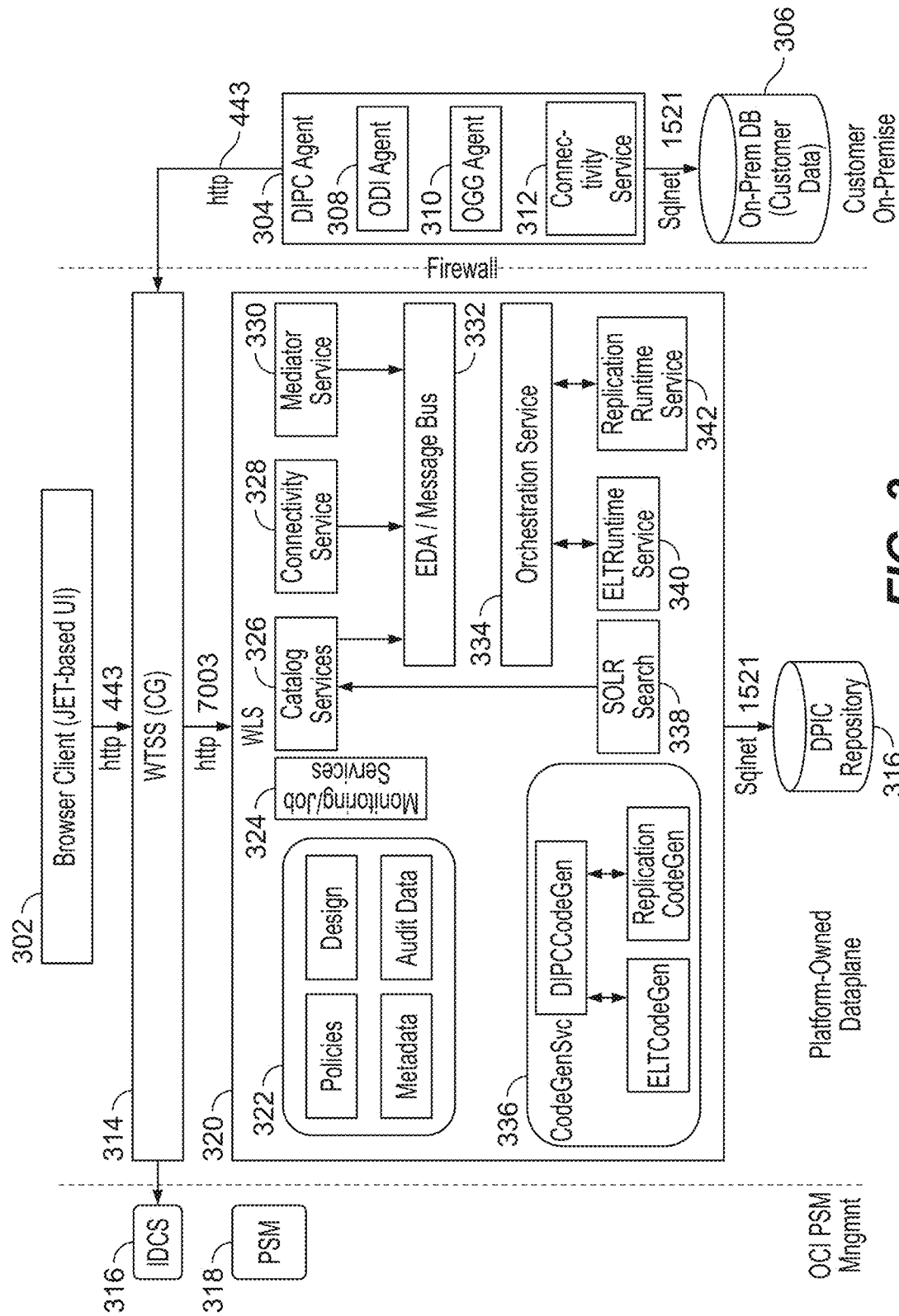
FIG. 3 is an architectural diagram of a data integration cloud platform, in accordance with certain embodiments of the present disclosure.

FIG. 3 illustrates an architectural diagram of the DIPC, according to some embodiments. Requests may be received through a browser client 302, which may be implemented using a JavaScript Extension Toolkit (JET) set of components. Alternatively or additionally, the system may receive requests through a DIPC agent 304 that operates at a customer's on-premises data center 306. The DIPC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIPC.

Incoming requests can be passed through a sign-in service 314, which may include load-balancing or other utilities for routing requests through the DIPC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIPC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIPC can be implemented on a Web logic server 320 for building and deploying enterprise applications in the cloud environment. The DIPC may include a local repository 322 that stores data policies, design information, metadata, and audit data for information passing through the DIPC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIPC. Information within the DIPC may be passed using an Event Driven Architecture (EDA) and a corresponding message bus 332.

The DIPC may also include an orchestration service 334. The orchestration service 334 may enable automation tasks by calling REST endpoints, scripts, third-party automation frameworks, and so forth. These tasks can then be executed by the orchestration service 334 to provide the DIPC functionality. The orchestration service 334 can use run-time services to import, transform, and store data. For example, an ELT runtime service 340 can execute the library of ELT functions described above, while the replication runtime service 342 can copy data from various data sources into a cloud-deployed DIPC repository 346. Additionally, the DIPC may include a code generation service 336 that provides automatic code generation for both ELT functions and replication functions.

As noted above, when a user is creating/authoring original media content (e.g., articles, newsletters, emails, blog posts, etc.), it is often useful to enhance the authored content with relevant additional content such as related images, audio/video clips, links to related articles or other content. However, searching for such additional content, as well as embedding that additional content within the user's original authored content, may be difficult in several respects. The initial difficulties may involve finding safe/secure additional content from a trusted source, and ensuring that user/author is authorized to incorporate that content within their work. Additionally, from any such secure and authorized content repositories, it may be a manually intensive and inefficient process for the user/author to locate and incorporate/embed any relevant content within their original authored content.

Therefore, certain aspects described herein relate to a smart digital content recommendation tool. In certain embodiments, the smart digital content recommendation tool may be an artificial intelligence (AI) driven tool configured to process and analyze input content (e.g., text, images) from a content author in real-time, and to recommend relevant images, additional text content, and/or other relevant media content (e.g., audio or video clips, graphics, social media posts, etc.), from one or more trusted content repositories. A smart digital content recommendation tool may communicate with a number of back-end services and content repositories, for example, to analyze text and/or visual input, extract keywords or topics from the input, classify and tag the input content, and store the classified/tagged content in one or more content repositories.

Additional aspects described herein, each of which may be performed directly via a smart digital content recommendation tool executing on a client operated by the content author, and/or indirectly by invoking various back-end services, may include (a) receiving original content as input, in the form of text and/or images, (b) extracting keywords and/or topics from the original content, (c) determining and storing associated keyword and/or topic tags for the original content, (d) converting the original content (e.g., input text and/or images) into vectors within a multi-dimensional vector space, (e) comparing such vectors to a plurality of other content vectors, each of which represents additional content in a content repository, in order to find and identify various potentially-relevant additional content related to the original content input authored by the user/author, and finally (f) retrieve and present the identified additional content to the author via the smart digital content recommendation tool. In some embodiments, each additional content item (e.g., images, links to related articles or web pages, audio or video files, graphics, social media posts, etc.) may be displayed and/or thumbnailed by the smart digital content recommendation tool, in a GUI-based tool that allows the user to drag-and-drop or otherwise place the additional content within the user's original authored content, including content positioning, formatting, re-sizing, etc.

Figure 4:
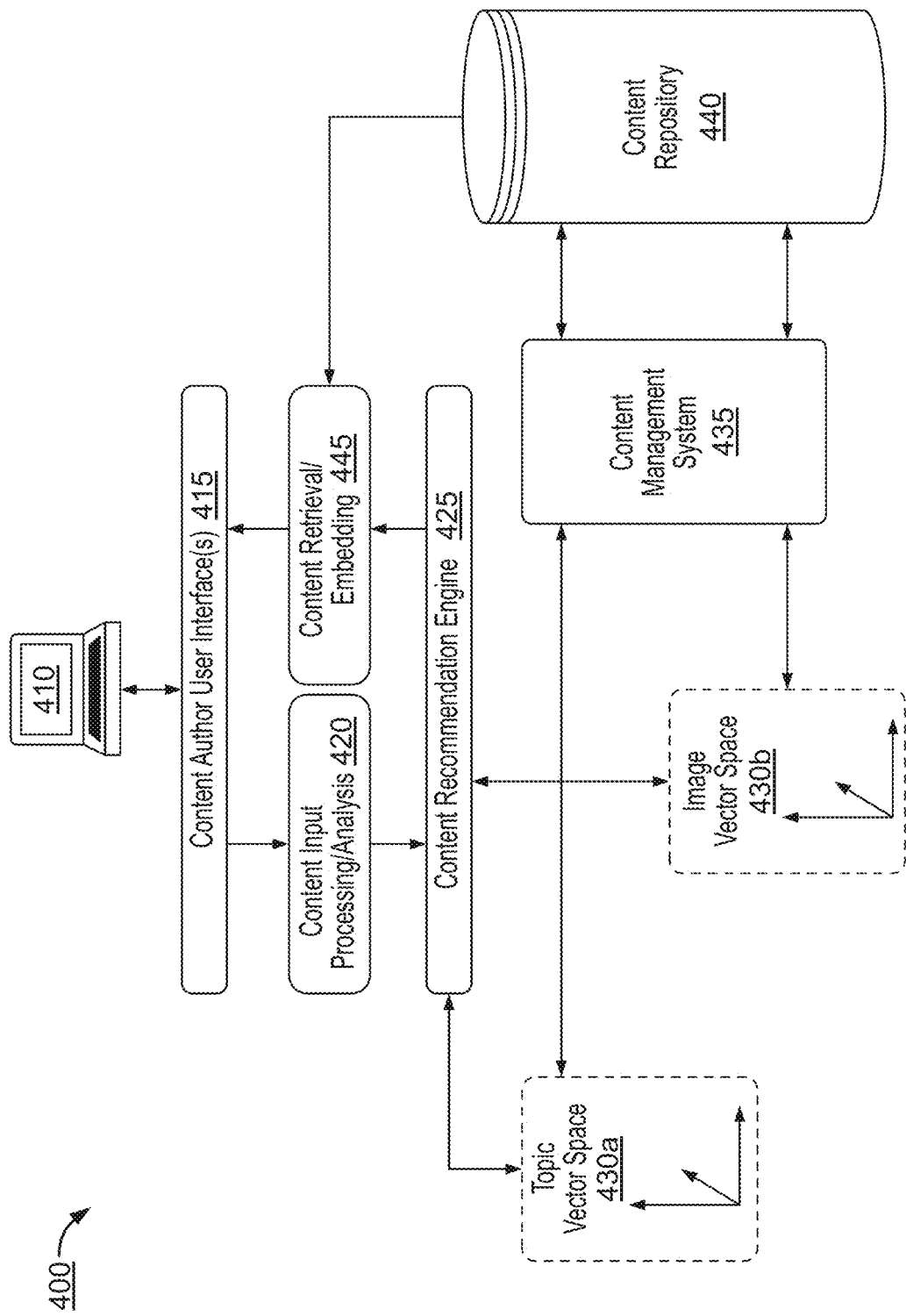
FIG. 4 is a diagram of an example computing environment configured to perform content classification and recommendation, in accordance with certain embodiments of the present disclosure.

With reference now to FIG. 4, a block diagram is shown illustrating various components of a system 400 for smart content classification and recommendation, including a client device 410, content input processing/analysis service 420, content recommendation engine 425, a content management and classification system 435, and a content retrieval/embedding component 445. Additionally, system 400 includes one or more content repositories 440 storing content files/resources, and one or more vector spaces 430. In some embodiments, the content recommendation engine 425, associated software components and services 420 and 445, content management and classification system 435, and content repositories 440 may be implemented and stored as back-end server systems remote from the front-end client device 410. Thus, interactions between client device 410 and content recommendation engine 425 may be Internet-based web browsing sessions, or client-server application sessions, during which users access may input original authored content via the client device 410, and receive content recommendations from content recommendation engine 425 in the form of additional content that is retrieved from the content repositories 440 and linked or embedded into the content authoring user interface at the client device 410. Additionally or alternatively, the content recommendation engine 425 and/or content repository 440 and related services may be implemented as specialized software components executing on the client device 410.

The various computing infrastructure elements shown in this example (e.g., content recommendation engine 425, software components/services 420, 435, and 445, and content repositories 440) may correspond to a high-level computer architecture created and maintained by an enterprise or organization that provides Internet-based services and/or content to various client devices 410. The content described herein (which also may be referred to as content resources and/or content files, content links, etc.) may be stored in one or more content repositories, retrieved and classified by the content recommendation engine 425, and provided to content authors at client devices 410. In various embodiments, various different media types or file types of content may be input as original content by a content author at client device 410, and similarly various different media types or file types of content may be stored in the content repositories 440 and recommended for/embedded into the front-end user interfaces at the client device 410. These various different media types authored by or recommended to the content author may include text (e.g., authoring a letter, article, or blog), images (selected by or for the author), audio or video content resources, graphics, social media content, (e.g., posts, messages, or tweets on Facebook, Twitter, Instagram, etc.).

Figure 5:
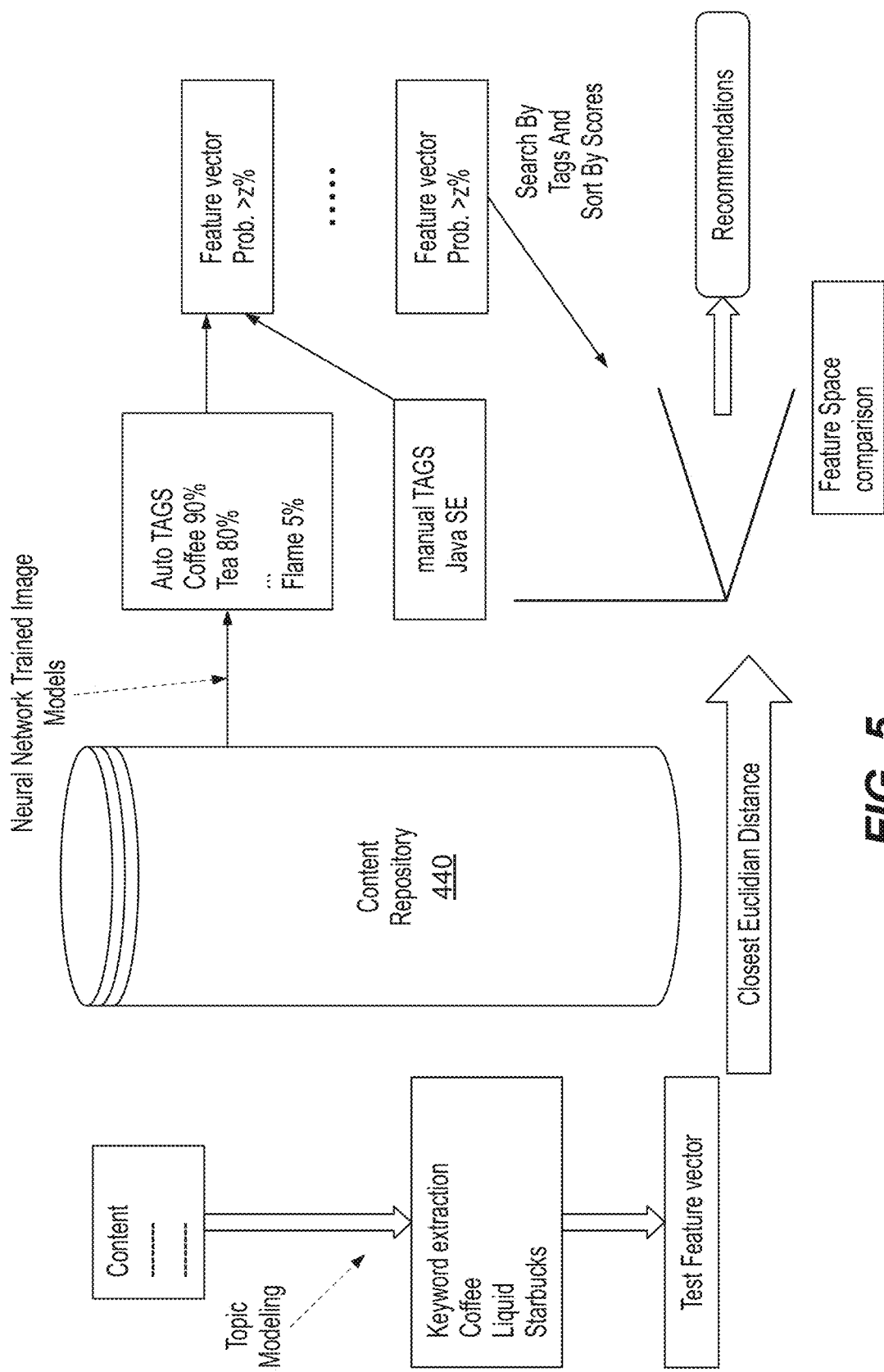
FIG. 5 is another diagram of an example computing environment configured to perform content classification and recommendation, in accordance with certain embodiments of the present disclosure.

In some embodiments, system 400 shown in FIG. 4 may be implemented as a cloud-based multi-tier system, in which upper-tier client devices 410 may request and receive access to the network-based resources and services via the content input processing/analysis service 420, and wherein the application servers may be deployed and executed upon an underlying set of resources (e.g., cloud-based, SaaS, IaaS, PaaS, etc.) including hardware and/or software resources. Additionally, although cloud-based systems may be used in some embodiments, systems 400 in other examples may use on-premise datacenters, server farms, distributed computing systems, and other various non-cloud computing architectures. Some or all of the functionality described herein for the content input processing/analysis service 420, content recommendation engine 425, content management and classification system 435, content retrieval/embedding component 445, and the generation and storage of the vector spaces 430 may be performed by Representational State Transfer (REST) services and/or web services including Simple Object Access protocol (SOAP) web services or APIs, and/or web content exposed via Hypertext Transfer Protocol (HTTP) or HTTP Secure protocols. Thus, although not shown in FIG. 4 so as not to obscure the components shown with additional details, system 400 may include additional client devices 410, one or more computer network(s), one or more firewalls, proxy servers, and/or other intermediary network devices, facilitating the interactions between the client devices 410, content recommendation engine 425, and back-end content repositories 440. Another embodiment of similar system 500 is shown in more detail in FIG. 5.

The components shown in system 400 for providing AI-based and feature vector analysis-based content recommendations and services to client devices 410 may be implemented in hardware, software, or a combination of hardware and software. For example, web services may be generated, deployed, and executed within datacenters, using the underlying system hardware or software components such as data storage devices, network resources, computing resources (e.g., servers), and various software components. In some embodiments, web services may correspond to different software components executing on the same underlying computer server(s), networks, data stores, and/or within the same virtual machines. Some web-based content, computing infrastructure instances, and/or web services provided within the content recommendation engine 425 may use dedicated hardware and/or software resources, while others may share underlying resources (e.g., shared cloud). In either case, certain higher-level services (e.g., user applications), as well as users at client devices, need not ever be aware of the underlying resources being used to support the services.

In such implementations, the various application servers, database servers and/or cloud storage systems, and other infrastructure components such as web caches, network components, etc. (not shown in this example), may include various hardware and/or software components (e.g., application programming interfaces (APIs), cloud resource managers, etc.) to provide and monitor the classification and vectorization of content resources, as well as to manage the underlying storage/server/network resources. The underlying resources of the content repositories 440 may be stored within content databases and/or cloud storage systems which may include, for example, a set of non-volatile computer memory devices implemented as databases, file-based storage, etc., a set of network hardware and software components (e.g., routers, firewalls, gateways, load balancers, etc.), a set of host servers, and various software resources such as, store software images, installations, builds, templates, configuration files, and the like, corresponding to different versions of various platform, server, middleware, and application software. The datacenters housing the application servers of the content recommendation engine 425, vector spaces 430, and related services/components also may include additional resources such as hypervisors, host operating systems, resource managers and other cloud-based applications, along with the hardware and software infrastructure to support various Internet-based services, such as Infrastructure as a Service (IaaS), Platform as a Service (PaaS), and Software as a Service (SaaS). Additionally, the underlying hardware of the datacenters may be configured to support a number of internal shared services, which may include, for example, security and identity services, integration services, repository services, enterprise management services, virus scanning services, backup and recovery services, notification services, file transfer services, and the like.

As noted above, many different types of computer architectures (cloud-based, web-based, hosting, multi-tier computing environments, distributed computing environments, etc.) may be used to provide the web-based content recommendations from the content recommendation engine 425 (which may be implemented via one or more content recommendation application servers) to the client devices 410 in accordance with various embodiments described herein. However, in certain implementations, cloud computing platforms may be used to provide certain advantageous features for generation and management of web-based content. For example, cloud computing platforms may provide elasticity and scalability to quickly provision, configure, and deploy many different types of computing infrastructure instances, in contrast to non-cloud based implementations having fixed architectures and limited hardware resources. Moreover, public cloud, private cloud, and public-private hybrid cloud platforms may be used in various embodiments to leverage the features and advantages of each distinct architecture.

Additionally, as shown in this example, system 400 also includes a content management and classification system 435. In some embodiments, the content management and classification system 435 may include a distributed storage processing system, one or more machine learning-based classification algorithms (and/or non-machine learning-based algorithms), and/or a storage architecture. As discussed in more detail below, in some embodiments the content management and classification system 435 may access content resources (e.g., web-based articles, images, audio files, video files, graphics, social media content, etc.) via one or more content repositories 440 (e.g., network-based document stores, web-based content providers, etc.). For example, within system 400, specialized JavaScript or other software components may be installed and operate on one or more application servers, database servers and/or cloud systems storing content objects or network-based content. These software components may be configured to retrieve and transmit content resources (e.g., articles, images, web pages, documents, etc.), to the content management and classification system 435 for analysis and classification. For example, each time a user within the operating organization of the system 400 imports or creates new content such as an image or article, a software component may retrieve the content back to the content management and classification system 435, for various processing and analysis described below (e.g., image processing, keyword extraction, topic analysis, etc.). Additionally, although in this example, the content management and classification system 435 is depicted as being implemented separately from the content recommendation engine 425 and content repositories 440, in other examples, content management and classification systems 435 may be implement locally with either the content recommendation engine 425 and/or the storage devices storing content repositories 440, and thus need not receive separate transmissions of content from those device, but rather may analyze and classify those content resources that are stored or provided by their respective systems.

One or more vector spaces 430 also may be generated and used to store feature vectors corresponding to the different content items within the content repositories 440, and to compare the feature vectors for original authored content (e.g., received from a client device 410) to the feature vectors of the additional content items in the content repositories 440. In some embodiments, a plurality of multi-dimensional vector spaces 430 may be implemented within the system 400, such as first vector space 430a for topics of text input/articles, and a second vector space 430*b* for images. In other embodiments, additional separate multi-dimensional vector spaces 430 may be generated for different types of content media (e.g., a feature space for audio data/files, a feature space for video data/files, a feature space for graphics, a feature space for social media content, etc.). As discussed below, comparison algorithms may be used to determine distances between the vectors within a feature space. Thus, in a feature space of image feature vectors, the algorithms may be used to identify the closest images to a received input image, in a feature space of text feature vectors, the algorithms may be used to identify the closest texts (e.g., articles) to a received input text block, and so on. Additionally or alternatively, the comparison algorithm may use keywords/tags of the vector space to determine similarity between various media types.

In various implementations, system 400 may be implemented using one or more computing systems and/or networks. These computing systems can include one or more computers and/or servers, which may be general purpose computers, specialized server computers (such as desktop servers, UNIX servers, mid-range servers, mainframe computers, rack-mounted servers, etc.), server farms, server clusters, distributed servers, or any other appropriate arrangement and/or combination of computing hardware. The content recommendation engine 425 may run an operating system and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. The content repository 440 may include database servers, for example, those commercially available from Oracle, Microsoft, etc. Each component in system 400 may be implemented using hardware, firmware, software, or combinations of hardware, firmware, and software.

In various implementations, each component within system 400 may include at least one memory, one or more processing units (e.g., processor(s)), and/or storage. The processing unit(s) can be implemented as appropriate in hardware (e.g., integrated circuits), computer-executable instructions, firmware, or combinations of hardware and instructions. In some examples, the various components of system 400 may include several subsystems and/or modules. The subsystems and/or modules in the content recommendation engine 425 may be implemented in hardware, software (e.g., program code or instructions executable by a processor) executing on hardware, or combinations thereof. In some examples, the software may be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code.

Figure 6:
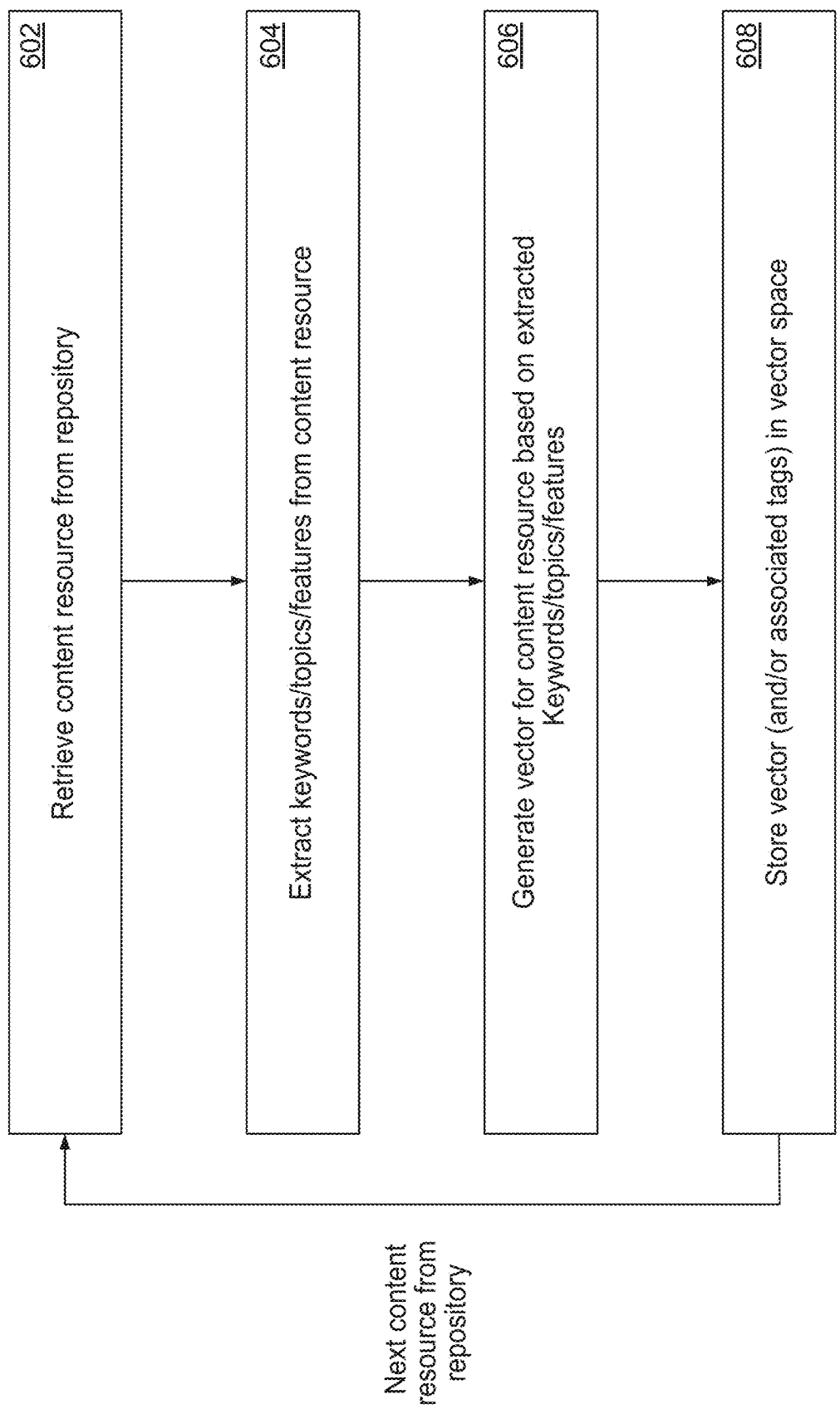
FIG. 6 is a flowchart illustrating a process for generating feature vectors based on content resources within a content repository, in accordance with certain embodiments of the present disclosure.

Referring now to FIG. 6, a flowchart is shown illustrating a process for generating feature vectors based on content resources within a content repository 440, and storing the feature vectors within a vector space 430. As described below, the steps in this process may be performed by one or more components in the system 400, such as the content management and classification system 435, and the various subsystems and subcomponents implemented therein.

In step 602, a content resource may be retrieved from a content repository 440 or other data store. As discussed above, an individual content resource (which also may be referred to as content or a content item) may correspond to a data object of any various content type: a text item (e.g., text file, article, email, blog entry, etc.), an image, an audio file, a video file, a 2D or 3D graphic object, a social media data item, etc. In some embodiments, content items may be retrieved from particular content repositories 440, such as proprietary data stores owned and operated by a particular trusted organization. Although content repositories 440 may be external data sources, such as Internet web servers or other remote data stores, systems 400 that retrieve and vectorize content from local and/or privately-controlled content repositories 440 may realize several technical advantages in the operation of system 400, including assurances that the content from content repository 440 will be preserved and accessible when needed, and that the user/author is authorized to use and reproduce the content from content repository 440. In some cases, the retrieval in step 602 (and subsequent steps 604-608) may be triggered in response to a new content item being stored in the content repository 440, and/or to a modification to an item in the content repository 440.

Figure 7:
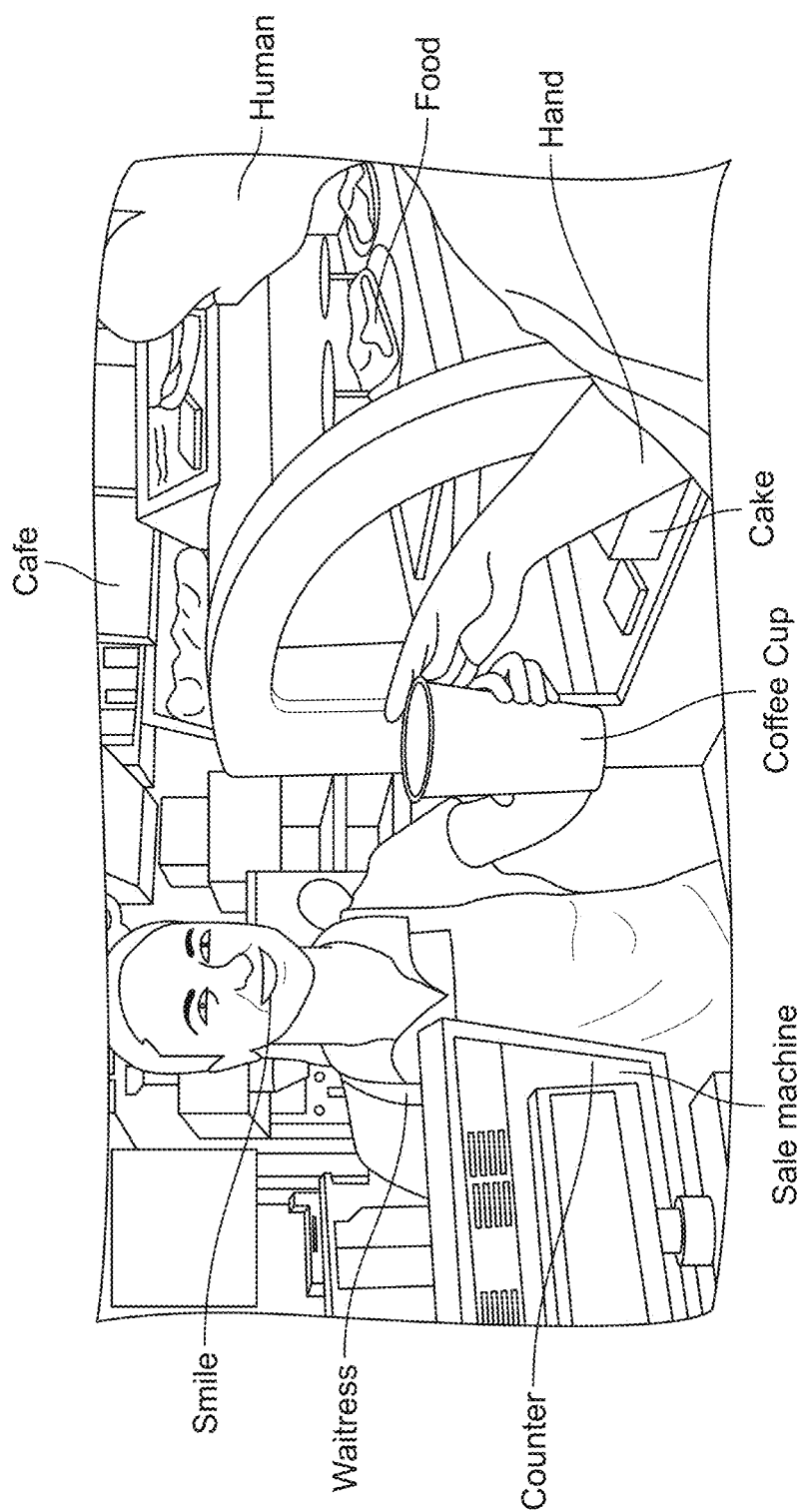
FIG. 7 is an example image identifying a plurality of image features, in accordance with certain embodiments of the present disclosure.
Figure 8:
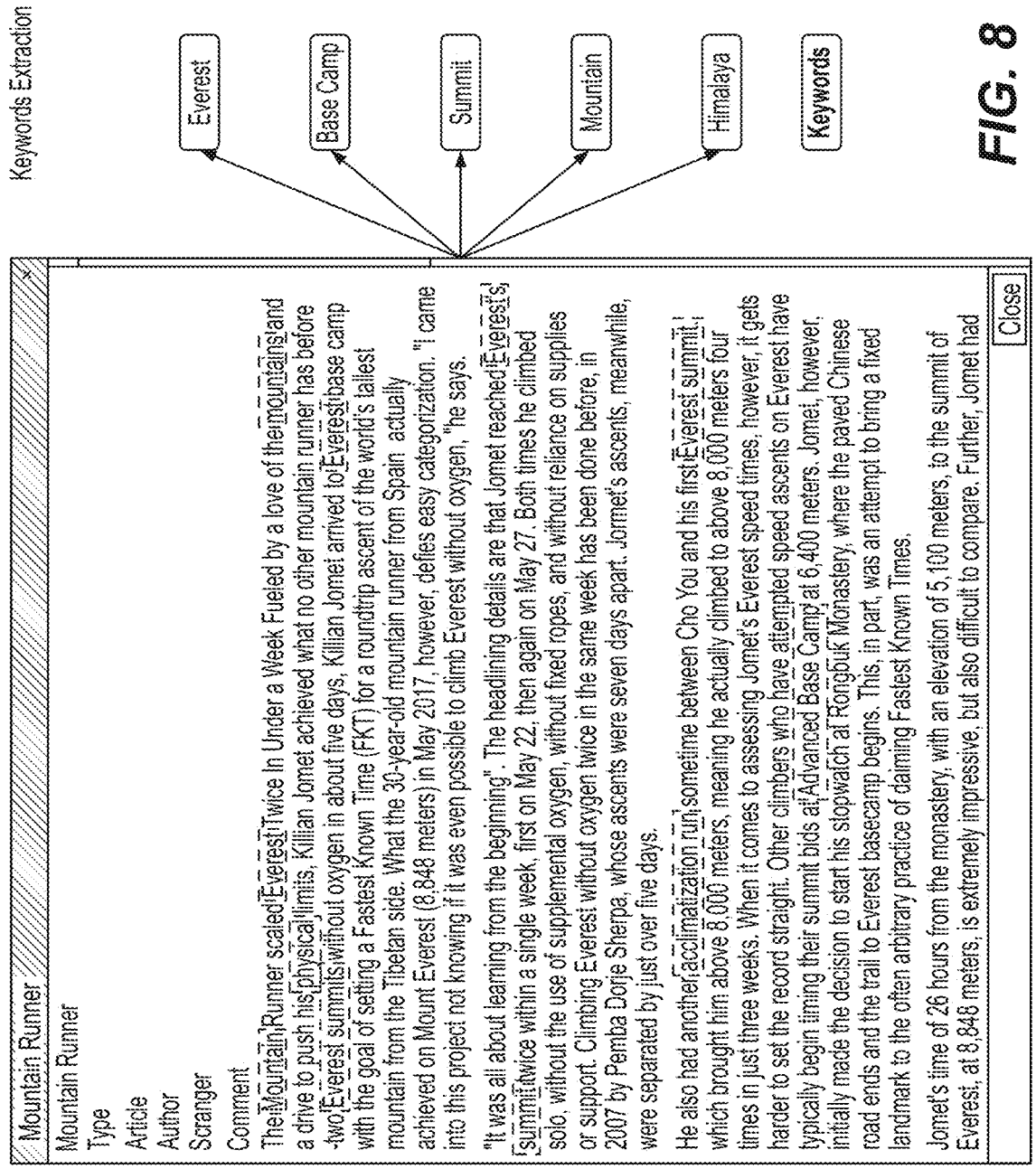
FIG. 8 is an example of a text document illustrating a keyword extraction process, in accordance with certain embodiments of the present disclosure.
Figure 9:
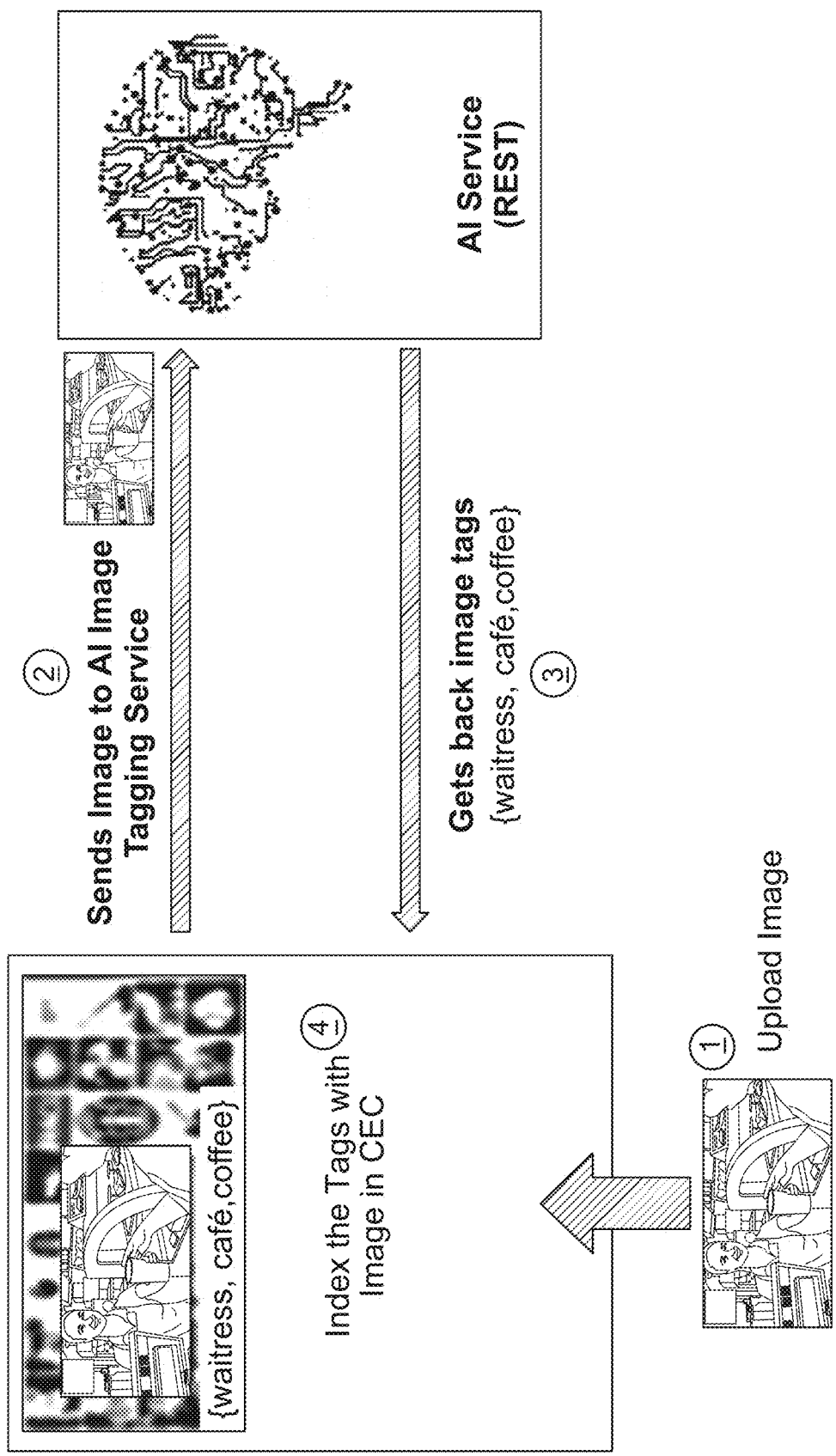
FIGS. 9-11 are diagrams illustrating a process of generating and storing image tags, in accordance with certain embodiments of the present disclosure.

In step 604, the content item retrieved in step 602 may be parsed/analyzed/etc. in order to extract a set of item features or characteristics. The type of parsing, processing, feature extraction, and/or analysis performed in step 604 may depend on the type of the content item. For image content items, artificial intelligence-based image classification tools may be used to identify particular image features and/or generate image tags. As shown in the example image of FIG. 7, the image analyses may identify a plurality of image features (e.g., smile, waitress, counter, sale machine, coffee cup, cake, hand, food, human, café, etc.), and the image may be tagged with each of these identified features. For text-based content items, such as blog posts, letters, emails, articles, etc., the analysis performed in step 604 may include keyword extraction and processing tools (e.g., stemming, synonym retrieval, etc.) as shown in FIG. 8. One or both types of analyses (i.e., feature extraction from images as shown in FIG. 9, and keyword/topic extraction from text content as shown in FIG. 8), may be performed via REST-based services or other web services, using analytics, machine-learning algorithms, and/or artificial intelligence (AI), such as an AI-based cognitive image analysis service, or a similar AI/REST cognitive text service to be used for the text content of FIG. 8. Similar techniques may be used in step 604 for other types of content items, such as video files, audio files, graphics, or social media posts, where a specialized web-service of the system 400 is used to extract and analyze specific features (e.g., words, objects within images/video, facial expressions, etc.) depending on the media type of the content item.

In step 606, after extracting/determining the specific content features (e.g., visual objects, keywords, topics, etc.) from the content item, a feature vector may be generated based on the extracted/determined features. Using various transformation techniques, each set of features associated with a content item may be transformed into a vector that can be input into a common vector space 430. The transformation algorithm may output a predetermined vector format (e.g., 1×4096 dimension vector). Then, in step 608, the feature vector may be stored in one or more of the vector spaces 430 (e.g., topic vector space 430a for text content, image vector space 430b for image content, and/or a combined vector space for multiple content types). The vector spaces and feature vectors stored therein may be generated and maintained by the content management and classification system 435, the content recommendation engine 425, and/or other components of the system 400.

Figure 10:
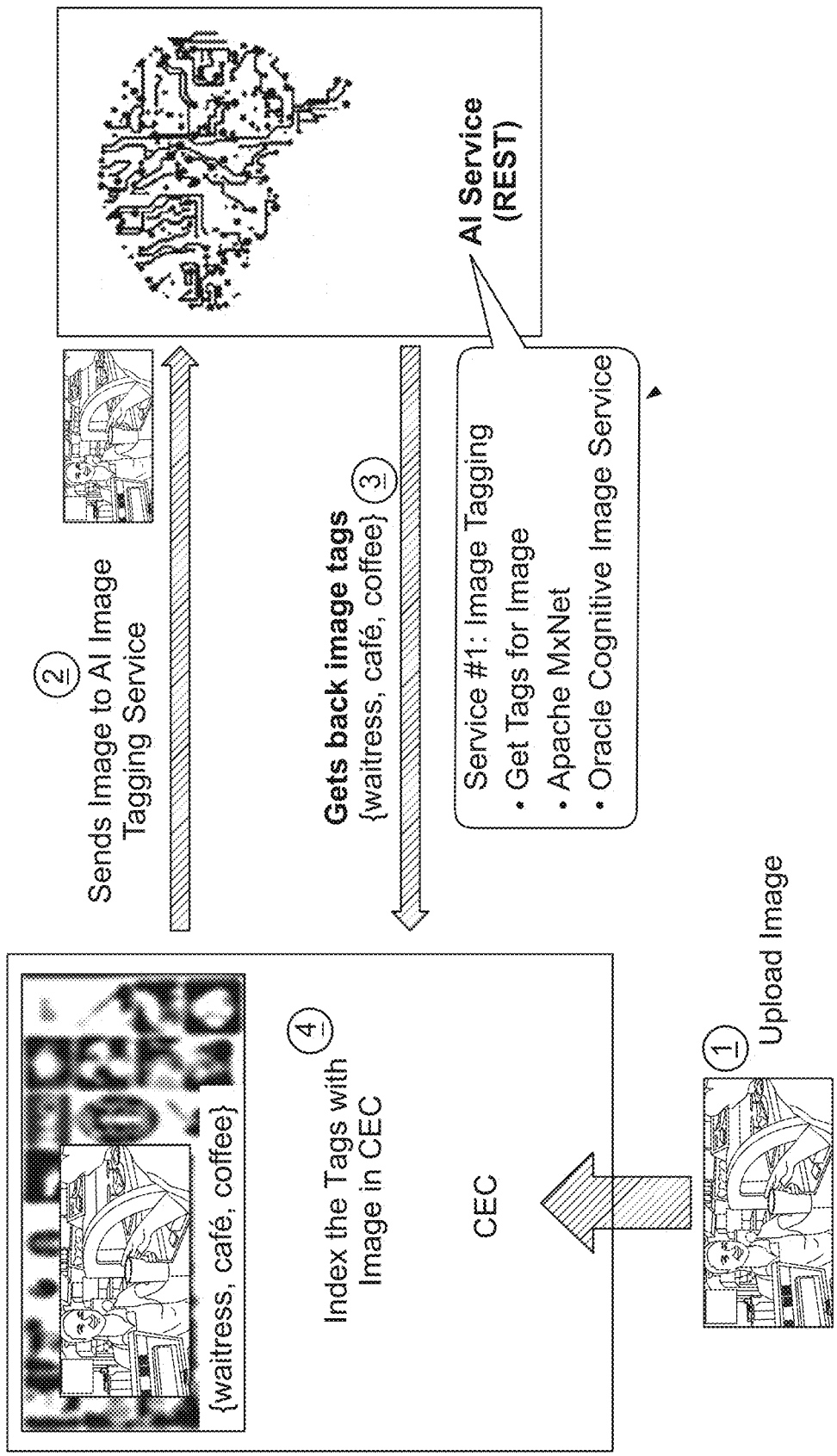
Figure 11:
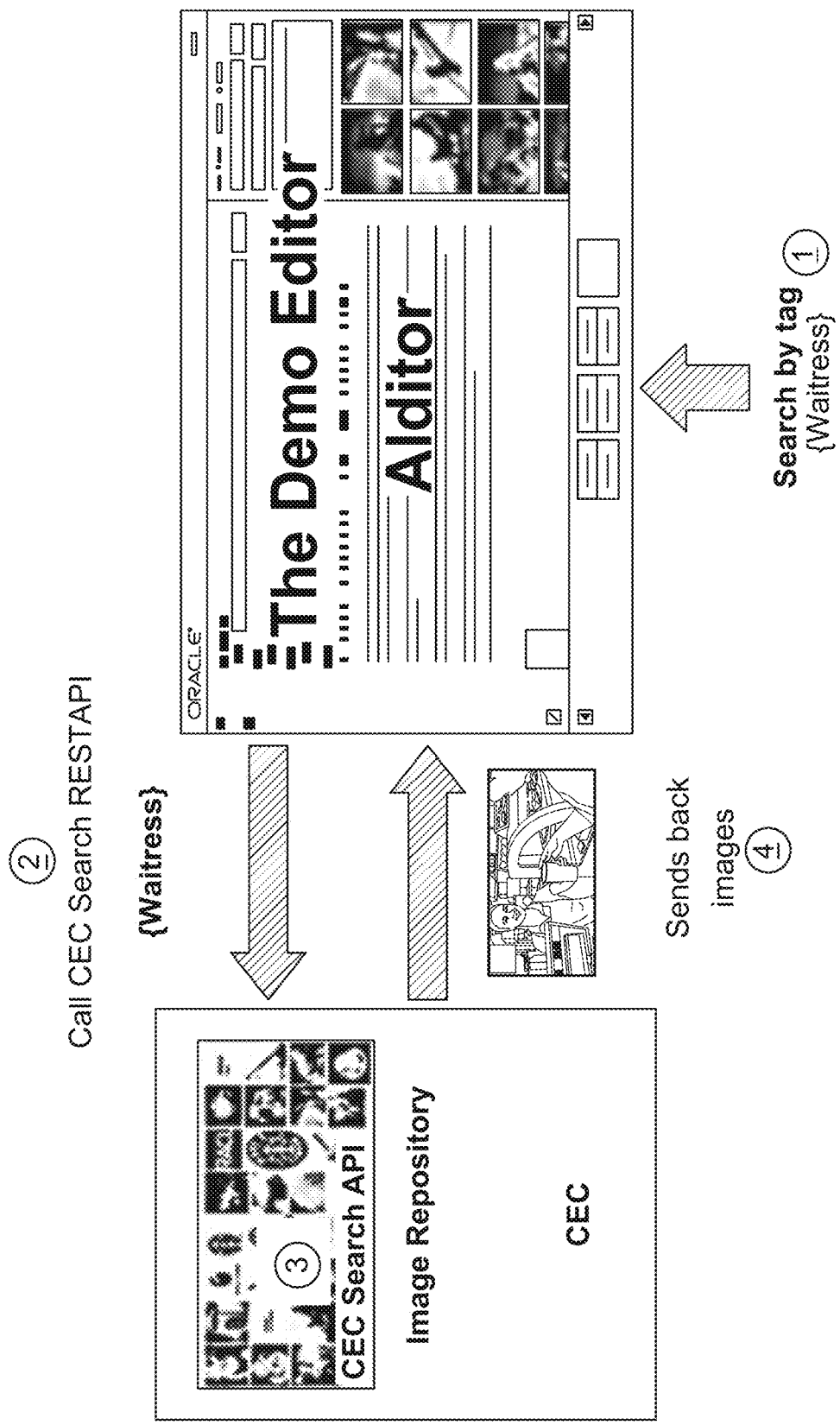

In some embodiments, a subset of the extracted/determined content features also may be saved as tags associated with the content item. Example processes for generating and storing image tags are shown in FIGS. 9-11. Similar tagging processes/keyword or topic extraction may be performed for text content items, audio/video content items, etc. After determining one or more tags for a content item, the tags may be stored either back in the content repository 440, or in a separate storage location. For instance, referring to the example image of FIG. 7, a dozen or more potential image features may be extracted from this single image, all of which may be incorporated into the feature vector. However; it may be advantageous to tag the image only with a few of the most prevalent themes of the image (e.g., coffee, retail).

Thus, upon the completion of the processes 602-608 for a plurality of content resources in a content repository 440, one or more vector spaces 430 may be populated with vectors wherein each vector corresponds to a content item in the content repository 440. Additionally, in some embodiments, a separate set of metadata tags may be generated for some or all of the content items, and stored as separate objects from the vectors in vector spaces 430. Such tags may be stored in any data storage or component shown in FIG. 4, or a separate data store, and each tag may be associated with content items in a content repository 440, vectors in a vector space 430, or both.

Figure 12:
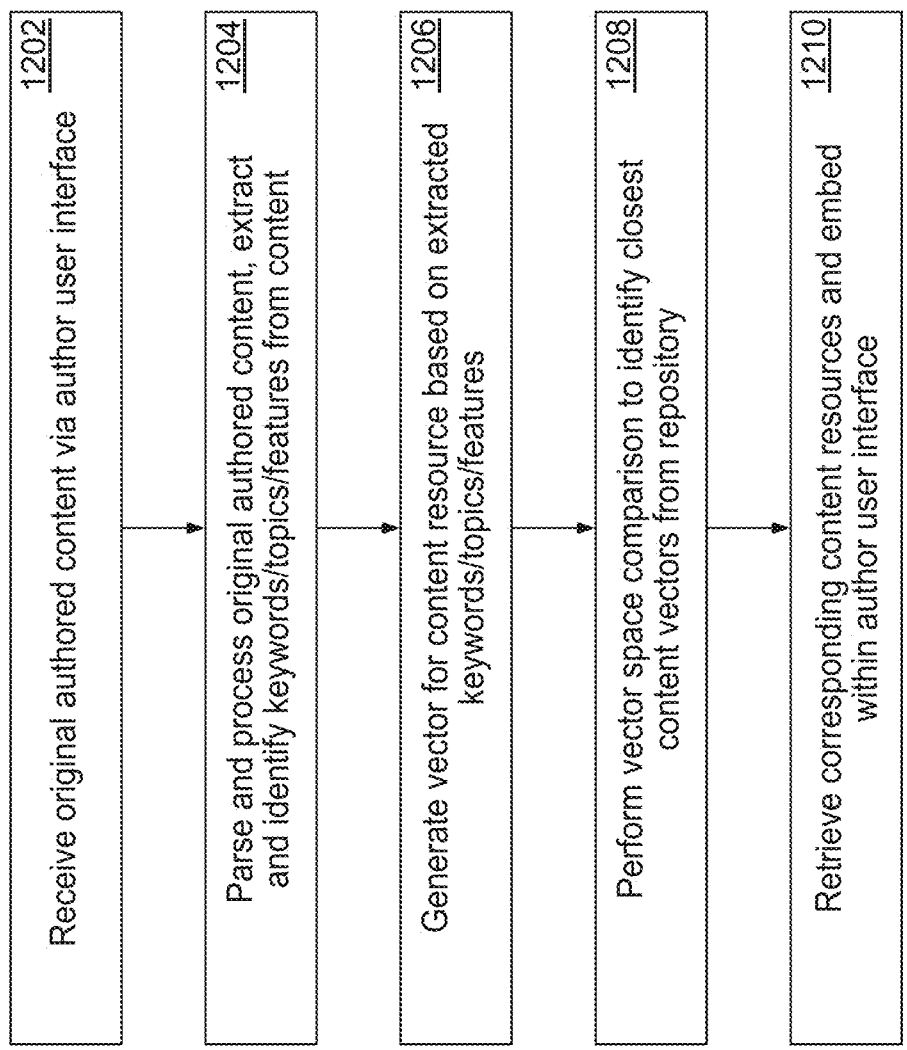
FIG. 12 is a flowchart illustrating another process for comparing feature vectors and identifying related content within a content repository, in accordance with certain embodiments of the present disclosure.

Referring now to FIG. 12, another flowchart is shown illustrating a second process for receiving original authored content from a user via the client device 410, extracting features and/or tags from the content in real-time (or near real-time) during the user's authoring session, vectorizing the authored content (also in real-time or near real-time), and comparing the vector of the original authored content to one or more existing vector spaces 430 in order to identify and retrieve related/associated content from one or more available content repositories 440. The steps in this process also may be performed by one or more components within the system 400, such as the content recommendation engine 425 in collaboration with the client device 410, content input processing/analysis service 420 and content retrieval/embedding component 445, and the various subsystems and subcomponents implemented therein.

In step 1202, original authored content may be received from a user via the client device 410. As discussed above, the original authored content may correspond to text typed by the user, a new image created or imported by the user, new audio or video input recorded or imported by the user, a new graphic created by the user, etc. Thus, step 1202 may be similar to step 602, discussed above. However, whereas the content in step 602 may be previously authored/stored content that is retrieved from a content repository 440, in step 1202 the content may be newly authored content received via a user interface, such as a web-based text input control, image importer control, image creation control, audio/video creation control, etc.

In step 1204, the content received in step 1202 (e.g., original authored content) may be processed, for example, by the content input processing/analysis service 420. Step 1204 may be similar or identical to step 604, discussed above, with respect to the parsing steps, processing steps, keyword/data feature extraction steps, etc. For example, for text input received in step 1202 (e.g., blog posts, letters, emails, articles, etc.), the processing in step 1204 may include text parsing, identification of keywords, stemming, synonym analysis/retrieval, and the like. In other examples, when an image is received in step 1202 (which may be uploaded by the user, imported from another system, and/or created or modified manually by the user via the content author user interface 415), then step 1204 may include using AI-based image classification tools as described above to identify particular image features and/or generate image tags. (See FIG. 7). These analyses in step 1204 may be performed via REST-based services or other web services, using analytics, machine-learning algorithms, and/or AI, such an AI-based cognitive image analysis service, and/or AI/REST cognitive text services. Similar techniques/services may be used in step 1204 for other types of content items, such as video files, audio files, graphics, or social media posts, where a specialized web-service of the system 400 is used to extract and analyze specific features (e.g., words, objects within images/video, facial expressions, etc.) depending on the media type of the content item. Step 1204 may also include any of the tagging processes described herein for tagging of text blocks, images, audio/video data, and/or other content with tags corresponding to any identified content topics, categories, or features.

Figure 13:
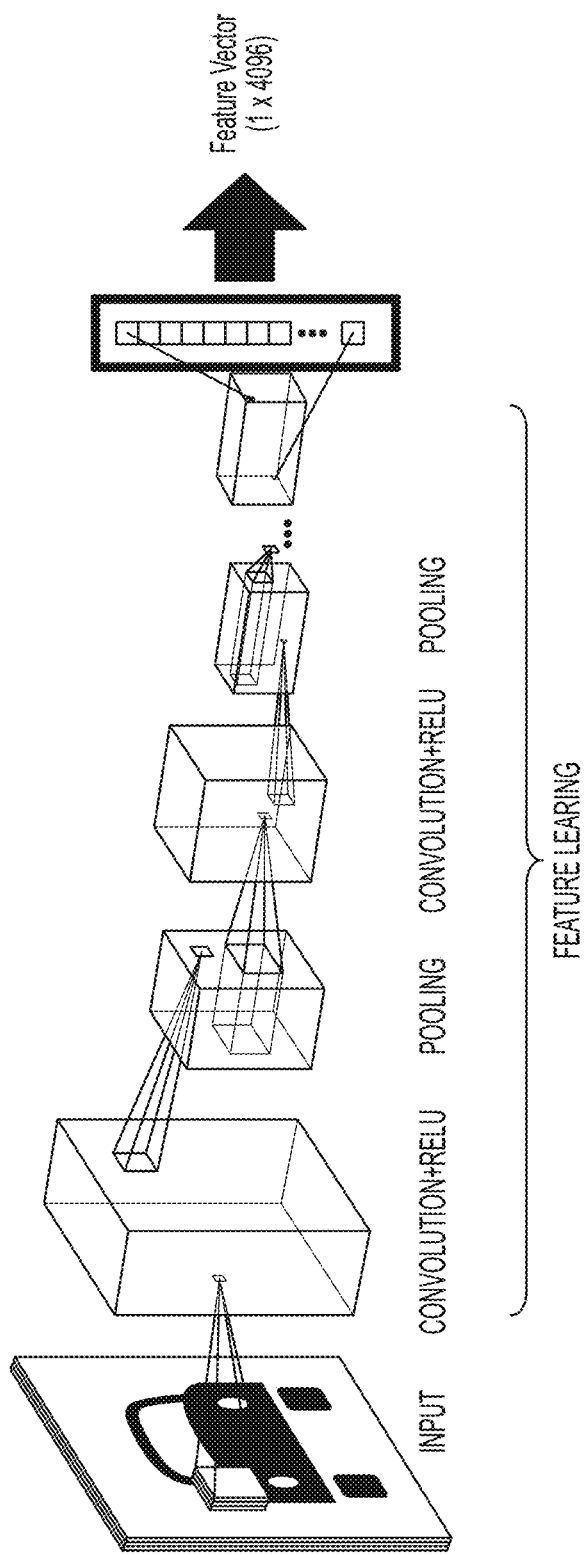
FIG. 13 is a diagram illustrating a technique of transforming an image filed into a feature vector, in accordance with certain embodiments of the present disclosure.

In step 1206, one or more vectors, compatible with one or more of the available vector spaces 430, may be generated based on the content received in step 1202. Step 1206 may be similar or identical to step 606, discussed above. As discussed above, a vector may be generated based on the particular features within the content (and/or tags) identified in step 1204. The vector generation process in step 1206 may use one or more data transformation techniques, whereby the set of features associated with the originally authored content item may be transformed into a vector compatible with one of the common vector spaces 430. For example, FIG. 13 illustrates a technique by which image input received in step 1202 may be transformed into a feature vector of a predetermined vector format (e.g., 1×4096 dimension vector) in step 1206.

Figure 14:
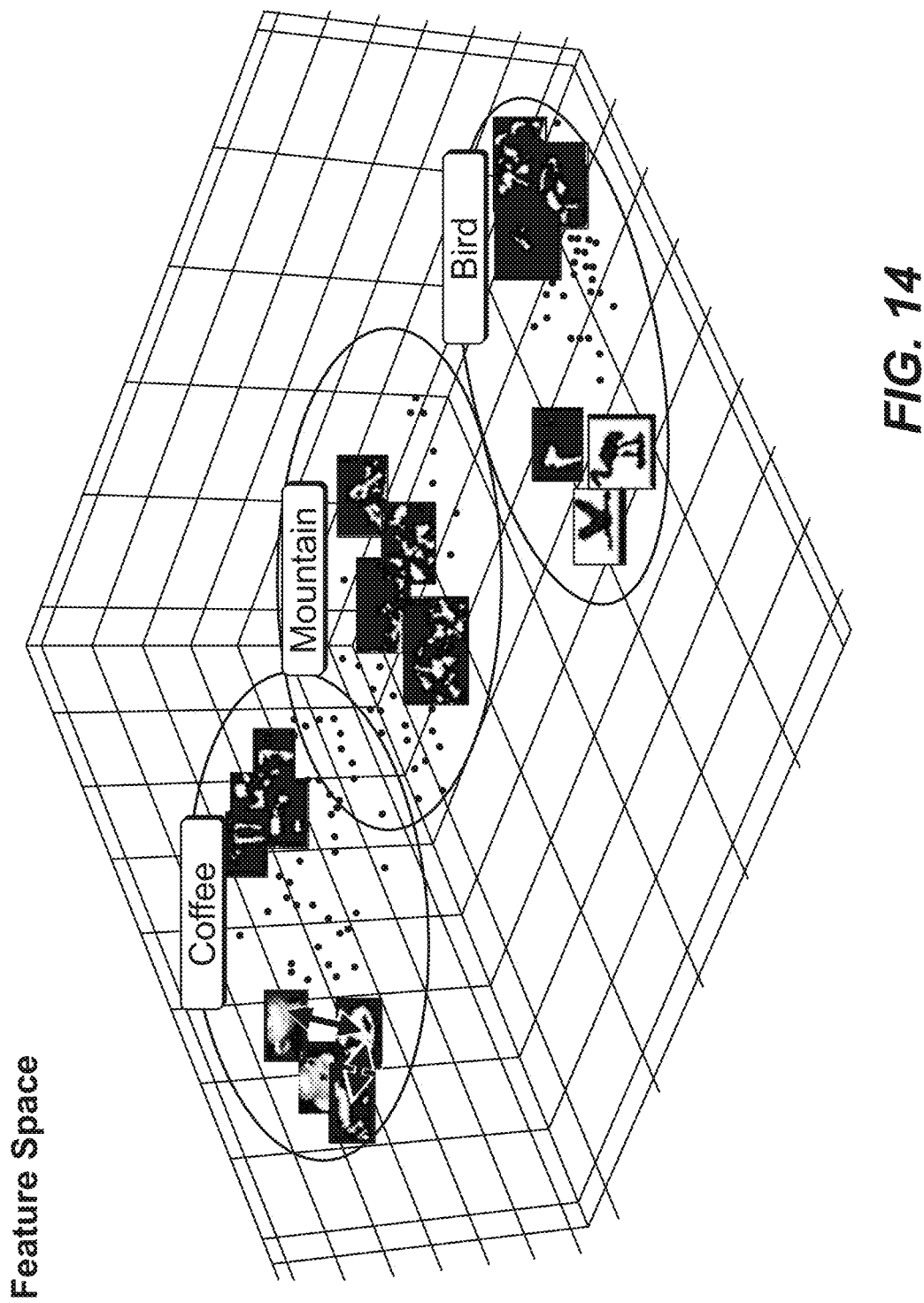
FIG. 14 is an illustrative vector space populated with feature vectors, in accordance with certain embodiments of the present disclosure.

In step 1208, the feature vector generated in step 1206 may be compared to the compatible feature vector space 430 (or spaces 430a-n) that were populated during the processes 602-608, discussed above. For example, an illustrative vector space populated with feature vectors corresponding to images is shown in FIG. 14. In this example, each dot may represent a vectorized image, and the circles (and corresponding dot colors) in FIG. 14 may indicate one of three example tags associated with the images. The image tags in this case are "Coffee," "Mountain," and "Bird," and it should be understood that these tags are not mutually-exclusive (i.e., an image may be tagged with one, two, or all three tags). Additionally, it should be understood that these tags and the layout of the multi-dimensional vector space in FIG. 14 are illustrative only. In various embodiments, there is no limit the number or type of tags that may be used, or to the number of dimensions of a vector space 430.

To perform the vector space comparison in step 1208, the content recommendation engine 425 may calculate the Euclidean distance between the feature vector generated in step 1206, and each of the other feature vectors stored in the vector space/spaces 430. Based on the distances calculated, the content recommendation engine 425 may rank feature vectors in ascending order of feature space distance, so that the smaller the distance between the two feature vectors, the higher the rank. Such techniques may allow the content recommendation engine 425 to determine a set of highest ranking feature vectors within the vector space(s) 430, which are most similar in features/characteristics/etc. to the feature vector generated in step 1206 based on the input received in step 1202. In some cases, a predetermined number (N) of the highest-ranking feature vectors may be selected in step 1208 (e.g., the 5 most similar articles, 10 most similar images, etc.), while in other cases all of the feature vectors satisfying a particular closeness threshold (e.g., distance between vectors<threshold(T)) may be selected.

Figure 15:
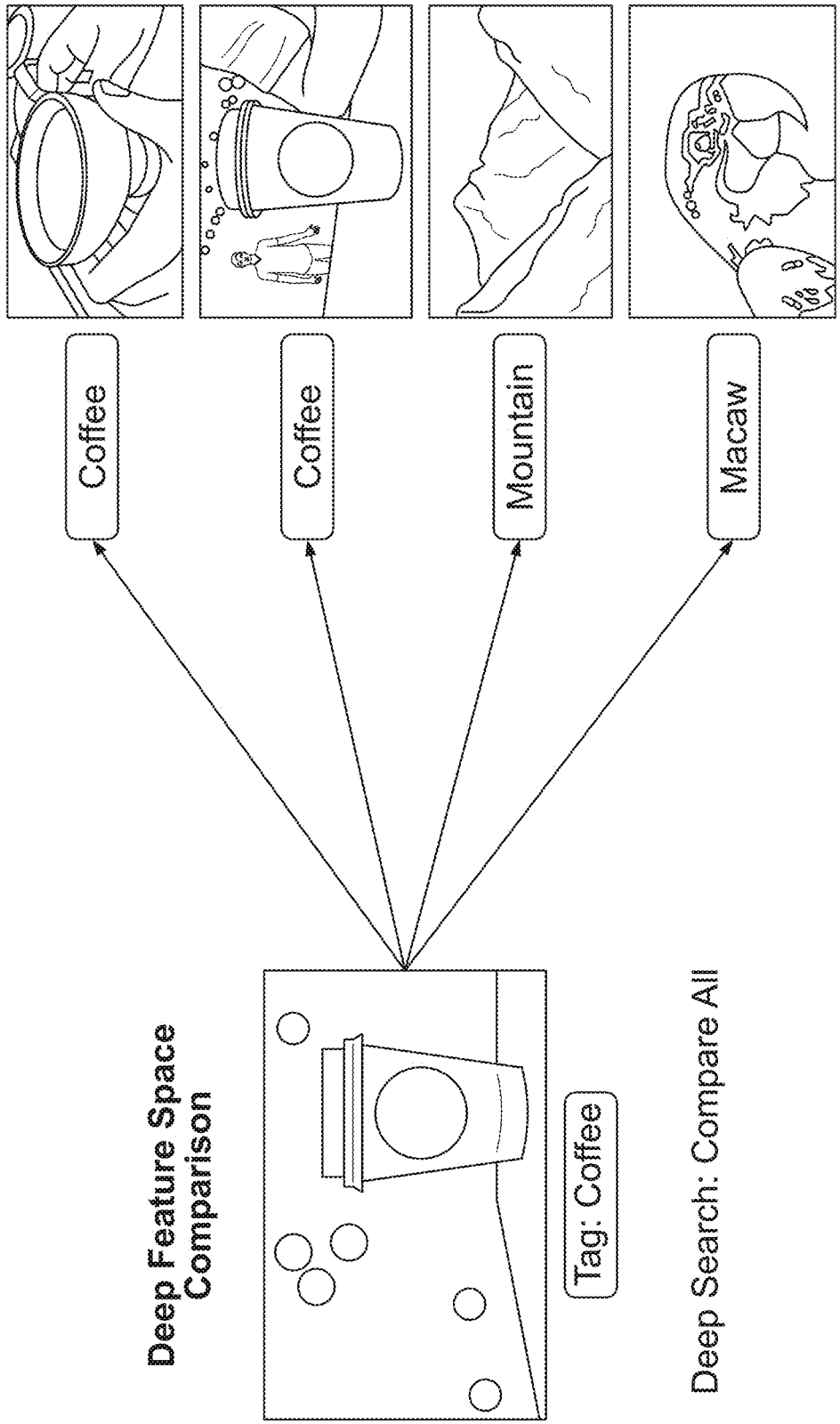
FIG. 15 is a diagram illustrating a deep feature space vector comparison, in accordance with certain embodiments of the present disclosure.

In some embodiments, the vector comparison in step 1208 may be a "deep feature space" comparison, illustrated in FIG. 15. In these embodiments, the feature vector generated in step 1206 may be compared without respect to any tags or other metadata. In other words, in a deep feature comparison, the feature vector generated in step 1206 may be compared to every other feature stored in the vector space 430. While a deep feature comparison may be guaranteed to find the closest vectors in the vector space 430, this sort of comparison may require additional processing resources and/or additional time to return the vector results. This is especially true for large vector spaces, which may include thousands or event millions of features vectors, each of which representing a separate content object/resource stored in a content repository 440. For instance, to compute the Euclidean distance between two image feature vectors of size 1×4096 requires approximately 10,000 addition and multiplication instructions to be performed by the system 400. Thus, if there are 10,000 images in the repository, 10,000,000 operations must be performed.

Figure 16:
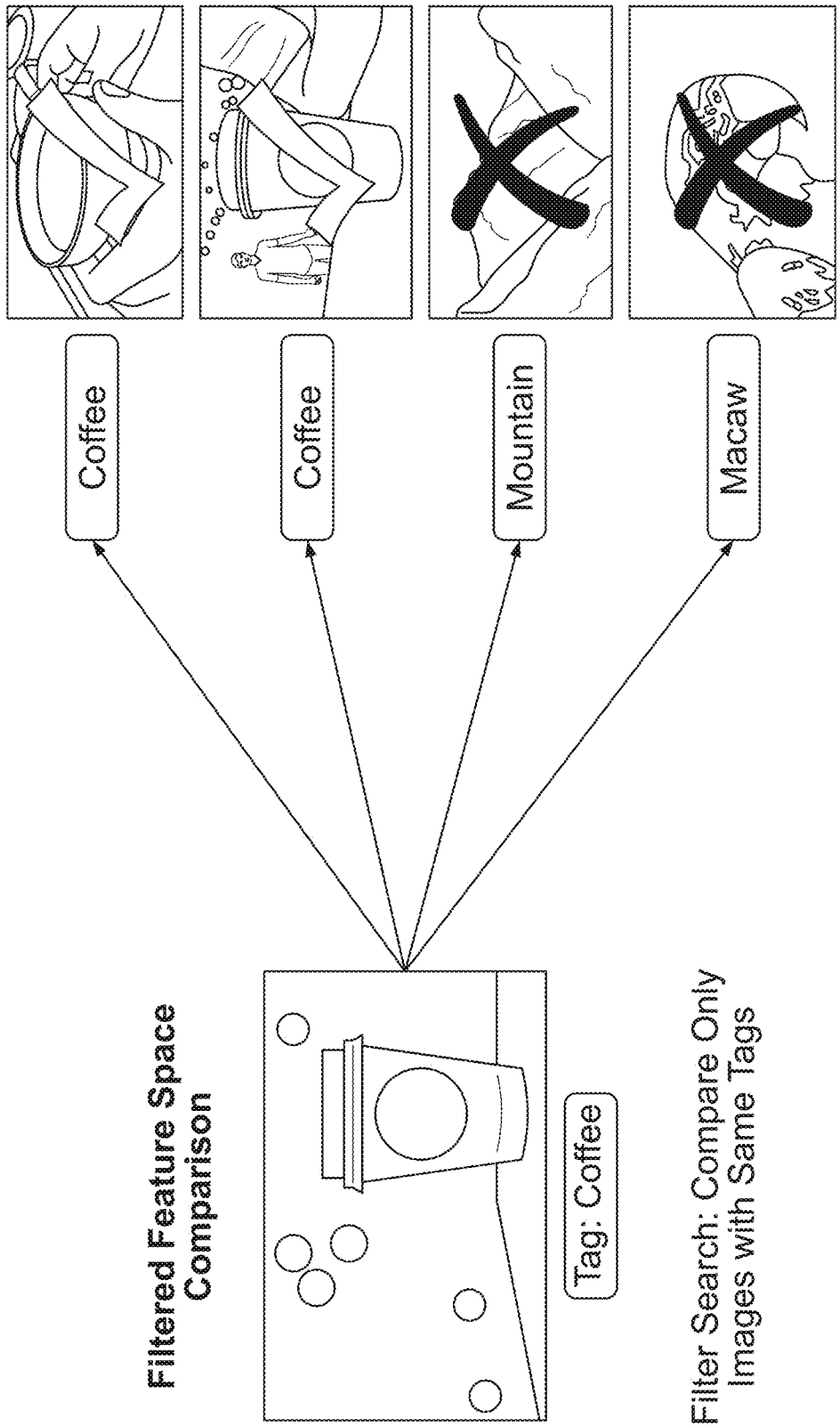
FIGS. 16-17 are diagrams illustrating a filtered feature space vector comparison, in accordance with certain embodiments of the present disclosure.
Figure 17:
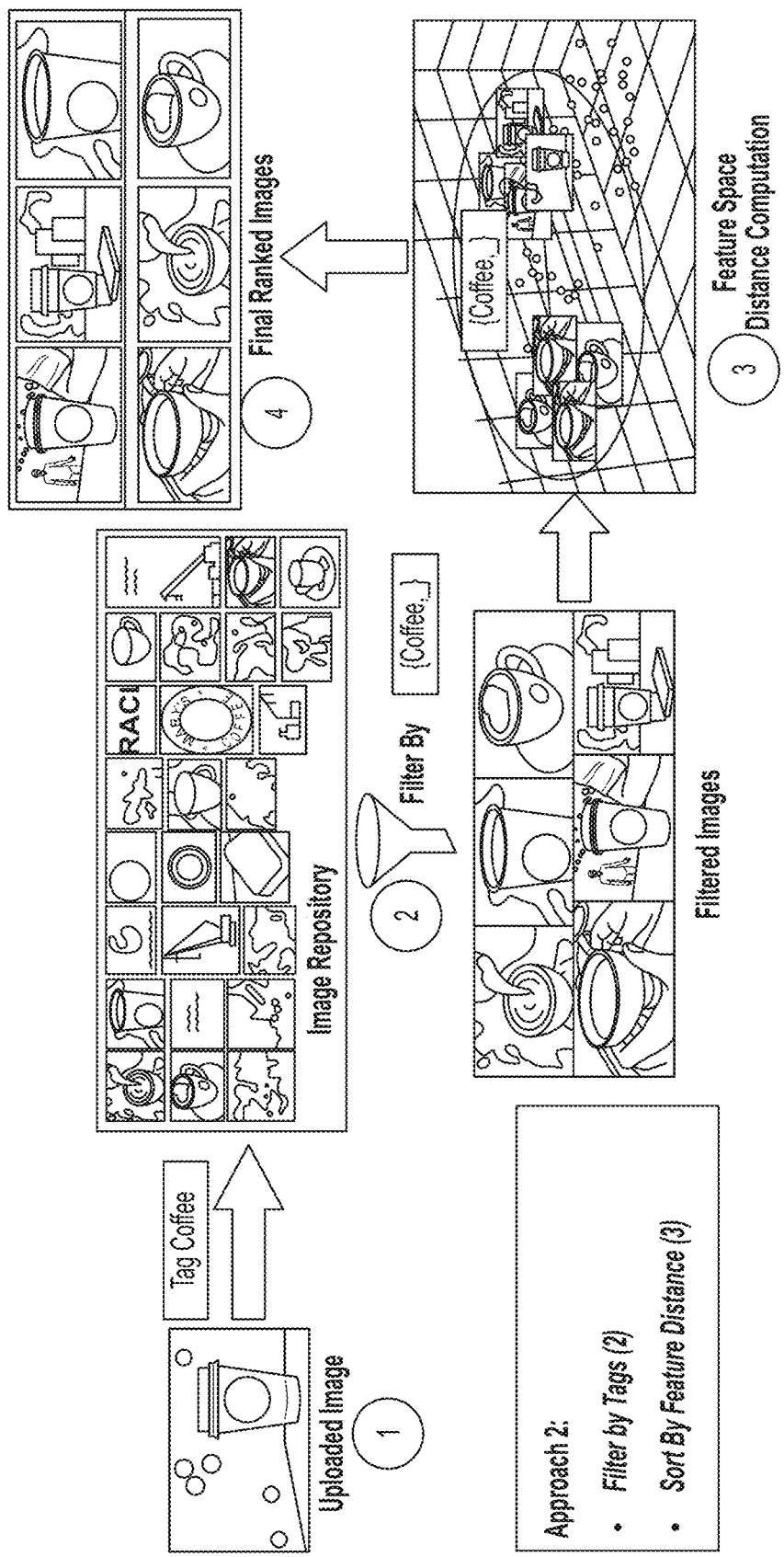

Accordingly, in other embodiments, the vector comparison in step 1208 may be a "filtered feature space" comparison, illustrated in FIGS. 16-17. In filtered feature space comparisons, the vector space may first be filtered based on tags (and/or other properties, such as resource media type, creation date, etc.), to identify subset of the feature vectors within the vector space(s) 430 having tags (and/or other properties) that match those of the feature vector generated in step 1206. Then, the feature vector generated in step 1206 may be compared to only those feature vectors in the subset having matching tags/properties. Accordingly, a filtered feature space comparison may be executed faster and more efficiently than a deep space comparison, although the possibility exists of missing close feature vectors that are filtered out and not compared.

Figure 18:
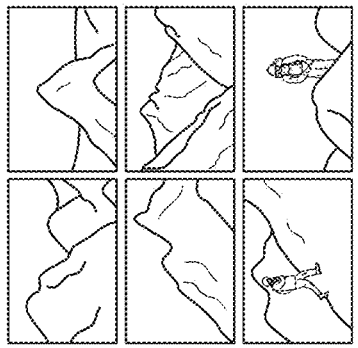
FIG. 18 is a diagram representing a process of receiving and processing text input to identify related images or articles, in accordance with certain embodiments of the present disclosure.

As noted above, step 1208 may include a comparison of the feature vector generated in step 1206 to a single vector space, or to multiple vector spaces. In some embodiments, the feature vector generated in step 1206 may be compared to the corresponding type of vector space. For instance, when text input is received in step 1202, the resulting feature vector may be compared to the vectors within the topic vector space 430a, and when an image is received as input in step 1202, the resulting feature vector may be compared to the vectors within the image vector space 430b, and so on. In some embodiments, it may be possible to compare feature vectors corresponding to one type of input, to vector spaces contain different types of vectors (e.g., identifying the image resources most closely related to a text-based input, or vice versa). For instance, FIG. 18 represents a process of receiving text input in step 1402, and in step 1408 retrieving both similar images (e.g., the closest-to from an image vector space 430b) and similar articles (e.g., the closest-to from a topic vector space 430a).

Figure 19:
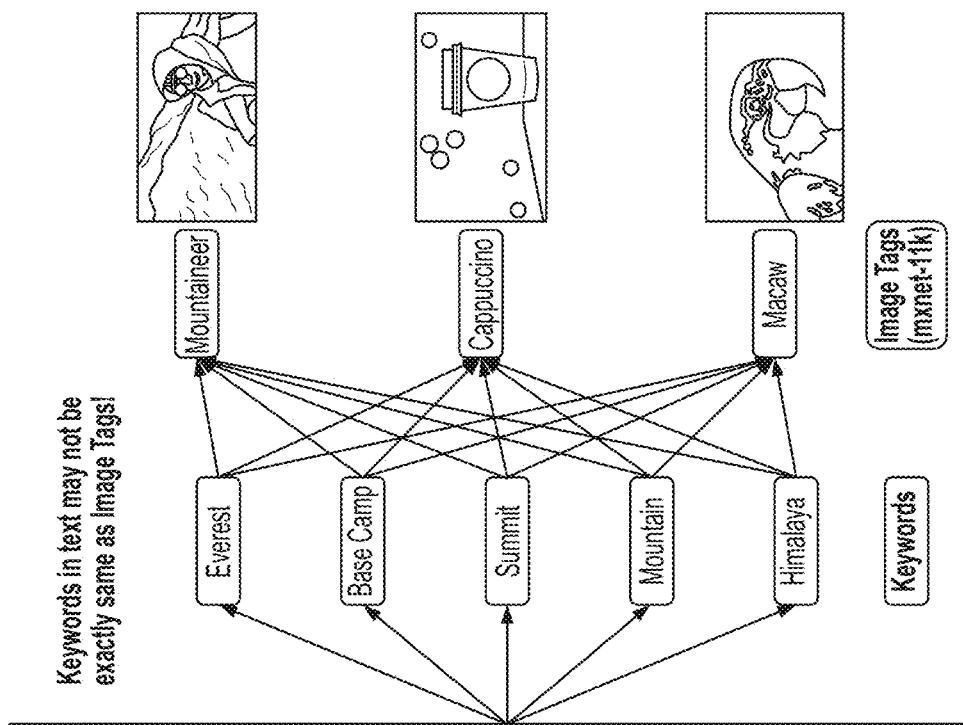
FIG. 19 is an example diagram illustrating a comparison of extracted keywords to image tags, in accordance with certain embodiments of the present disclosure.
Figure 20:
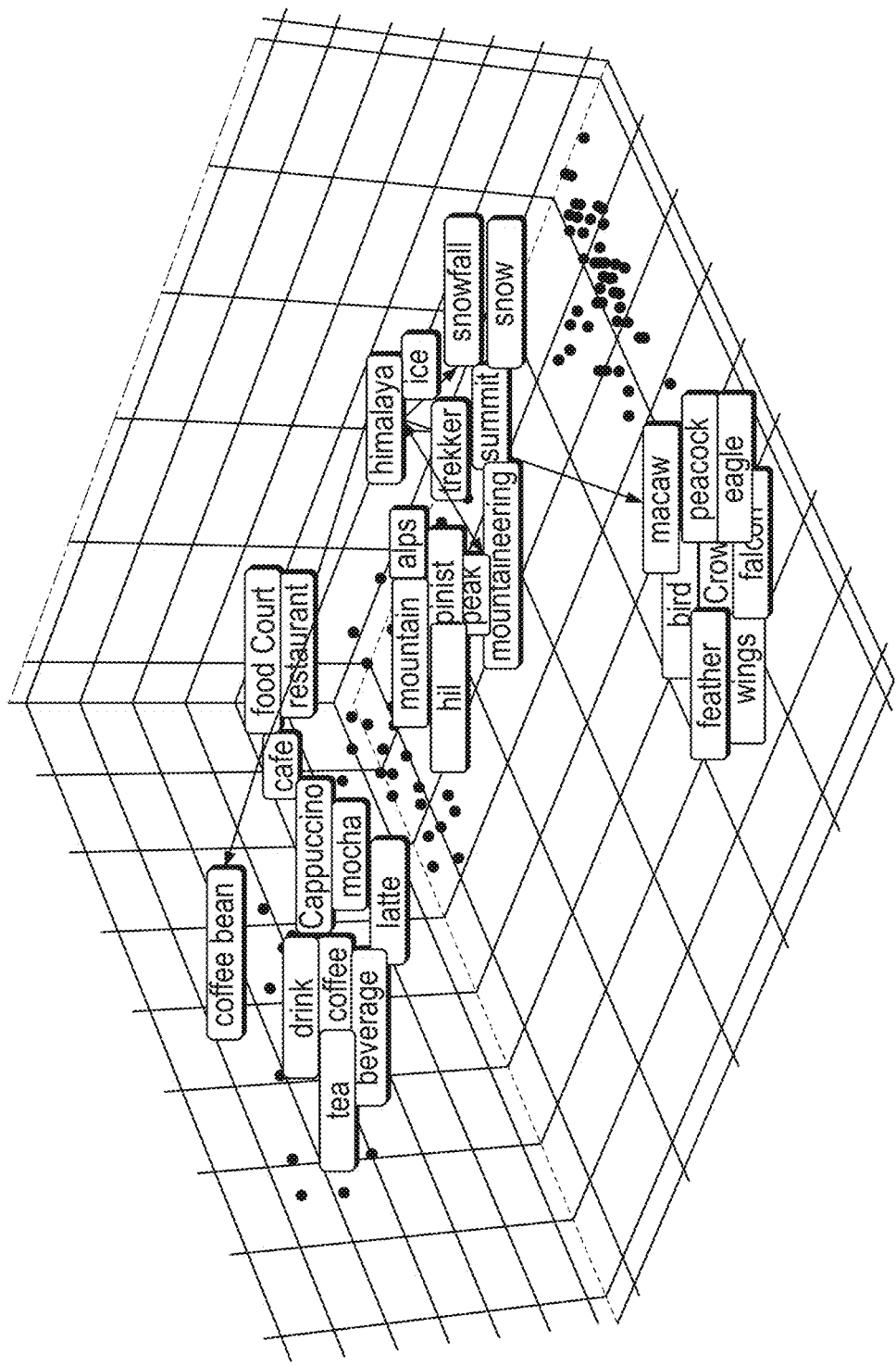
FIG. 20 is an example of a keyword analysis within a 3D word vector space, in accordance with certain embodiments of the present disclosure.
Figure 21:
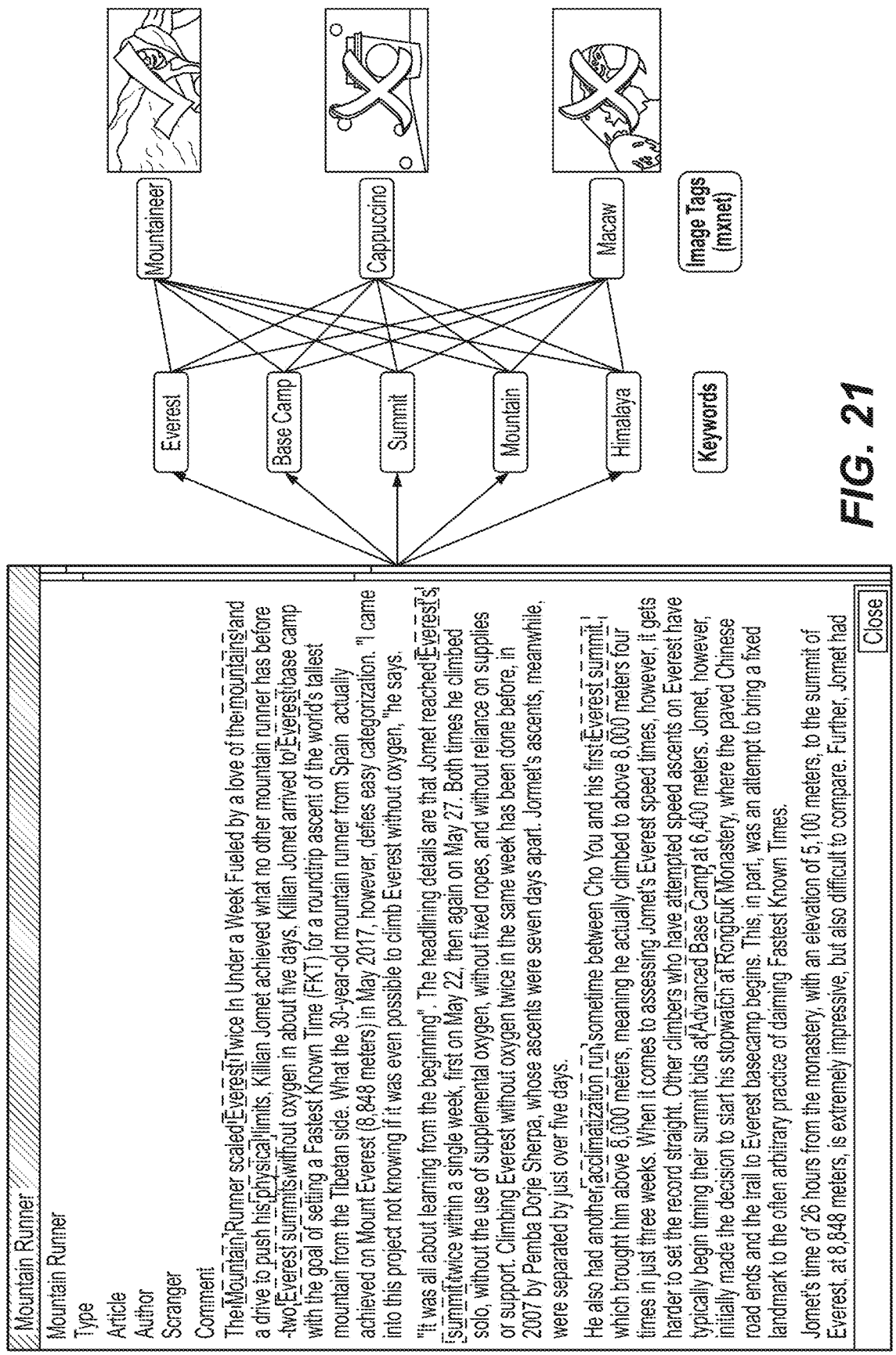
FIG. 21 is a diagram illustrating a keyword-to-tag vector space analysis, in accordance with certain embodiments of the present disclosure.

For embodiments that involve retrieving and/or comparing tags associated with content resources, a problem may arise when the tags of one resource are related but do not exactly match the corresponding tags/keywords/characteristics of another resource. An example of this potential problem is illustrated in FIG. 19, where the keywords extracted from an original authored text content resource are compared to a set of image tags stored for a set of image content resources. In this example, none of the extracted keywords ("Everest," "Base Camp," "Summit," "Mountain," or "Himalaya") are exact matches for the image tags ("Mountaineer," "Cappuccino," or "Macaw"). In some embodiments, word/phrase parsing and processing techniques such as word stemming, word definition and/or synonym retrieval and analysis, etc., may be used to detect matches among related but non-matching terms. However, these techniques also may fail, even for related keywords/tags. Therefore, in some embodiments, the content input processing/analysis service 420 and/or content recommendation engine 425 may perform a word vector comparison to address this problem. As illustrated in the example shown of FIG. 20, the keywords extracted from the text document in FIG. 19 may be analyzed within a 3D word vector space, and the distance between those keywords and each of the image tags may be computed. As shown in FIG. 21, the keyword-to-tag vector space analysis performed in FIG. 20 may determine that the image tag "Mountaineer" sufficiently close within the word vector space to the extracted keywords, and thus should be considered as an image tag match for the filtered feature space comparison.

Figure 22:
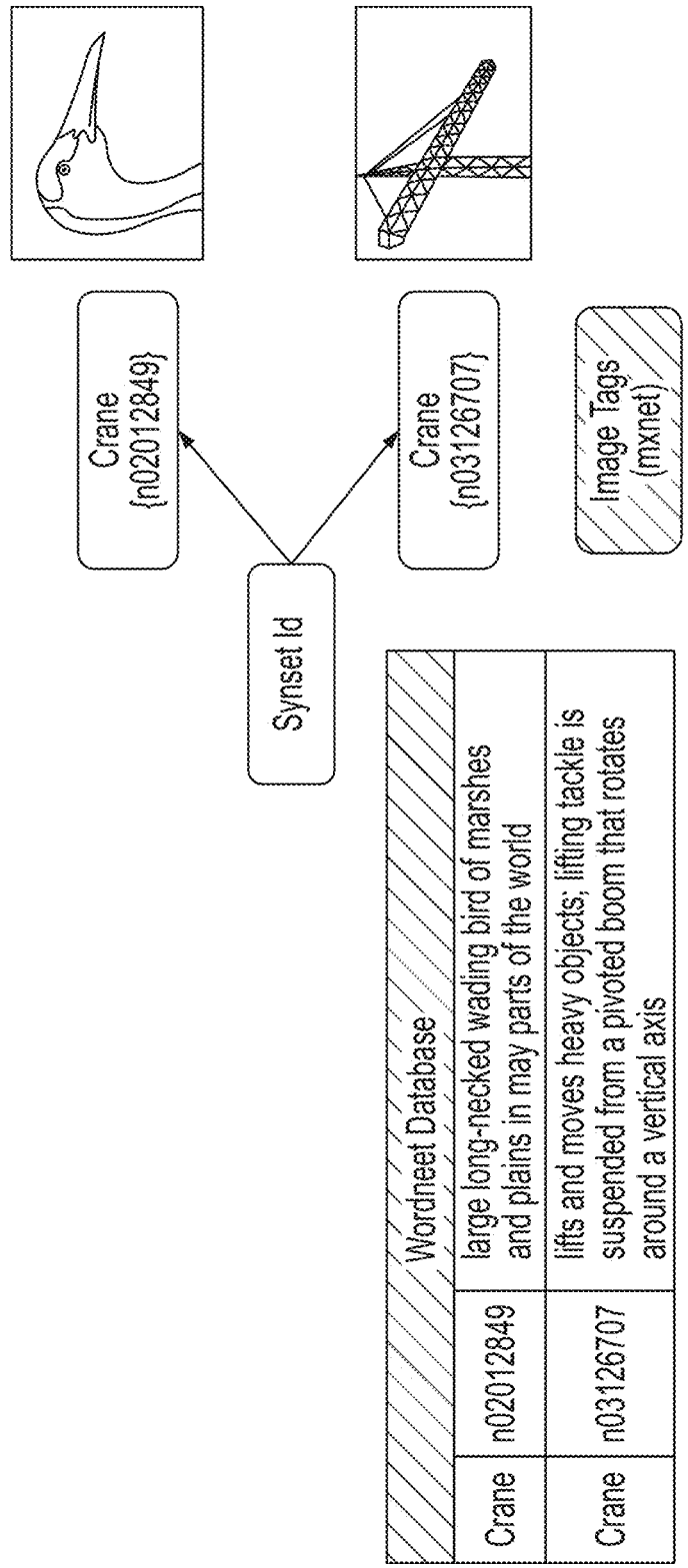
FIG. 22 is a diagram illustrating an example of homonym image tags, in accordance with certain embodiments of the present disclosure.
Figure 23:
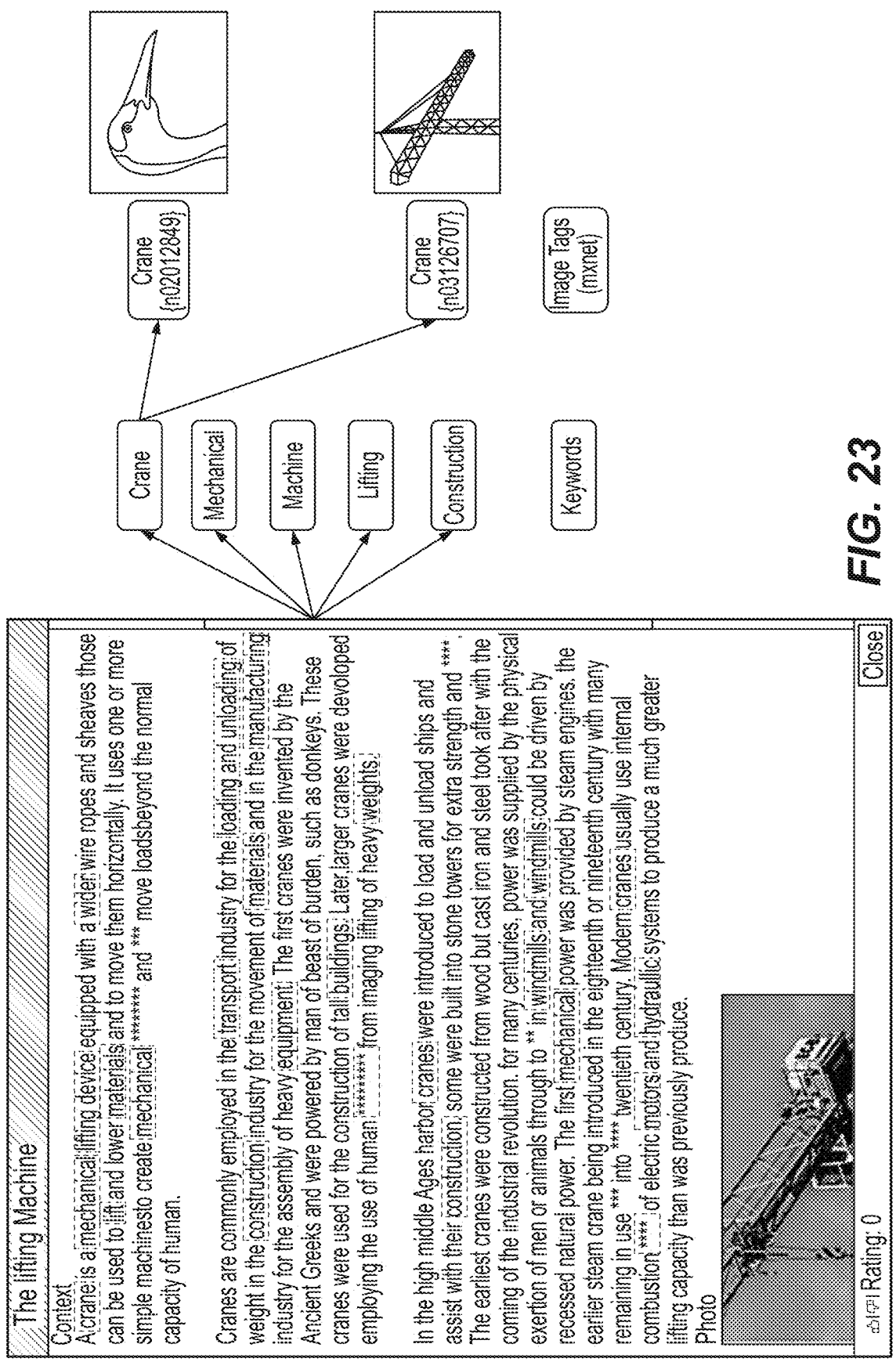
FIGS. 23-24 are diagrams illustrating an example disambiguation process, in accordance with certain embodiments of the present disclosure.
Figure 24:
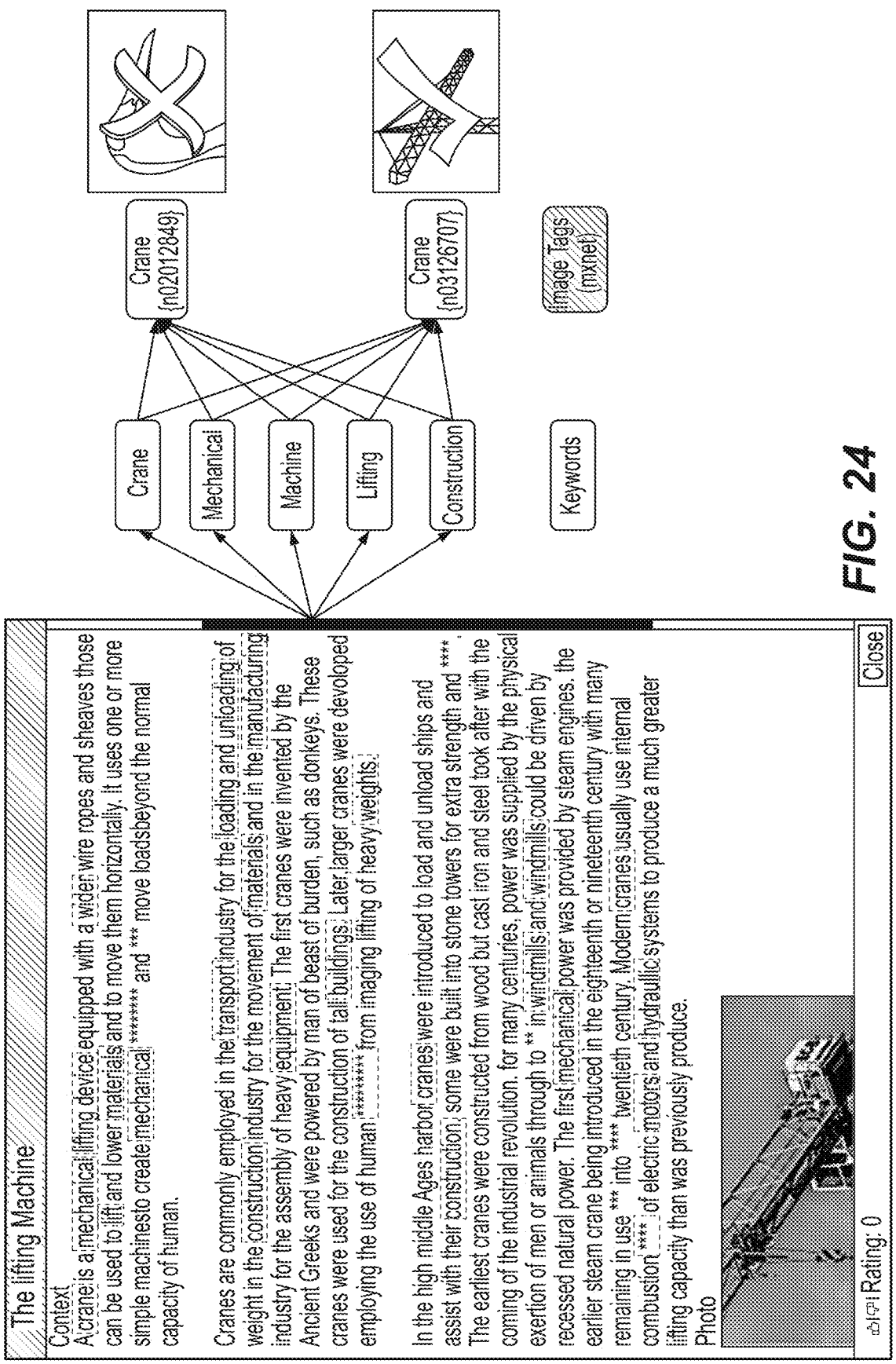
Figure 25:
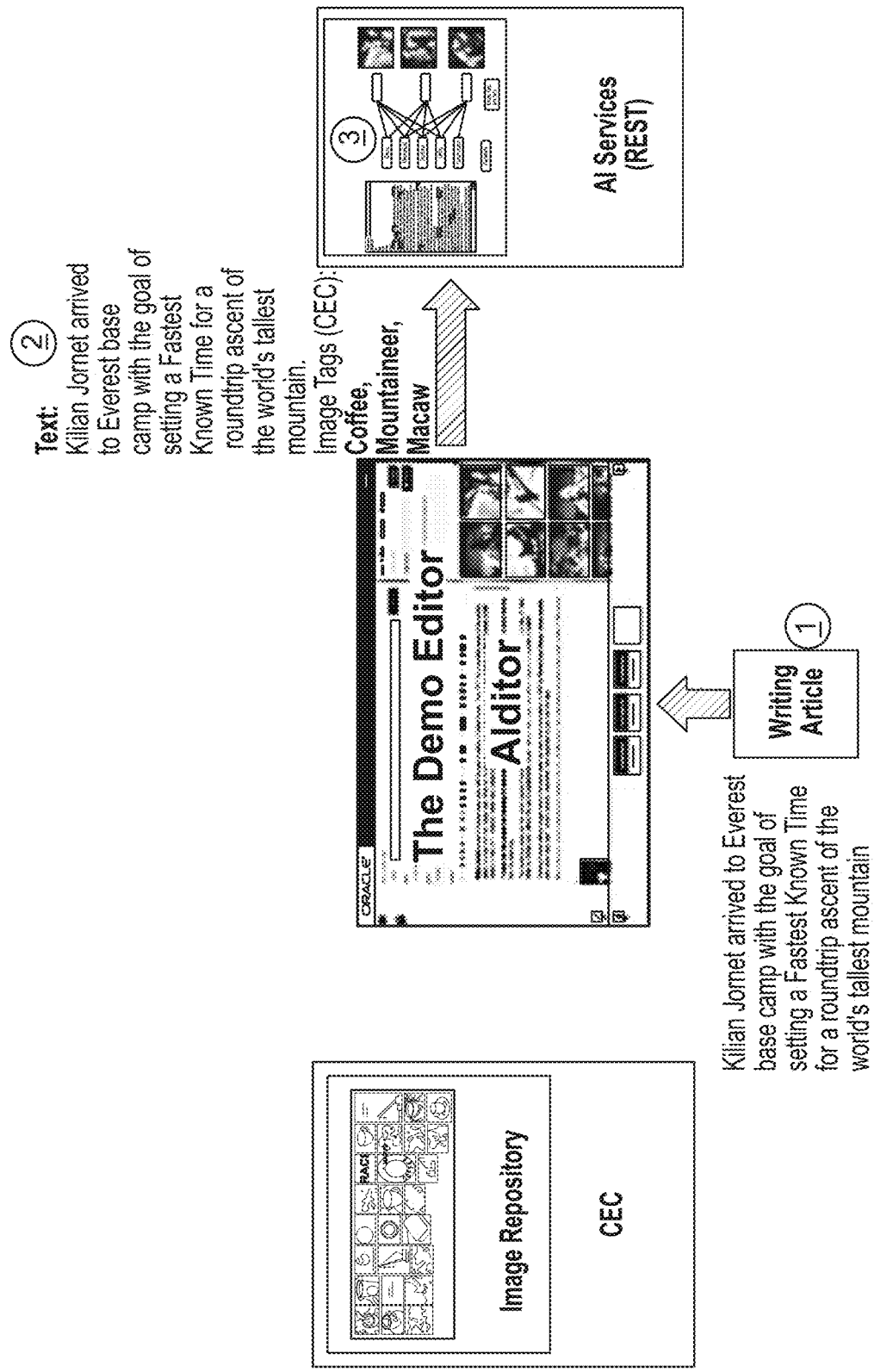
FIGS. 25-28 are diagrams illustrating a process of comparing feature vectors and identifying related content within a content repository, in accordance with certain embodiments of the present disclosure.

Another potential problem that may arise in embodiments of retrieving and/or comparing tags associated with content resources, is caused by homographic keywords and/or resource tags. A homographic word or phrase (or homonym) is one that has different and non-related meaning with the same spelling. An example of homonym image tags is shown in FIG. 22, where a first image is tagged with the word "Crane," meaning the long-legged and long-necked bird, and a second image tagged with the same word "Crane," meaning the machine with a projecting arm used for moving heavy objects. In this case, the content input processing/analysis service 420 and/or the content recommendation engine 425 may perform a word sense disambiguation process on the two image tags, to determine which sense of the word crane each refers to. In this example, the word sense disambiguation process may initially retrieve a Wordnet database entry (or other definition data) associated with the each tag, as shown in FIG. 22 for the two different "Crane" tags. Then, as shown in FIGS. 23-24, the other keywords within the authored document may be used, and/or the specific context of the word "Crane" within the document (e.g., description, part of speech, tense, etc.), by the content input processing/analysis service 420 and/or the content recommendation engine 425 to determine the most likely meaning of the word crane within the authored text document, and thus which of the "Crane" image tags is related to the authored text document. In other examples, a similar disambiguation process may be performed using image similarity. For instance, the content input processing/analysis service 420 and/or the content recommendation engine 425 may identify common image features between the images associated with the authored content (e.g., drawn or authored images) and the two different "Crane" images, in order to determine which crane is the appropriate related image. These disambiguation processes also may be combined in various ways, for example, comparing keywords extracted from the authored text document to the visual features extracted from the images, etc. Therefore, in an authored text document referring to a crane, the related words "boom" and "pulley" might be matched visually to the lower crane image if a boom and pulley can be visually identified within that image. Similarly, if the authored text document refers to a crane and includes the related words "beak" and "feathers," then the "crane" keyword might be matched visually to the upper crane image if a beak and feathers can be visually identified within that image.

Figure 26:
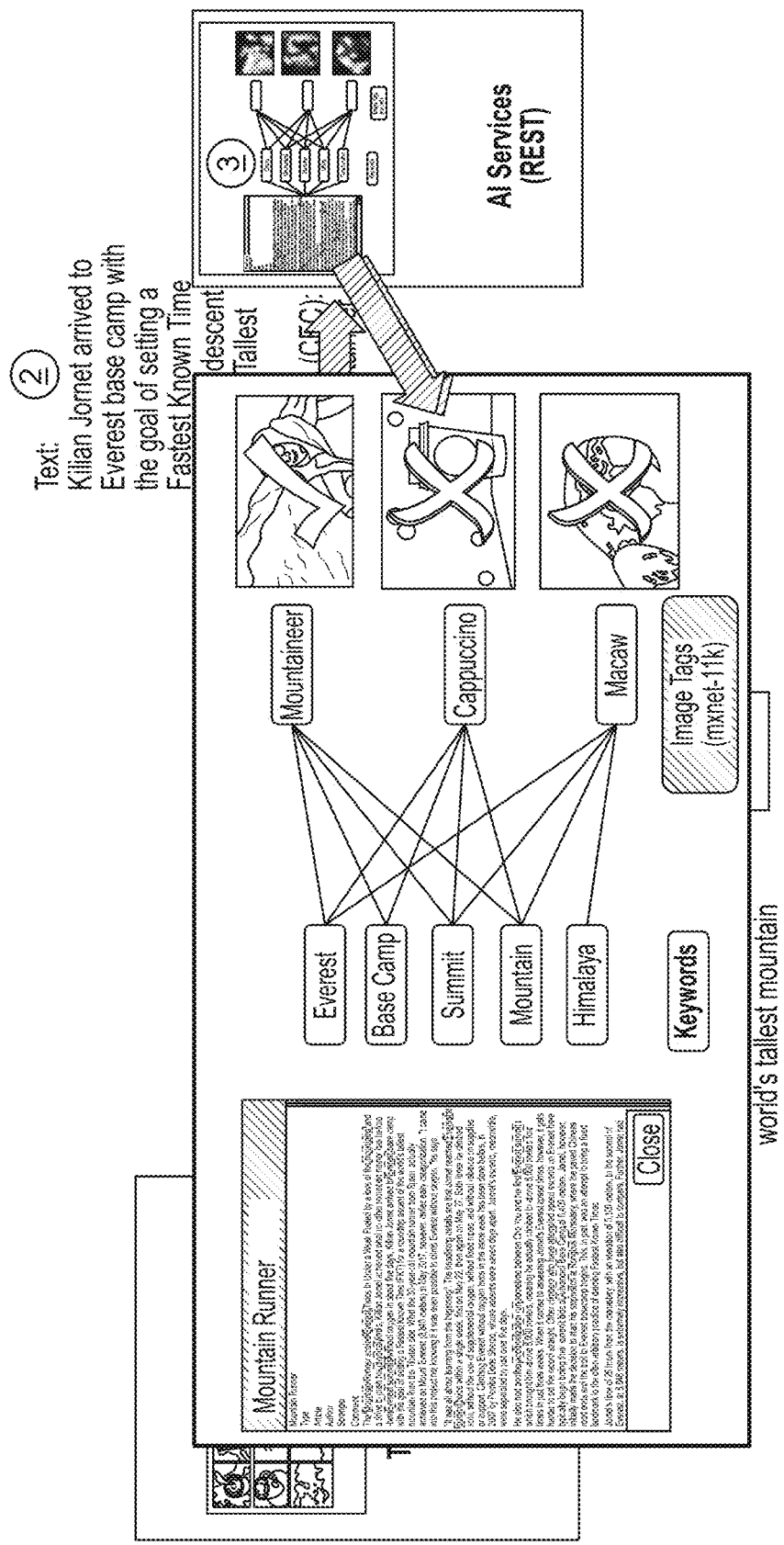
Figure 27:
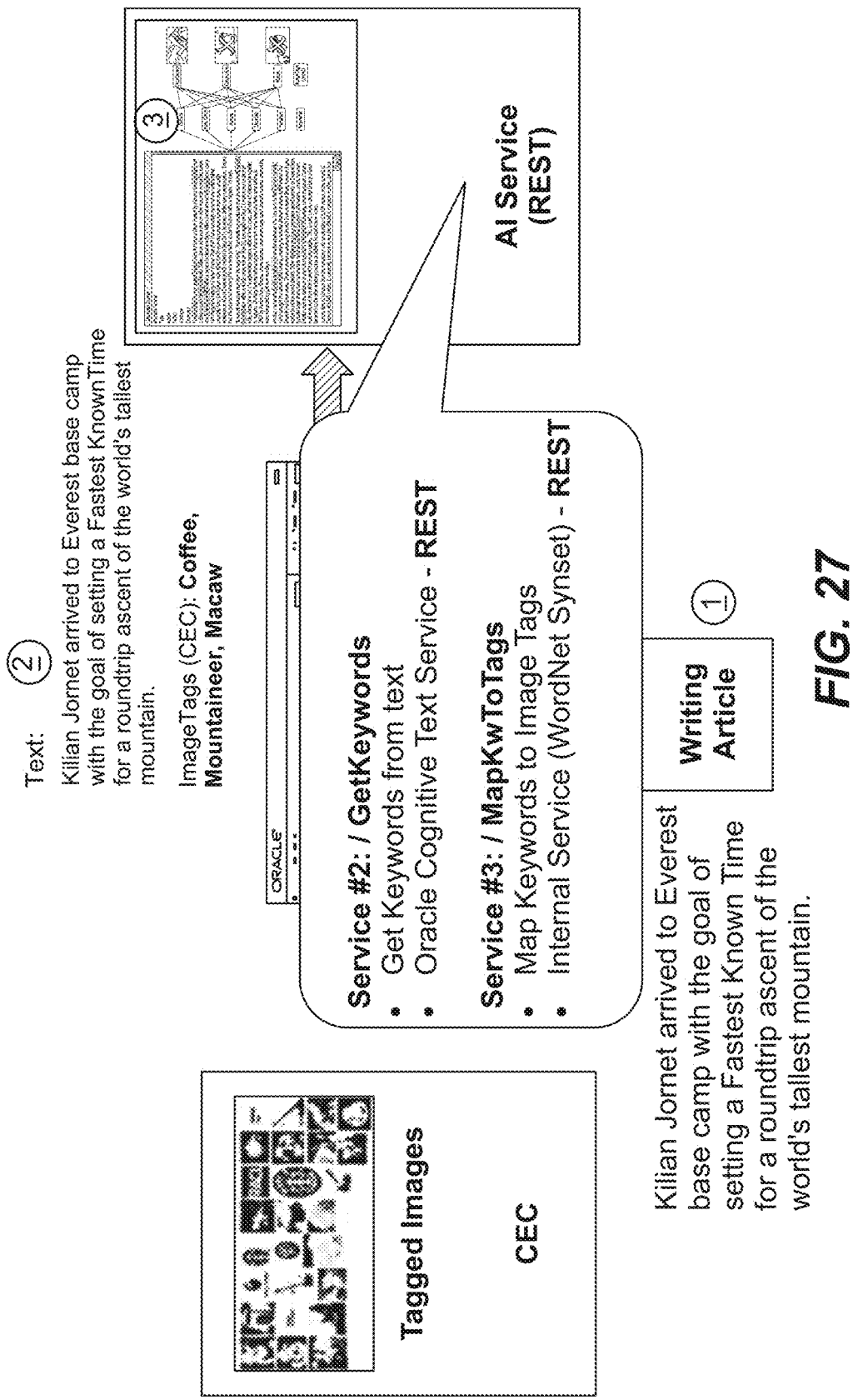
Figure 28:
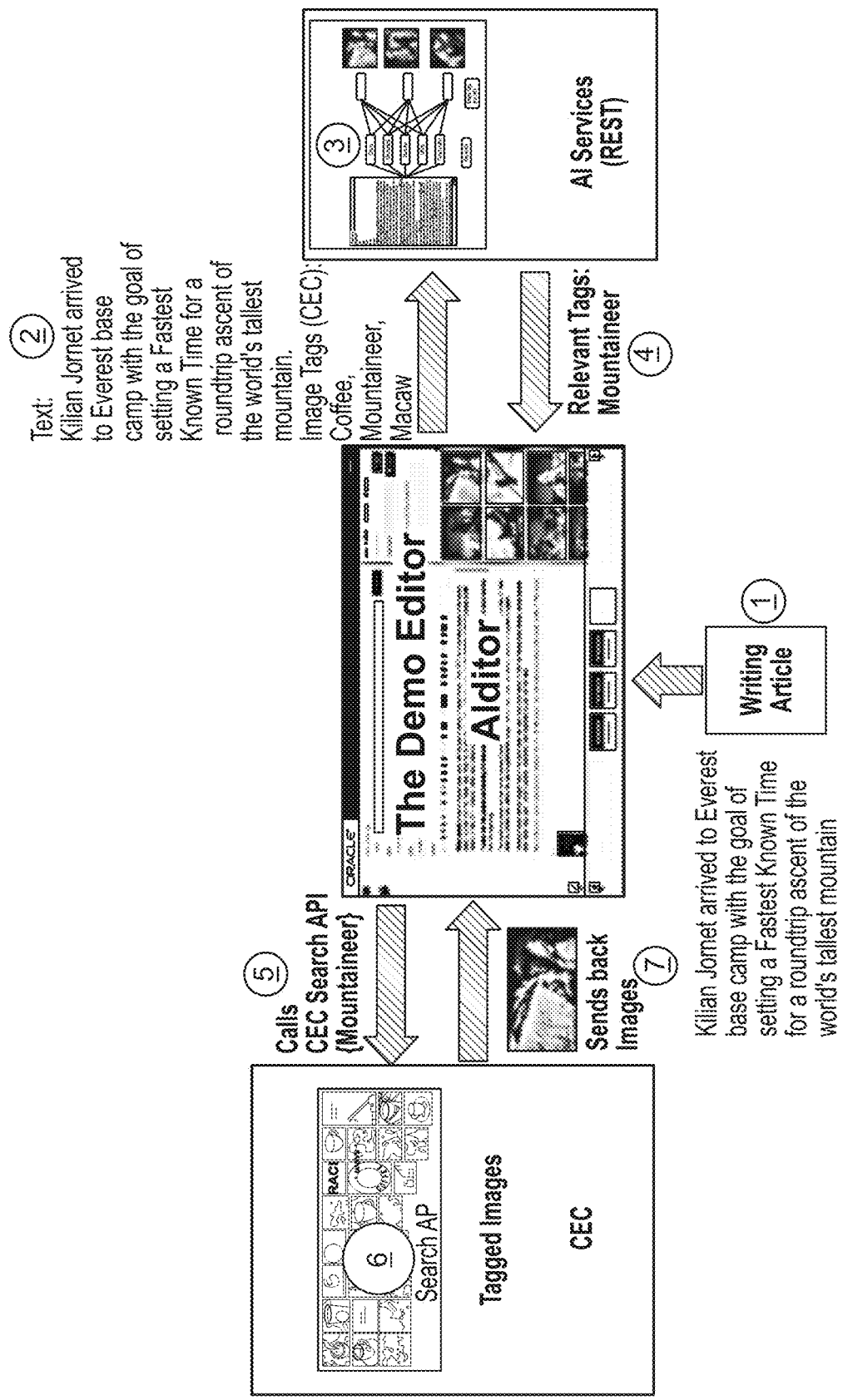

Referring now to FIGS. 25-28, an end-to-end example is shown of performing the process in FIG. 12, specifically for the embodiment retrieving a set of relevant images for an article authored by a user via the user interface 415. In Step 1 (FIG. 25), a user types the text for an article into the Demo Editor (Alditor) user interface. In Step 2, a number of keywords are extracted from the text of the article, and in Step 3 the extracted keywords are compared by an AI Rest Service to the image tags stored for a library of images within an image content repository 440. Using the techniques discussed above, an AI Rest Service identifies one or more tags (e.g., "mountaineer" as being related to the authored article, as illustrated in FIG. 26. As shown in FIG. 27, in some embodiments a combination of different software services may be used to perform this step, such as first cognitive text REST service used to determine a set of keywords from the text input, and a second internal REST service used to map the keywords to image tags. Each of these services may be implemented within the content recommendation engine 425 and/or via an external service provider. Then, in Step 5 (shown in FIG. 28), the content recommendation engine 425 may transmit the determined image tag(s) to an Oracle Content and Experience Cloud (CEC) Search API associated with an image content repository 440. In Step 6, the Search API may retrieve a set of relevant images based on the tag matching, and in Step 7 the retrieved images (or scaled-down versions of the images) may be transmitted back and embedded within to the user interface 415.

Although the example shown in FIGS. 25-28 illustrates a specific embodiment of retrieving a set of relevant images for an article authored by a user, it should be understood that the steps in FIG. 12 may be similarly executed to retrieve other types of content as well. For instance, similar steps may be performed to retrieve articles (or other text documents) related to the text input by the user via the user interface 415. Related content resources of other media types (e.g., audio files, video clips, graphics, social media posts, etc.) also may be retrieved in other embodiments. Additionally, when the user imports/creates other types of input besides text into the user interface (e.g., a drawn or uploaded image, a spoken audio input, a video input, etc.), similar steps may be executed to retrieve related content resources of various different types (e.g., related articles, images, video, audio, social media, etc.), depending on the configuration of the content recommendation engine 425 and/or the user preferences.

Figure 30:
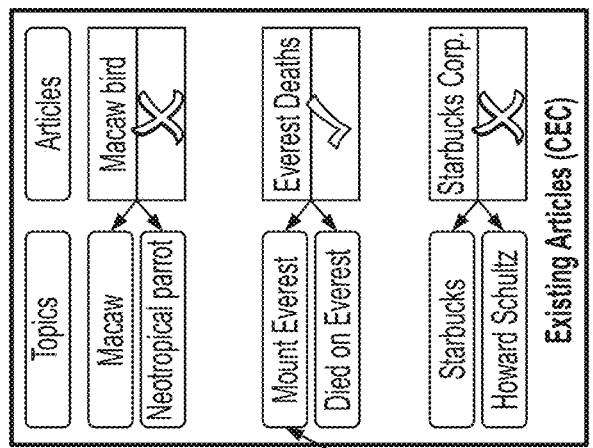
Figure 31:
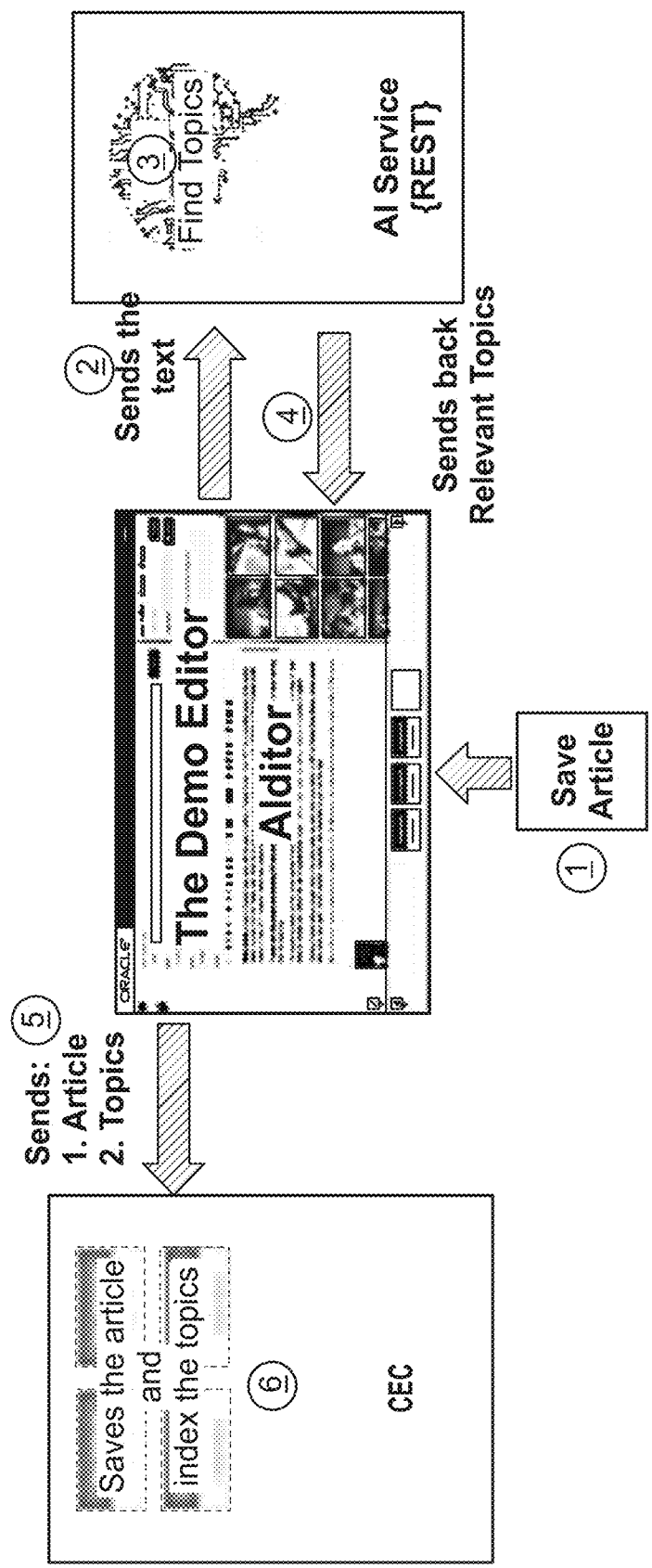
FIGS. 31-35 are diagrams illustrating a process of identifying related articles based on input text data, in accordance with certain embodiments of the present disclosure.
Figure 32:
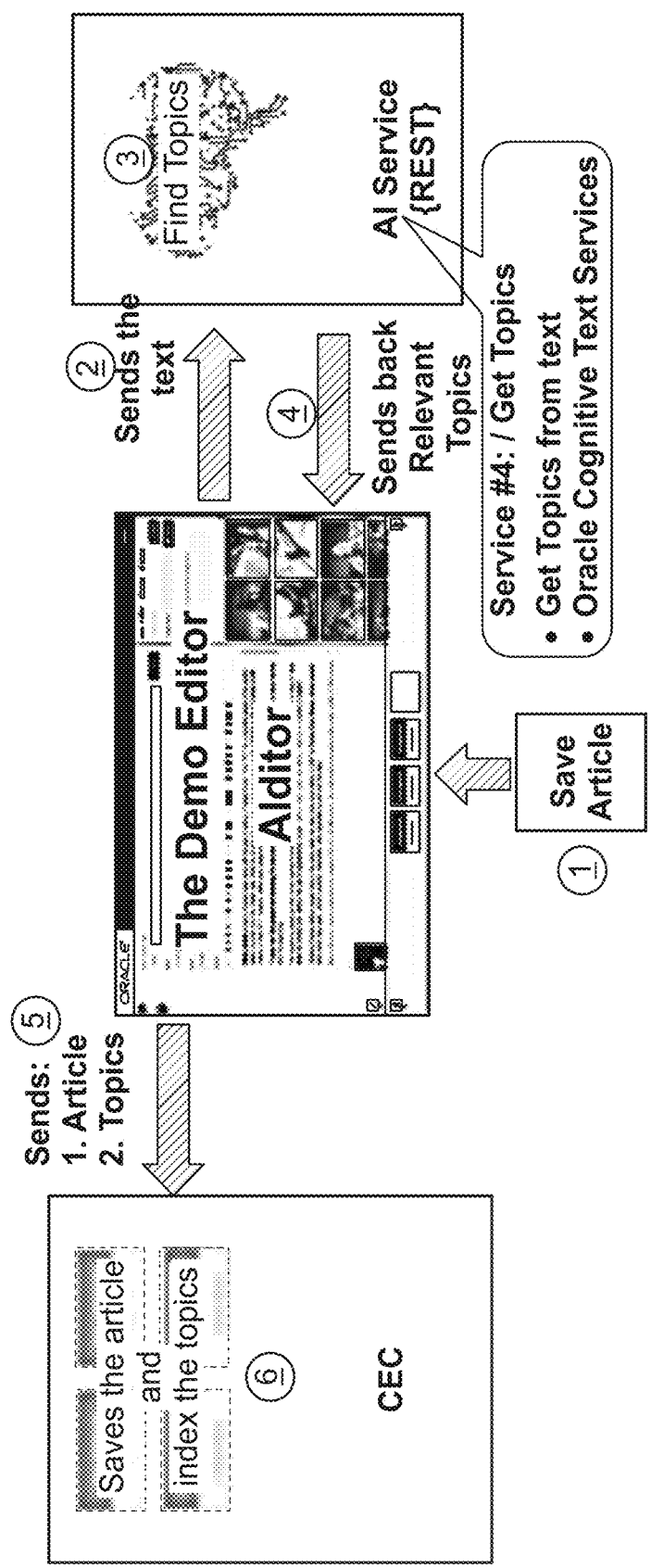
Figure 33:
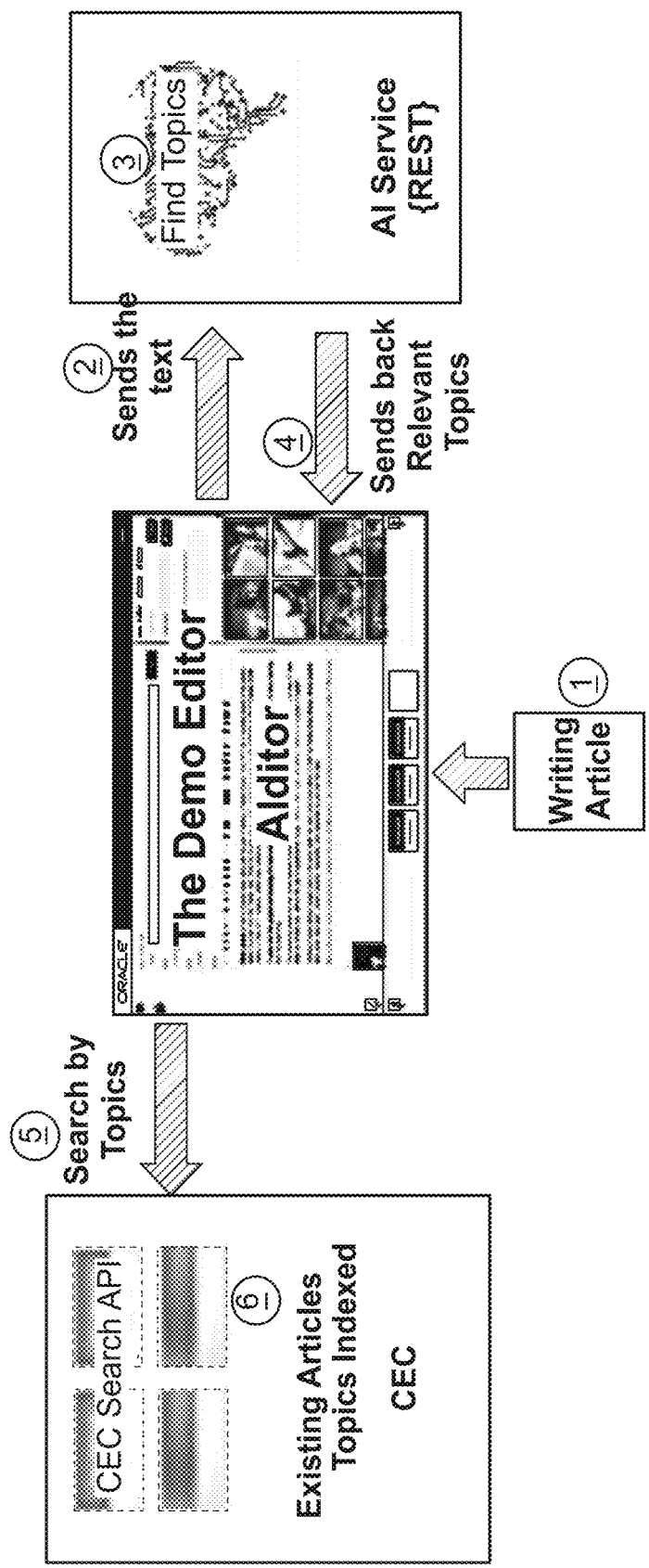
Figure 34:
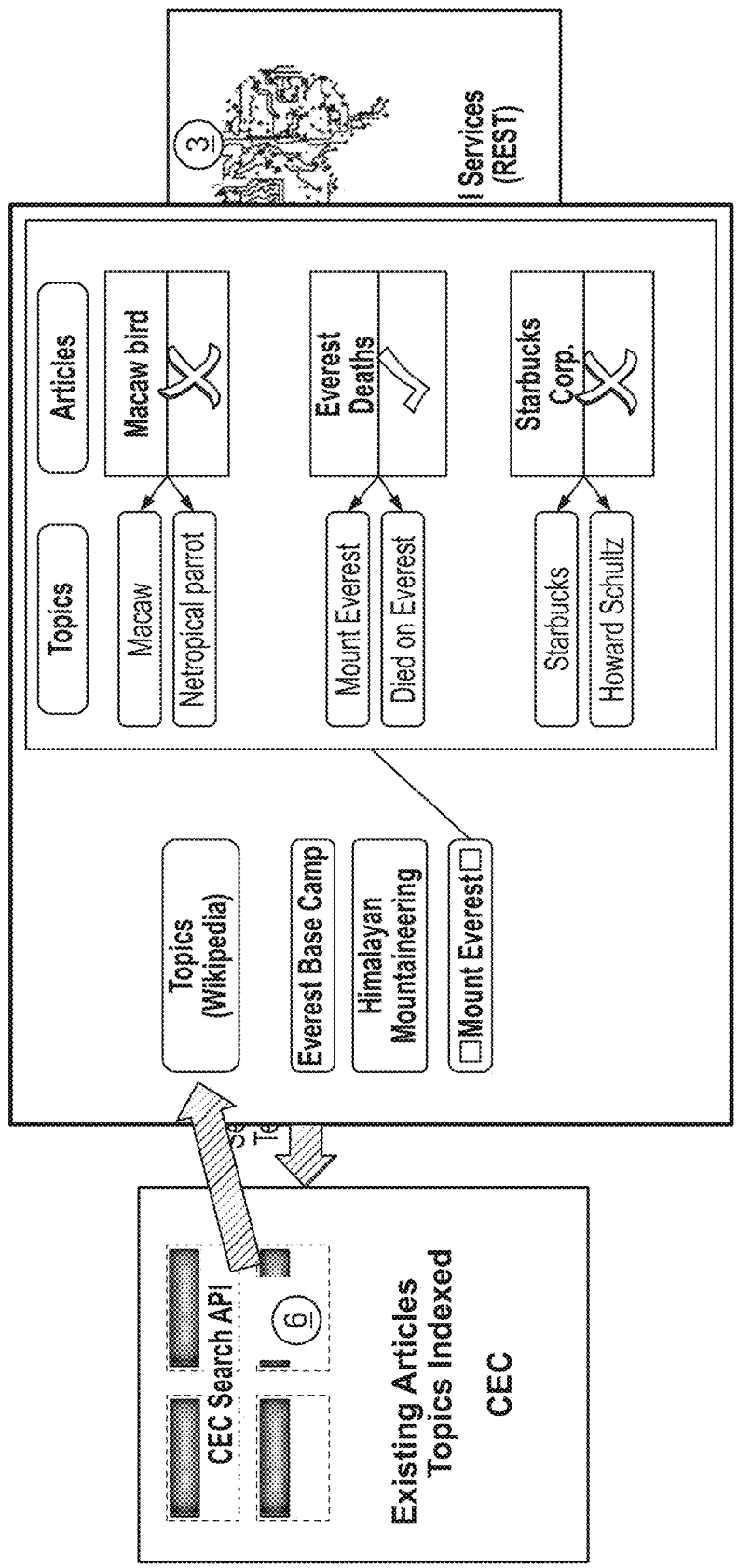
Figure 35:
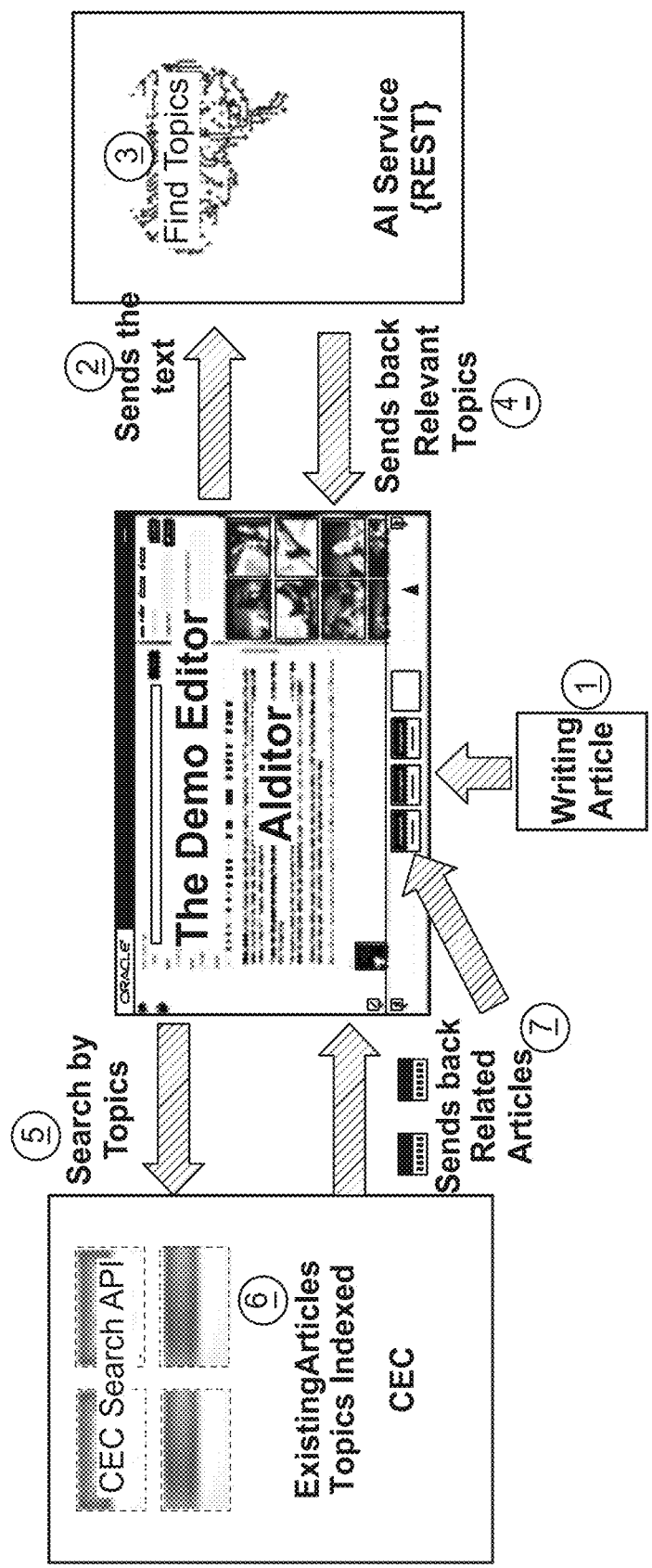

For instance, referring now to FIGS. 29-35, another example embodiment is shown in which the process steps of FIG. 12 are performed to retrieve a set of related articles (or other text content resources), based on the original authored text input received via the user interface 415 (e.g., a user's blog post, email, article, etc.). As shown in FIG. 29, a user has authored a new article via the user interface 415, and a set of article topics has been identified by an AI-based REST service invoked by the content recommendation engine 425. As shown in FIG. 30, the identified article topics may be compared to the topics previously-identified for a set of articles in an article content repository 440. Thus, the article topics may be determined and stored as metadata or other associated data objects, using similar techniques to the processes described above in FIG. 6), in which image features/tags were determined and stored associated with images. Similarly, an article content repository 440 may have metadata or other associated storage including article topics, dates, keywords, authors, publications, etc., for each article stored in the article content repository 440. In the example shown in FIG. 30, an article relating to deaths on Mount Everest has been identified as potentially related to the user's newly-created article, based on matching of the article topics. FIGS. 31-35 illustrate an end-to-end process of using system 400 to find related articles to a user input article, similar to the steps shown in FIG. 25-28 for finding related images. In Step 1 (FIG. 31), a user creates a new article via the user interface 415. In Step 2, the article text is transmitted to one or software services by the content recommendation engine 425 (e.g., AI-based REST services), and in Step 3 (FIG. 32) the software service(s) use cognitive text service functionality to analyze the text of the article to determine one or more topics of the article. In Step 4, the determined article topics are transmitted back to the content recommendation engine 425, and in Step 5 the content recommendation engine 425 sends both the article text and the identified topics to a separate CEC API, where in Step 6, the article may be saved to a content repository 440 for future reference and indexed based on the identified topics. Also in Step 6 (FIG. 33), the existing content repository 440 of articles may be searched via a CEC search API to identify potentially related topics based on a topic matching process (FIG. 34). Finally, in Step 7 (FIG. 35), the articles identified as being potentially related to the newly-created article may be transmitted back (in whole, or just links) to be embedded within the user interface 415.

As illustrated in the above example of FIGS. 29-33, certain embodiments described herein may include identification of topics of newly-created text documents, and/or topics of text documents stored within content repositories 440, as well as comparisons and identifications of topic closeness and matches. In various embodiments described herein, various techniques including explicit semantic analyses may be used for text topic evaluation and topic "closeness" techniques. In some cases, such techniques may use large-scale data source (e.g., Wikipedia), to provide fine-grained semantic representation of unrestricted natural language texts, to represent meaning in a high-dimensional space of natural concepts derived from the data sources. For instance, text classification techniques may be used to explicitly represent the meaning of any text in terms of Wikipedia-based concepts. The effectiveness such techniques may be evaluated automatically by computing the degree of semantic relatedness between fragments of natural language text.

In these text classification/relatedness evaluation techniques, one advantage of using large-scale publically available knowledge sources (e.g., Wikipedia or other encyclopedias) is access to vast amounts of highly organized human knowledge pre-encoded into the publically available sources, which are in constant change/development. Machine learning techniques may be used based on Wikipedia and/or other sources to build a semantic interpreter that maps fragments of natural language text into a weighted sequence of Wikipedia concepts ordered by their relevance to the input. Input texts therefore may be represented as weighted vectors of concepts, called interpretation vectors. The meaning of a text fragment is thus interpreted in terms of its affinity with a host of Wikipedia concepts. Semantic relatedness of texts then may be computed by comparing their vectors in the space defined by the concepts, for example, using the cosine metric. Such a semantic analysis may be explicit in the sense the manifest concepts may be grounded in human cognition. Because, the user input may be received via the user interface 415 as plain text, conventional text classification algorithms may be used to rank the concepts represented by these articles according to their relevance to the given text fragment. Thus, an online encyclopedia (e.g., Wikipedia) may be used directly, without the need for deep language understanding or pre-cataloged common-sense knowledge. In some embodiments, each Wikipedia concept may be represented as an attribute vector of words that occur in the corresponding article. Entries of these vectors may be assigned weights using, for example, a term frequency-inverse document frequency (TFIDF) scheme. These weights may quantify the strength of association between words and concepts. To speed up semantic interpretation, an inverted index, which maps each word into a list of concepts in which it appears, may be used. The inverted index also may be used to discard insignificant associations between words and concepts, by removing those concepts whose weights for a given word are below a certain threshold. A semantic interpreter may be implemented as a centroid-based classifier, which may rank Wikipedia concepts by relevance, based on a received text fragment. For instance, a semantic interpreter within the content recommendation engine may receive an input text fragment T, and represent the fragment as a vector (e.g., using the TFIDF scheme). The semantic interpreter may iterate over the text words, retrieve corresponding entries from the inverted index, and merges them into a weighted vector. Entries of the weighted vector may reflect the relevance of the corresponding concepts to text T. To compute semantic relatedness of a pair of text fragments, their vectors may be compared using, e.g., the cosine metric.

In other examples, similar methods for generating features for text categorization may include supervised learning tasks, in which words occurring in the training documents may be used features. Therefore, in some examples Wikipedia concepts may be used to augment the bag of words. On the other hand, computing semantic relatedness of a pair of texts is essentially a "one-off" task, therefore, the bag of words representation may be replaced with a representation based on concepts. These and other related techniques are described in the more detail in the paper "Computing Semantic Relatedness using Wikipedia-based Explicit Semantic Analysis," by Evgeniy Gabrilovich and Shaul Markovitch, Department of Computer Science Technion— Israel Institute of Technology, which is fully incorporated by reference herein for all purposes, as well as the other related discussed therein. Using the techniques described in this paper and others, with a filtered subset of Wikipedia, for each article there may be one concept which is the title of the article. When the content recommendation engine 425 receives a text document via user interface 415, the text may first be summarized. In these cases, each unique word in the text, after the stop words are removed and the words stemmed, may be given a weight based on frequency and inverse frequency of the word in the article. Each word may then be compared to see what Wikipedia articles (concepts)] it appears in, and thus for that word the content recommendation engine 425 may create a concept vector. The concept vectors for all the words in the text document can be combined to form a weighted concept vector for the text document. The content recommendation engine 425 then may measure the similarity between each word concept vector and the text concept vector. All words above a certain threshold then may be selected as the "keywords" for the document.

Figure 36:
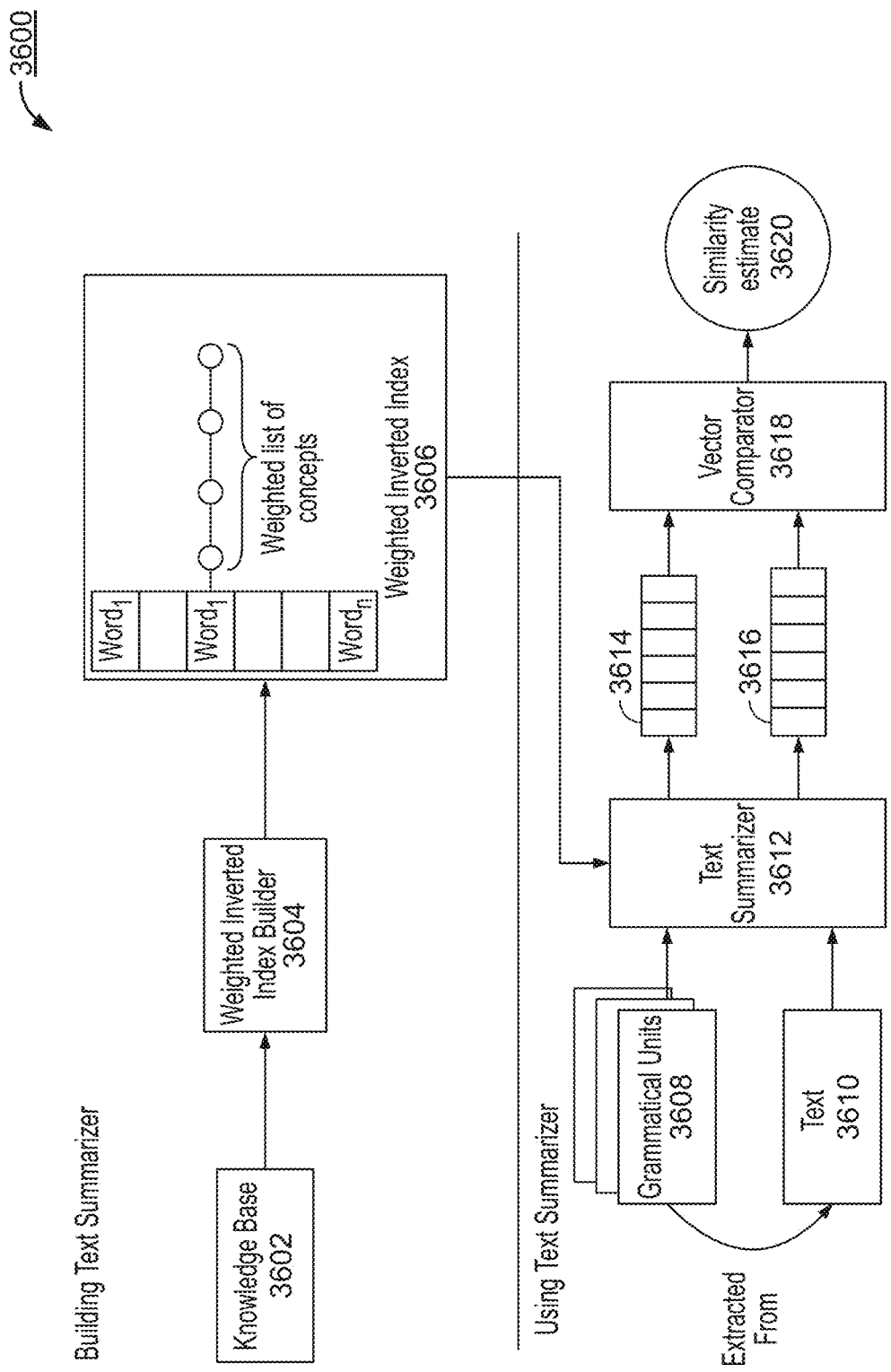
FIG. 36 is a diagram of an example semantic text analyzer system, in accordance with certain embodiments of the present disclosure.

With reference now to FIG. 36, an example semantic text analyzer system 3600 is shown, illustrating the techniques used by the analyzer system 3600 to perform semantic text summarization in certain embodiments described above. Such a system 3600 may be incorporated into and/or separate from by accessed by the content recommendation engine 425 in various implementations.

In some implementations, explicit semantic analysis for computing semantic relatedness is repurposed for computing a text summary of a given text document. More specifically, the text summary is derived based on word embeddings. In other words, the context of n-grams (e.g., words) is captured for purpose of determining semantic similarity, in contrast to typical similarity measures such as cosine on bag of words or edit distance on strings.

The given text document can be an article, a web page, or other piece text for which a text summary is desired. As with the classification approach described herein, the text is not limited to written language but may include other human-readable symbols, numbers, charts, tables, equations, formulas, etc.

The text summary approach using explicit semantic analysis operates generally as follows: (1) grammatical units (e.g., sentences or words) are extracted from the given text document using any known technique for identifying and extracting such units, (2) each of the extracted grammatical units and the text document are represented as weighted vectors of knowledge base concepts, (3) the semantic relatedness between the text document as a whole and each grammatical unit is computed using the weighted vectors, and (4) one or more of the grammatical units most semantically relatedly to the text document as a whole are selected for inclusion in a text summary of the text document.

FIG. 36 illustrates text summarization using explicit semantic analysis. First a text summarizer is built based on a knowledge base 3602. The knowledge base 3602 can be general or domain-specific. An example of a general knowledge base is a collection of encyclopedia articles such as a collection of Wikipedia articles or other encyclopedic collection of text articles. However, the knowledge base 3602 can instead be domain-specific such as a collection of text articles specific to a particular technical field such as a collection of medical, scientific, engineering, or financial articles.

Each article of the knowledge base 3602 is represented as an attribute vector of n-grams (e.g., words) that occur in the article. Entries in the attribute vector are assigned weights. For example, the weights may be used using a term frequency-inverse document frequency scoring scheme. The weights in the attribute vector for an article quantify the strength of association between the n-grams (e.g., words) of the article and the article as a concept.

In some implementations, the term frequency-inverse document frequency scoring scheme computes a weight for a given n-gram t of a given article document d as represented by the following equation:

$$\frac{(k+1)tf_{t,d}}{tf_{t,d} + k\left(1 - b + b\frac{L_d}{L_{avg}}\right)} \cdot \log \frac{M - df_t + 0.5}{df_t + 0.5}$$

Here, $tf_{t,d}$ represents the frequency of n-gram t in document d. And $df_t$ represents the document frequency of n-gram t in the knowledge base 3602. M represents the total number of documents in the training set, $L_d$ represents the length of the document d in number of terms, and $L_{avg}$ represents the average length in the training corpus, and K and b are free parameters. In some implementations, k is approximately 1.5 and b is approximately 0.75.

The preceding is one example of a term frequency-inverse document frequency scoring scheme that may be used to weight attributes of an attribute vector. Other statistical measures that reflect how important an attribute (e.g., an n-gram) is to an article in the knowledge base 3602 may be used. For example, other TF/IDF variations such as BM25F that takes anchor text into account may be used with certain types knowledge bases such as, for example, a knowledge base of web pages or other set of hyperlinked documents.

A weighted inverted index builder computer 3604 builds a weighted inverted index 3606 from the attribute vectors representing the articles of the knowledge base 3602. The weighted inverted index 3606 maps each distinct n-gram represented in the set of attribute vectors to a concept vector of concepts (articles) in which the n-gram appears. Each concept in the concept vector may be weighted according to the strength of association between the concept and the n-gram to which the concept vector is mapped by the weighted inverted index 3606. In some implementations, the index builder computer 3604 uses the inverted index 3606 to discard insignificant associations between n-grams and concepts by removing from the concept vectors those concepts whose weights for a given n-gram are below a threshold.

To generate a text summary of a given text document 3610, grammatical units 3608 are extracted from a given text document 3610 and the semantic relatedness between each grammatical unit and the given text document 3610 is computed. A number of grammatical units having a high degree of semantic relatedness to the given text document 3610 are selected for inclusion in the text summary.

The number of grammatical units that are selected for inclusion in the text summary may vary based on a variety of different factors. One approach is to select a predefined number of grammatical units. For example, the predefined number may be configured by a user of the system or learned by a machine learning process. Another approach is to select all grammatical units having a degree of semantic relatedness to the given text document 3610 that is above a predefined threshold. The predefined threshold can be configured by a user of the system or learned by a machine learning process. Yet another possible approach is determine the grammatical unit having the highest degree of semantic relatedness to the given text document 3610 and then selecting all other grammatical units where the difference in the degree of semantic relatedness to the given text document 3610 of the grammatical unit and the highest degree is below a predefined threshold. The grammatical unit having the highest degree and any other grammatical units below the predefined threshold are selected for inclusion in the text summary. Again, the predefined threshold can be configured by a user of the system or learned by a machine learning process.

In some implementations, a grammatical unit having the highest or a relatively high degree of semantic relatedness to the given text document 3610 is not always selected for inclusion in the text summary. For example, a first grammatical unit that has a lower degree of semantic relatedness to the given text document 3610 than a second grammatical unit may be selected for inclusion in the text summary and the second grammatical unit may not be selected for inclusion in the text summary if the first grammatical unit is not sufficiently dissimilar with respect to the grammatical units that have already been selected for inclusion in the text summary. The extent of a grammatical unit's dissimilarity with respect to the existing text summary can be measured in a variety of different ways such as, for example, by using lexical approach, a probabilistic approach, or a hybrid of the lexical approach and the probabilistic approach. Using a dissimilarity measure to select grammatical units for inclusion in the text summary can prevent multiple similar grammatical units from being included in the same text summary.

In some implementations, other techniques for selecting a number of grammatical units for inclusion in the text summary as a function of the units' semantic relatedness to the given text document 3610 and its dissimilarity relative to one or more of the other units may be used and may not be limited to any particular technique. For example, given a number of grammatical units with a semantic relatedness to the given text document 3610 above a threshold, the dissimilarity of each composite grammatical unit with respect to the combination of the number of grammatical units may be measured and a number of grammatical units that are most dissimilar to each other may be selected for inclusion in the text summary. As a result, the grammatical units selected for inclusion in the text summary are highly semantically related to the text document, as a whole, yet dissimilar from each other. This is a more useful text summary than one containing highly semantically related but similar grammatical units because similar grammatical units are more likely to be redundant of each other in terms of the information conveyed by the grammatical units than dissimilar grammatical units.

Another possibility is to compute a composite similarity/dissimilarity measure for grammatical units and then select grammatical units for inclusion in the text summary based on their composite scores. For example, the composite measure might be a weighted average of the semantic relatedness measure and a dissimilarity measure. For example, a possible composite measure computed as a weighted average is:

(a*Similarity)+(b*Dissimilarity)

Here, the parameter Similarity represents the semantic relatedness of a grammatical unit to the input text 3610 as a whole. For example, the parameter Similarity could be the similarity estimate 3620 computed for the grammatical unit. The parameter Dissimilarity represents a dissimilarity measure of the dissimilarity of the grammatical unit to the set of one or more grammatical units. For example, the set of one or more grammatical units can be a set of one or more grammatical units that are already selected for inclusion in the text summary. The parameter a represents the weight applied to the similarity measure in the weighted average. The parameter b represents the weight application to the dissimilarity measure in the weighted average. The composite measure effectively balances the similarity measure and the dissimilarity measure against each other. They can be balanced against each other equally (e.g., a=0.5 and b=0.5).

Alternatively, the similarity measure may be given more weight (e.g., a=0.8 and b=0.2).

A grammatical unit extracted from the given text document can be a sentence, a phrase, a paragraph, a word, an n-gram, or other grammatical unit. In the case, where the grammatical units 3608 extracted from the given text document 3610 are words or n-grams, the process may be viewed as keyword generation, as opposed to text summarization.

The text summarizer 3612 accepts a piece of text. The piece of text is the given text document 3610 or a grammatical unit thereof. The piece of text is represented as an "input" vector of weighted attributes (e.g., words or n-grams) of the piece of text. Each weight in the input vector is for a corresponding attribute (e.g., word or n-gram) identified in the piece of text and represents the strength of association between the piece of text and the corresponding attribute. For example, the weights may be calculated according to a TF-IDF scheme or the like.

In some implementations, the weight of an attribute in the input vector is computed as follows:

$$\frac{(k+1)tf_{t,d}}{tf_{t,d} + k\left(1 - b + b\frac{L_d}{L_{avg}}\right)}$$

Here, $tf_{t,d}$ is the frequency of n-gram t in the piece of text d. Parameters k, b, $L_d$, and $L_{avg}$ are as before except with respect to knowledge base 3602 instead of a classification training set. In some implementations, k is approximately 1.5 and b is approximately 0.75.

It should be noted that other weighting schemes are possible and embodiments are not limited to any particular weighting scheme when forming the input vector. Forming the input vector may also include unit length normalization such as described above with respect to the training data item vectors.

The text summarizer 3612 iterates over the non-zero weighted attributes of the input vector formed based on the piece of text, retrieves attribute vectors corresponding to the attributes from the weighted inverted index 3606, and merges the retrieved attribute vectors into a weighted vector of concepts that represents the piece of text. This weighted vector of concepts is referred to hereinafter as a "concept" vector.

The attribute vectors retrieved from the weighted inverted index 3606 corresponding to the attributes of the input vector are also each a vector of weights. However, the weights in the attribute vector quantify the strength of association between respective concepts of the knowledge base 3602 and the attribute mapped to the attribute vector by the inverted index 3606.

The text summarizer 3612 creates a concept vector for the piece of text. The concept vector is a vector of weights. Each weight in the concept vector represents the strength of association between a respective concept of the knowledge base 3602 and the piece of text. A concept weight in the concept vector is computed by the text summarizer 3612 as a sum of values, one value for each attribute non-zero weighted in the input vector. Each value for an attribute of the sum is computed as the product of (a) the weight of the attribute in the input vector and (b) the weight of the concept in the attribute vector for the attribute. Each concept weight in the concept vector reflects the relevance of the concept to the piece of text. In some implementations, the concept vector is normalized. For example, the concept vector may be normalized for unit length or concept length (e.g., like class length above).

The text summarizer 3612 may generate a concept vector 3616 for the input text document 3610 and a concept vector 3614 for each of the grammatical units 3608. The vector comparator 3618 compares a concept vector 3614 generated for a grammatical unit to the concept vector 3616 generated for the input text document 3610 using a similarity measure to generate a similarity estimate 3620. In some implementations, a cosine similarity measure is used. Implementations are not limited to any particular similarity measure and any similarity measure capable of measuring the similarity between two non-zero vectors may be used.

The similarity estimate 3620 quantifies the degree of semantic relatedness between a grammatical unit and the input text document 3610 from which the grammatical unit was extracted. For example, the similarity estimate 3620 may be a value between 1 and 0 inclusive with values closer to 1 representing a higher degree of semantic relatedness and values closer to 0 representing a lower degree of semantic relatedness.

A similarity estimate 3620 may be computed for each of the grammatical units 3608. The similarity estimates 3620 generated for the grammatical units 3608 may be used to select one or more of the grammatical units 3608 for inclusion in a text summary of the input text document 3610 (or to select one or more keywords for keyword generation for the input text document 3610).

There a variety of applications of the above technique for text summarization to provide an accurate text summary of longer text such as, for example, news stories, blog posts, journal articles, web pages, etc.

Figure 37:
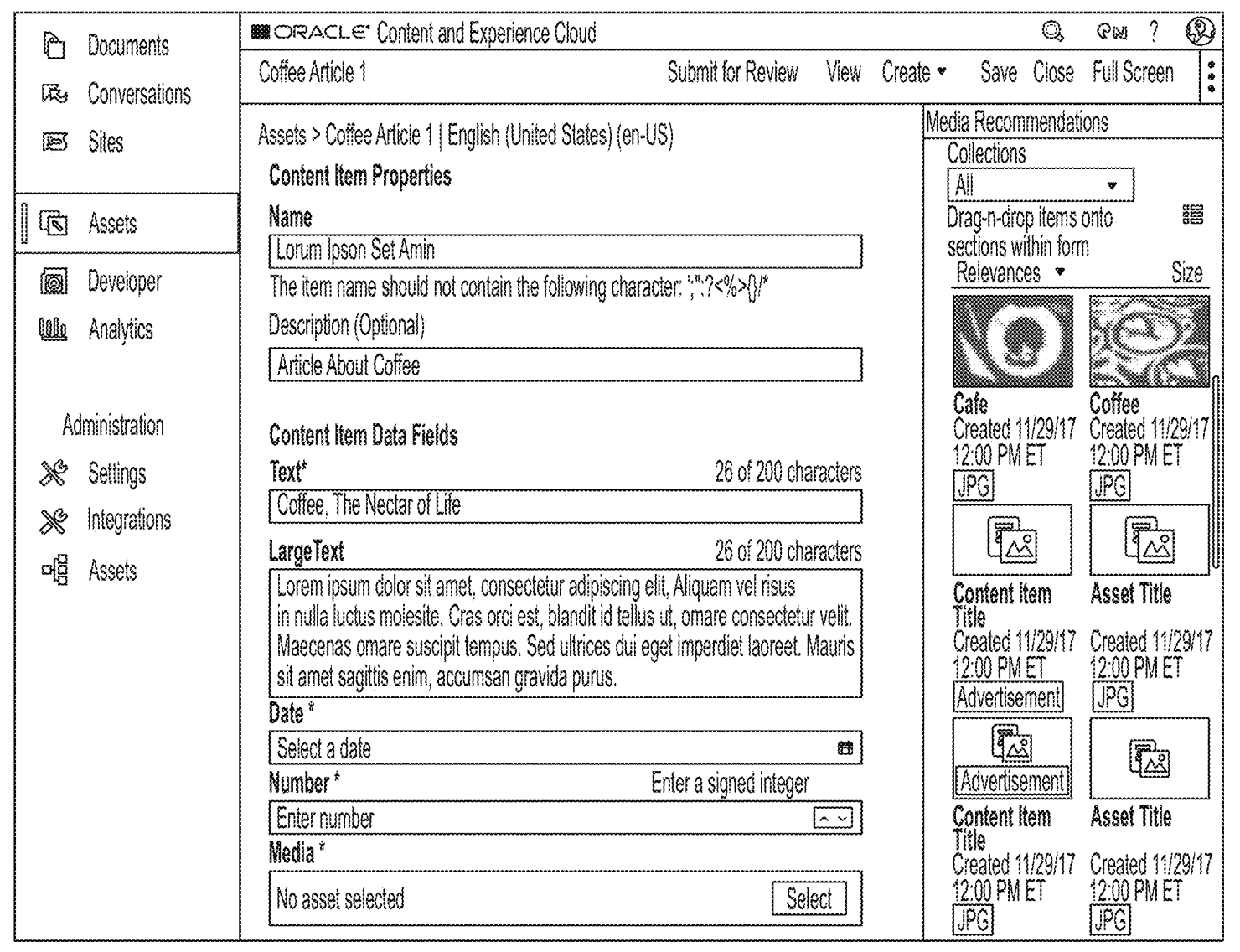
Figure 38:
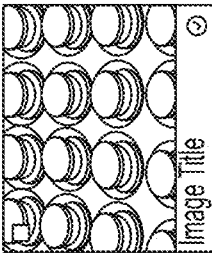

In any or all the above embodiments, after one or more content resources (e.g., images, articles, etc.) have been identified as potentially related to the content currently being created by the user via the user interface 415, the related content resources are transmitted back to the content recommendation engine 425, where they may be retrieved, modified, and embedded into the user interface 415, for example, by the content retrieval/embedding component 445. Using the content retrieval/embedding component 445, the potentially related content resources may be provided to the user via the user interface 415 in such a way that they may be optionally selected to be included with the content currently being created. Two example user interfaces are shown in FIGS. 37 and 38, in which image recommendations are provided to a user during the creation of content. In FIG. 37, a media recommendation pane is shown including images selected based on the text of the content currently being authored by the user via the user interface. In FIG. 38, a visual-feature analysis has been used to select a set of images that are potentially related to a first image ("filename.JPG) selected by the user. Similar techniques and user interface screens may be used to allow users to select, drag-and-drop, and embed images, links to articles and other text documents, audio/video files, etc. into the content currently being created by the user.

Figure 39:
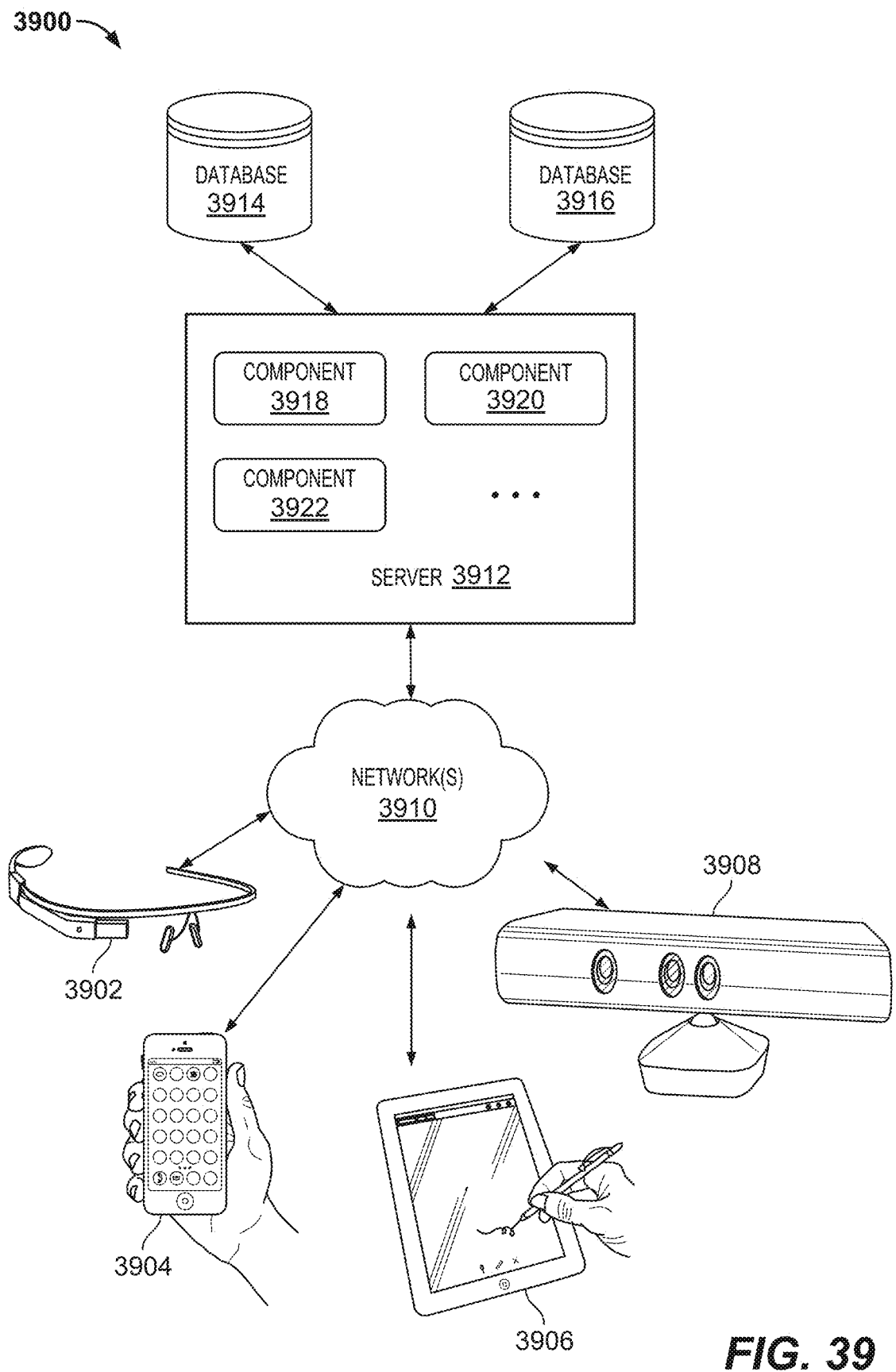
FIG. 39 depicts a simplified diagram of a distributed system for implementing certain embodiments in accordance with present disclosure.

FIG. 39 depicts a simplified diagram of a distributed system 3900 in which the various examples discussed above can be implemented. In the illustrated example, the distributed system 3900 includes one or more client computing devices 3902, 3904, 3906, 3908, coupled to a server 3912 via one or more communication networks 3910. The client computing devices 3902, 3904, 3906, 3908 may be configured to run one or more applications.

In various embodiments, server 3912 may be adapted to run one or more services or software applications that enable one or more operations associated with the system 400. For example, users may use the client computing devices 3902, 3904, 3906, 3908 (e.g., corresponding to client device 410) to access one or more cloud-based services provided by via the content recommendation engine 425.

In various examples, the server 3912 may also provide other services or software application, and can include non-virtual and virtual environments. In some examples, these services may be offered as web-based or cloud services or under a Software as a Service (SaaS) model to the users of the client computing devices 3902, 3904, 3906, 3908. Users operating the client computing devices 3902, 3904, 3906, 3908 may in turn use one or more client applications to interact with the server 3912 to use the services provided by these components.

In the configuration depicted in FIG. 39, the server 3912 may include one or more components 3918, 3920, 3922 that implement the functions performed by the server 3912. These components may include software components that may be executed by one or more processors, hardware components, or combinations thereof. It should be appreciated that various different system configurations are possible, which may be different from the example distributed system 3900.

The client computing devices 3902, 3904, 3906, 3908 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 39 depicts only four client computing devices, any number of client computing devices may be supported.

Network(s) 3910 in the distributed system 3900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 3910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 3912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 3912 can include one or more virtual machines running virtual operating systems, or other computing architectures involving virtualization, such as one or more flexible pools of logical storage devices that can be virtualized to maintain virtual storage devices for the server. In various examples, the server 3912 may be adapted to run one or more services or software applications that perform the operations as described above.

The server 3912 may run an operating system including any of those discussed above, as well as any commercially available server operating system. The server 3912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 3912 may include one or more applications to analyze and consolidate data feeds and/or event updates received from users of the client computing devices 3902, 3904, 3906, 3908. As an example, data feeds and/or event updates may include, but are not limited to, Twitter® feeds, Facebook® updates or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 3912 may also include one or more applications to display the data feeds and/or real-time events via one or more display devices of the client computing devices 3902, 3904, 3906, 3908.

The distributed system 3900 may also include one or more data repositories 3914, 3916. These data repositories may provide a mechanism for storing information various types of information, such as the information described by the various examples discussed above. The data repositories 3914, 3916 may reside in a variety of locations. For example, a data repository used by the server 3912 may be local to server 3912 or may be remote from server 3912 and in communication with server 3912 via a network-based or dedicated connection. The data repositories 3914, 3916 may be of different types. In some examples, a data repository used by the server 3912 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 3914, 3916 may also be used by applications to store application data. The data repositories used by applications may be of different types such as, for example, a key-value store repository, an object store repository, or a general storage repository supported by a file system.

Figure 40:
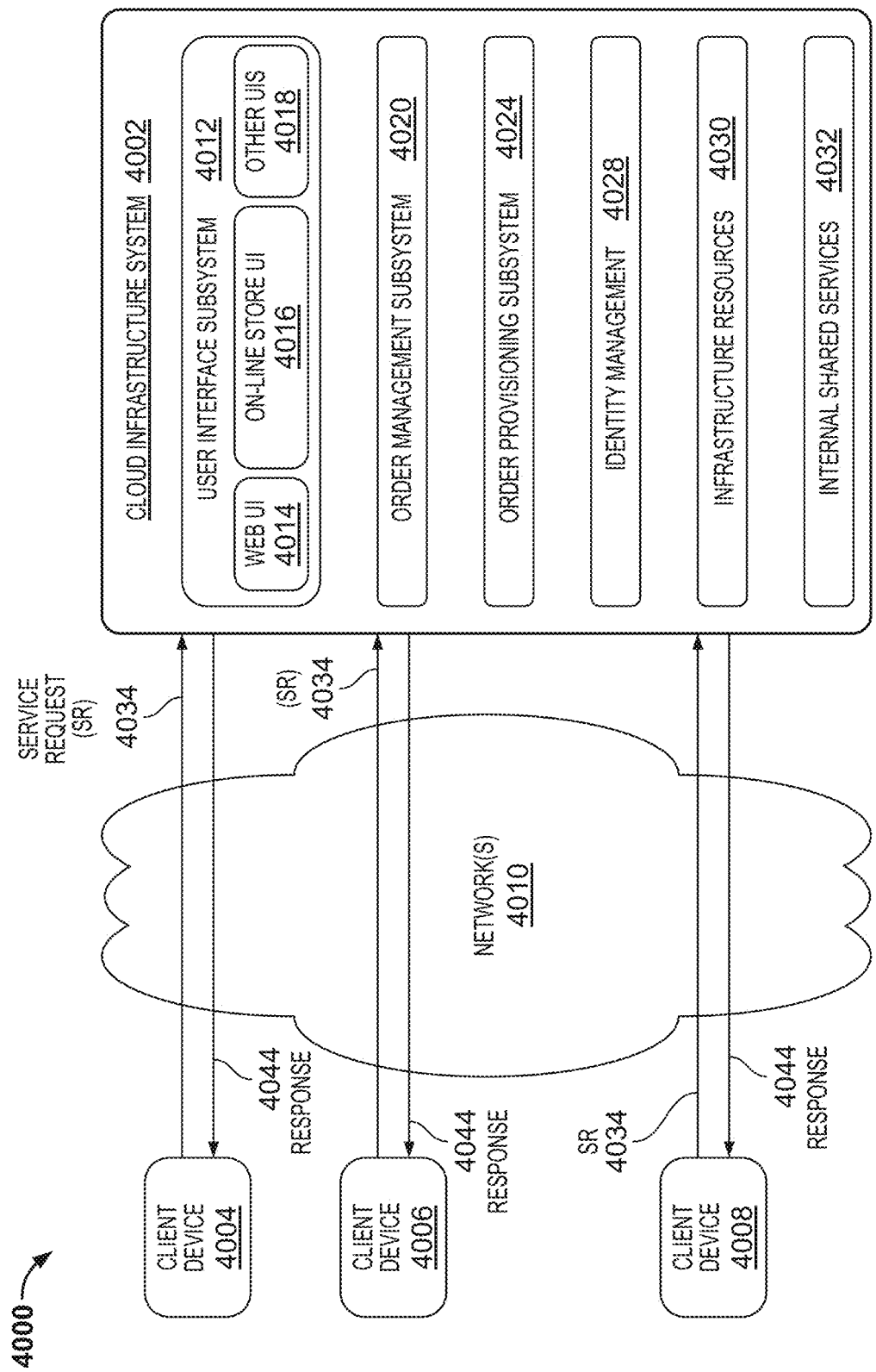
FIG. 40 is a simplified block diagram of one or more components of a system environment by which services provided by one or more components of a system may be offered as cloud services, in accordance with certain embodiments of the present disclosure.

In some examples, a cloud environment may provide one or more services such as those discussed above. FIG. 40 is a simplified block diagram of one or more components of a system environment 4000 in which these and other services can be offered as cloud services. In the example illustrated in in FIG. 40, a cloud infrastructure system 4002 may provide one or more cloud services that may be requested by users using one or more client computing devices 4004, 4006, and 4008. The cloud infrastructure system 4002 may include one or more computers and/or servers that may include those described above for server 3912 of FIG. 39. The computers in cloud infrastructure system 4002 of FIG. 40 may be organized as general purpose computers, specialized server computers, server farms, server clusters, or any other appropriate arrangement and/or combination.

Network(s) 4010 may facilitate communication and exchange of data between the client computing devices 4004, 4006, 4008 and the cloud infrastructure system 4002. The network(s) 4010 may include one or more networks. The networks may be of the same or different types. The network(s) 4010 may support one or more communication protocols, including wired and/or wireless protocols, for facilitating the communications.

The example depicted in FIG. 40 is only one example of a cloud infrastructure system and is not intended to be limiting. It should be appreciated that, in other examples, the cloud infrastructure system 4002 may have more or fewer components than those depicted in FIG. 40, may combine two or more components, or may have a different configuration or arrangement of components. For example, although FIG. 40 depicts three client computing devices, any number of client computing devices may be supported in other examples.

The term cloud service is generally used to refer to a service that is made available to users on demand and via a communication network such as the Internet by systems (e.g., the cloud infrastructure system 4002) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In various examples, the cloud infrastructure system 4002 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 4002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 4002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 4002 may be shared by multiple users and dynamically re-allocated per demand. Additionally, resources may be allocated to users in different time zones. For example, the cloud infrastructure system 4002 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 4002 may provide the cloud services via different deployment models. In a public cloud model, the cloud infrastructure system 4002 may be owned by a third party cloud services provider and the cloud services are offered to any general public customer, where the customer can be an individual or an enterprise. In certain other embodiments, under a private cloud model, the cloud infrastructure system 4002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 4002 and the services provided may be shared by several organizations in a related community. Various other models such as hybrids of the above mentioned models may also be used.

The client computing devices 4004, 4006, 4008 may be devices similar to those described above for the client computing devices 3902, 3904, 3906, 3908 of FIG. 39. The client computing devices 4004, 4006, 4008 of FIG. 40 may be configured to operate a client application such as a web browser, a proprietary client application (e.g., Oracle Forms), or some other application, which may be used by a user of the client computing device to interact with the cloud infrastructure system 4002 to use services provided by the cloud infrastructure system 4002.

In various examples, the cloud infrastructure system 4002 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 4002 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 40, cloud infrastructure system 4002 may include infrastructure resources 4030 that are used for facilitating the provision of various cloud services offered by cloud infrastructure system 4002. Infrastructure resources 4030 may include, for example, processing resources, storage or memory resources, networking resources, and the like.

In some examples, to facilitate efficient provisioning of these resources for supporting the various cloud services provided by cloud infrastructure system 4002 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 4002 may itself internally use the services 4032 that are shared by different components of cloud infrastructure system 4002 and which facilitate the provisioning of services by cloud infrastructure system 4002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 4002 may include multiple subsystems. These subsystems may be implemented in software, or hardware, or combinations thereof. As depicted in FIG. 40, the subsystems may include a user interface subsystem w that enables users or customers of cloud infrastructure system 4002 to interact with cloud infrastructure system 4002. The user interface subsystem 4012 may include various different interfaces such as a web interface 4014, an online store interface 4016 where cloud services provided by cloud infrastructure system 4002 are advertised and are purchasable by a consumer, and other interfaces 4018. For example, a customer may, using a client device, request (service request 4034) one or more services provided by cloud infrastructure system 4002 using one or more of interfaces 4014, 4016, 4018. For example, a customer may access the online store, browse cloud services offered by cloud infrastructure system 4002, and place a subscription order for one or more services offered by cloud infrastructure system 4002 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 40, the cloud infrastructure system 4002 may include an order management subsystem (OMS) 4020 that is configured to process the new order. As part of this processing, OMS 4020 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 4020 may then invoke the order provisioning subsystem (OPS) 4024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 4024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

The cloud infrastructure system 4002 may send a response or notification 4044 to the requesting customer to indicate when the requested service is now ready for use. In some instances, information (e.g., a link) may be sent to the customer that enables the customer to start using and availing the benefits of the requested services.

The cloud infrastructure system 4002 may provide services to multiple customers. For each customer, the cloud infrastructure system 4002 is responsible for managing information related to one or more subscription orders received from the customer, maintaining customer data related to the orders, and providing the requested services to the customer. The cloud infrastructure system 4002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 4002 may provide services to multiple customers in parallel. The cloud infrastructure system 4002 may store information for these customers, including possibly proprietary information. In some examples, the cloud infrastructure system 4002 includes an identity management subsystem (IMS) 4028 that is configured to manage customers information and provide the separation of the managed information such that information related to one customer is not accessible by another customer. IMS 4028 may be configured to provide various security-related services such as identity services, such as information access management, authentication and authorization services, services for managing customer identities and roles and related capabilities, and the like.

Figure 41:
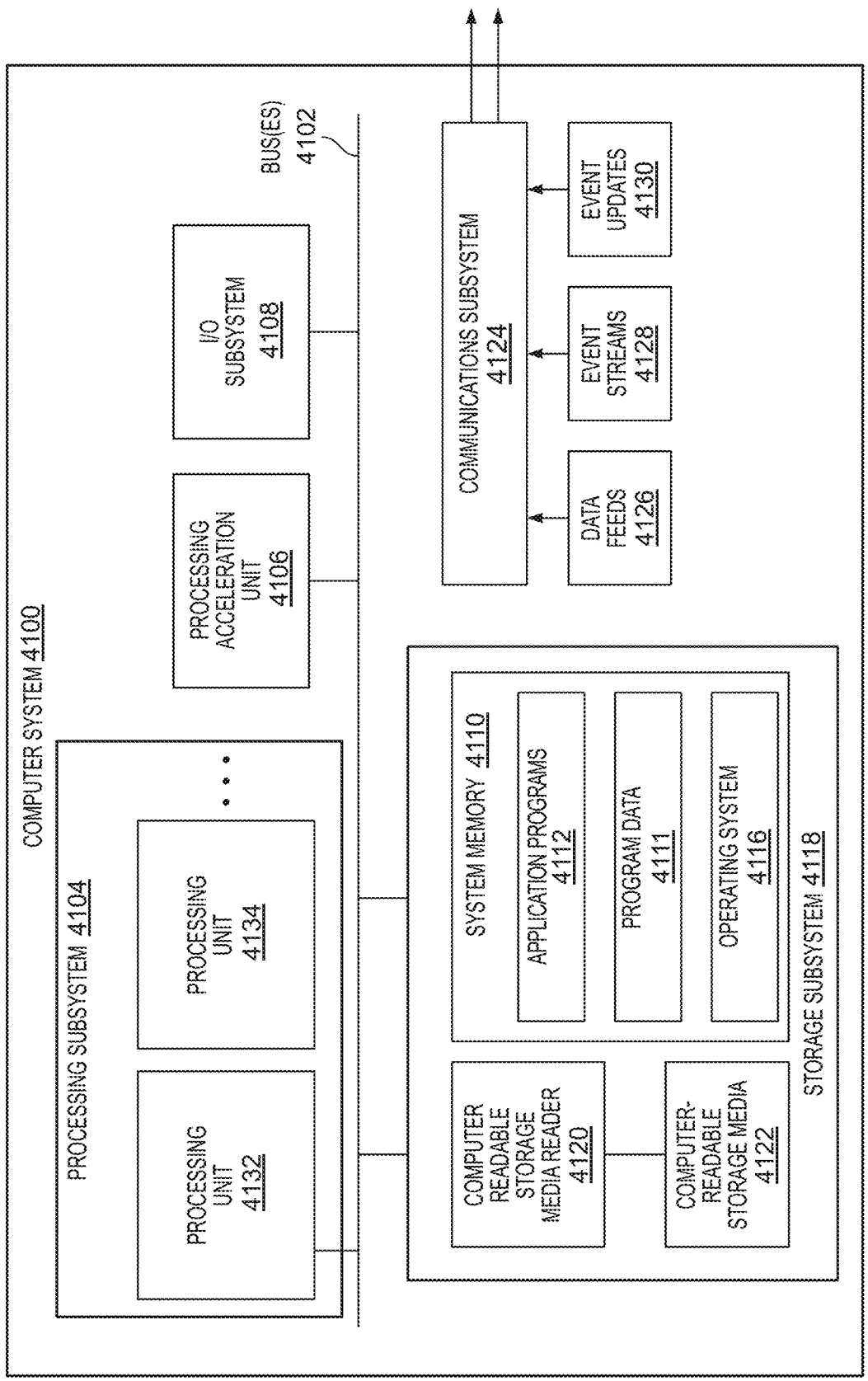
FIG. 41 illustrates an exemplary computer system, in which various embodiments may be implemented.

FIG. 41 illustrates an example of a computer system 4100 that may be used to implement the various examples discussed above. In some examples, the computer system 4100 may be used to implement any of the various servers and computer systems described above. As shown in FIG. 41, the computer system 4100 includes various subsystems including a processing subsystem 4104 that communicates with a number of other subsystems via a bus subsystem 4102. These other subsystems may include a processing acceleration unit 4106, an I/O subsystem 4108, a storage subsystem 4118 and a communications subsystem 4124. The storage subsystem 4118 may include non-transitory computer-readable storage media 4122 and a system memory 4110.

The bus subsystem 4102 provides a mechanism for letting the various components and subsystems of the computer system 4100 communicate with each other as intended. Although the bus subsystem 4102 is shown schematically as a single bus, alternate examples of the bus subsystem may utilize multiple buses. The bus subsystem 4102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 4104 controls the operation of the computer system 4100 and may comprise one or more processors, application specific integrated circuits (ASICs), or field programmable gate arrays (FPGAs). The processors may include be single core or multi-core processors. The processing resources of computer system 4100 can be organized into one or more processing units 4132, 4134. A processing unit may include one or more processors, including single core or multi-core processors, one or more cores from the same or different processors, a combination of cores and processors, or other combinations of cores and processors. In some examples, the processing subsystem 4104 can include one or more special purpose co-processors such as graphics processors, digital signal processors (DSPs), or the like. In some examples, some or all of the processing units of the processing subsystem 4104 can be implemented using customized circuits, such as application specific integrated circuits (ASICs), or field programmable gate arrays (FPGAs).

In some examples, the processing units in the processing subsystem 4104 can execute instructions stored in the system memory 4110 or on the computer-readable storage media 4122. In various examples, the processing units can execute a variety of programs or code instructions and can maintain multiple concurrently executing programs or processes. At any given time, some or all of the program code to be executed can be resident in the system memory 4110 and/or on the computer-readable storage media 4122 including potentially on one or more storage devices. Through suitable programming, the processing subsystem 4104 can provide various functionalities described above. In instances where computer system 4100 is executing one or more virtual machines, one or more processing units may be allocated to each virtual machine.

In some examples, a processing acceleration unit 4106 may be provided for performing customized processing or for off-loading some of the processing performed by the processing subsystem 4104 so as to accelerate the overall processing performed by the computer system 4100.

The I/O subsystem 4108 may include devices and mechanisms for inputting information to the computer system 4100 and/or for outputting information from or via the computer system 4100. In general, use of the term "input device" is intended to include all possible types of devices and mechanisms for inputting information to the computer system 4100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 4100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 4118 provides a repository or data store for storing information that is used by the computer system 4100. The storage subsystem 4118 provides a tangible non-transitory computer-readable storage medium for storing the basic programming and data constructs that provide the functionality of some examples. Software (e.g., programs, code modules, instructions) that when executed by the processing subsystem 4104 provide the functionality described above may be stored in the storage subsystem 4118. The software may be executed by one or more processing units of the processing subsystem 4104. The storage subsystem 4118 may also provide a repository for storing data used in accordance with the present disclosure.

The storage subsystem 4118 may include one or more non-transitory memory devices, including volatile and non-volatile memory devices. As shown in FIG. 41, the storage subsystem 4118 includes a system memory 4110 and a computer-readable storage media 4122. The system memory 4110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 4100, such as during start-up, may typically be stored in the ROM. The RAM typically contains data and/or program modules that are presently being operated and executed by the processing subsystem 4104. In some implementations, the system memory 4110 may include multiple different types of memory, such as static random access memory (SRAM) or dynamic random access memory (DRAM), and the like.

By way of example, and not limitation, as depicted in FIG. 41, the system memory 4110 may load application programs 4112 that are being executed, which may include client applications, Web browsers, mid-tier applications, relational database management systems (RDBMS), etc., program data 4111, and an operating system 4116. By way of example, the operating system 4116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 4122 may store programming and data constructs that provide the functionality of some examples. The computer-readable storage media 4122 may provide storage of computer-readable instructions, data structures, program modules, and other data for the computer system 4100. Software (programs, code modules, instructions) that when executed by the processing subsystem 4104 provides the functionality described above that may be stored in the storage subsystem 4118. By way of example, the computer-readable storage media 4122 may include non-volatile memory such as a hard disk drive, a magnetic disk drive, an optical disk drive such as a CD ROM, DVD, a Blu-Ray® disk, or other optical media. The computer-readable storage media 4122 may include, but is not limited to, Zip® drives, flash memory cards, universal serial bus (USB) flash drives, secure digital (SD) cards, DVD disks, digital video tape, and the like. Computer-readable storage media 4122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 4122 may provide storage of computer-readable instructions, data structures, program modules, and other data for the computer system 4100.

In some examples, the storage subsystem 4118 may also include a computer-readable storage media reader 4120 that can further be connected to the computer-readable storage media 4122. The reader 4120 may receive and be configured to read data from a memory device such as a disk, a flash driver, etc.

In some examples, the computer system 4100 may support virtualization technologies, including but not limited to virtualization of processing and memory resources. For example, the computer system 4100 may provide support for executing one or more virtual machines. The computer system 4100 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 4100. Accordingly, multiple operating systems may potentially be run concurrently by the computer system 4100.

The communications subsystem 4124 provides an interface to other computer systems and networks. The communications subsystem 4124 serves as an interface for receiving data from and transmitting data to other systems from the computer system 4100. For example, the communications subsystem 4124 may enable the computer system 4100 to establish a communication channel to one or more client computing devices via the Internet for receiving and sending information from and to the client computing devices.

The communication subsystem 4124 may support both wired and/or wireless communication protocols. For example, in some examples, the communications subsystem 4124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 4124 can provide wired network connectivity (e.g., Ethernet) in addition to or instead of a wireless interface.

The communication subsystem 4124 can receive and transmit data in various forms. For example, in some examples, the communications subsystem 4124 may receive input communication in the form of structured and/or unstructured data feeds 4126, event streams 4128, event updates 4130, and the like. For example, the communications subsystem 4124 may be configured to receive (or send) data feeds 4126 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 4124 may be configured to receive data in the form of continuous data streams, which may include event streams 4128 of real-time events and/or event updates 4130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

The communications subsystem 4124 may also be configured to output the structured and/or unstructured data feeds 4126, event streams 4128, event updates 4130, and the like to one or more databases that may be in communication with one or more streaming data source computers coupled to the computer system 4100.

The computer system 4100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 4100 depicted in FIG. 41 is intended only as a specific example. Many other configurations having more or fewer components than the system depicted in FIG. 41 are possible. Based on the disclosure and teachings provided herein, a person of ordinary skill in the art will appreciate other ways and/or methods to implement the various examples.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the disclosure. Thus, although specific implementations have been described, these are not intended to be limiting; various modifications and equivalents are within the scope of the disclosure.

What is claimed is:

1. A method of selecting content based on vector comparisons within a vector space, comprising:
   receiving, by a computing device, and via a user interface, text input data;
   determining, by the computing device, at least one of a keyword, a topic, or a feature of the text input data, based on an analysis of the text input data;
   executing, by the computing device, a transformation algorithm, wherein the at least one determined keyword, topic, or feature are provided as input to the transformation algorithm, and wherein the transformation algorithm outputs a feature vector corresponding to the text input data;
   comparing, by the computing device, the feature vector corresponding to the text input data, to each of a plurality of additional feature vectors stored within a vector space data structure;
   selecting, by the computing device, one or more of the additional feature vectors, based on the comparisons of the feature vector to the plurality of additional feature vectors;
   retrieving, by the computing device, and from a content repository, one or more media content files corresponding to the one or more selected additional feature vectors; and
   rendering, by the computing device, selectable representations of the one or more media content files via the user interface;
   wherein the retrieved media content files comprise a plurality of image files, and wherein the method further comprises, prior to receiving the text input data via the user interface:
   receiving and storing each of the plurality of image files in the content repository;
   using an image classification software tool to identify one or more image features within each of the plurality of image files;
   generating one or more image tags for each of the plurality of image files, based on the image features identified within the image files; and
   generating the plurality of additional feature vectors stored within the vector space data structure, corresponding to the plurality of image files in the content repository, based on the image features identified within the image files.

2. The method of claim 1, further comprising:
receiving, via the user interface, a selection of a first user input component corresponding to a first media content file;
retrieving the first media content file from the content repository; and
embedding a representation of first media content file within a user interface region including the text input data.

3. The method of claim 1, wherein comparing the feature vector corresponding to the text input data to the plurality of additional feature vectors stored within the vector space data structure comprises:
retrieving one or more tags associated with the feature vector;
determining a subset of the plurality of additional feature vectors having one or more tags matching the one or more tags associated with the feature vector; and
comparing the feature vector corresponding to the text input data, to the subset of the plurality of additional feature vectors stored within the vector space data structure.

4. The method of claim 1, wherein comparing the feature vector corresponding to the text input data to the plurality of additional feature vectors stored within the vector space data structure comprises:
for each particular feature vector of the plurality of additional feature vectors stored within the vector space data structure, calculating a Euclidean distance between the particular feature vector and the feature vector corresponding to the text input data.

5. The method of claim 1, wherein the vector space data structure comprises a plurality of different vector spaces, each different vector space storing vectors corresponding to a different type of media content, and wherein the method further comprises:
receiving a selection via the user interface identifying a type of media content to be embedded with the text input data; and
accessing a particular vector space from the plurality of different vector spaces, corresponding to the identified type of media content, wherein the one or more additional feature vectors are selected from the particular vector space.

6. The method of claim 5, wherein the plurality of different vector spaces includes at least:
a first vector space storing a plurality of feature vectors corresponding to image files; and
a second vector space storing a plurality of feature vectors corresponding to web pages.

7. The method of claim 1, wherein the analysis of the text input data comprises (1) a keyword extraction process, (2) a stemming process, and (3) a synonym retrieval process.

8. A computer system, comprising:
a processing unit comprising one or more processors; and
a non-transitory computer-readable medium containing instructions that, when executed by the one or more processors, cause the one or more processors to perform operations including:
receiving text input data at the computer system via a user interface;
determining at least one of a keyword, a topic, or a feature of the text input data, based on an analysis of the text input data;
executing a transformation algorithm, wherein the at least one determined keyword, topic, or feature are provided as input to the transformation algorithm, and wherein the transformation algorithm outputs a feature vector corresponding to the text input data;
comparing the feature vector corresponding to the text input data, to each of a plurality of additional feature vectors stored within a vector space data structure;
selecting one or more of the additional feature vectors, based on the comparisons of the feature vector to the plurality of additional feature vectors;
retrieving, from a content repository, one or more media content files corresponding to the one or more selected additional feature vectors; and
rendering selectable representations of the one or more media content files via the user interface;
wherein the retrieved media content files comprise a plurality of image files, and wherein the instructions cause the one or more processors to perform further operations including, prior to receiving the text input data via the user interface;
receiving and storing each of the plurality of image files in the content repository;
using an image classification software tool to identify one or more image features within each of the plurality of image files;
generating one or more image tags for each of the plurality of image files, based on the image features identified within the image files; and
generating the plurality of additional feature vectors stored within the vector space data structure, corresponding to the plurality of image files in the content repository, based on the image features identified within the image files.

9. The computer system of claim 8, wherein the instructions cause the one or more processors to perform further operations including:
receiving, via the user interface, a selection of a first user input component corresponding to a first media content file;
retrieving the first media content file from the content repository; and
embedding a representation of first media content file within a user interface region including the text input data.

10. The computer system of claim 8, wherein comparing the feature vector corresponding to the text input data to the plurality of additional feature vectors stored within the vector space data structure comprises:
retrieving one or more tags associated with the feature vector;
determining a subset of the plurality of additional feature vectors having one or more tags matching the one or more tags associated with the feature vector; and
comparing the feature vector corresponding to the text input data, to the subset of the plurality of additional feature vectors stored within the vector space data structure.

11. The computer system of claim 8, wherein comparing the feature vector corresponding to the text input data to the plurality of additional feature vectors stored within the vector space data structure comprises:
for each particular feature vector of the plurality of additional feature vectors stored within the vector space data structure, calculating a Euclidean distance between the particular feature vector and the feature vector corresponding to the text input data.

12. The computer system of claim 8, wherein the vector space data structure comprises a plurality of different vector spaces, each different vector space storing vectors corresponding to a different type of media content, and wherein the instructions cause the one or more processors to perform further operations including:

receiving a selection via the user interface identifying a type of media content to be embedded with the text input data; and accessing a particular vector space from the plurality of different vector spaces, corresponding to the identified type of media content, wherein the one or more additional feature vectors are selected from the particular vector space.

13. The computer system of claim 12, wherein the plurality of different vector spaces includes at least:

a first vector space storing a plurality of feature vectors corresponding to image files; and a second vector space storing a plurality of feature vectors corresponding to web pages.

14. The computer system of claim 8, wherein the analysis of the text input data comprises (1) a keyword extraction process, (2) a stemming process, and (3) a synonym retrieval process.

15. A non-transitory computer-readable storage medium storing computer-executable instructions that, when executed by one or more processors of a computing device, cause the one or more processors to:

receive text input data at the computing device via a user interface;

determine at least one of a keyword, a topic, or a feature of the text input data, based on an analysis of the text input data;

execute a transformation algorithm, wherein the at least one determined keyword, topic, or feature are provided as input to the transformation algorithm, and wherein the transformation algorithm outputs a feature vector corresponding to the text input data;

compare the feature vector corresponding to the text input data, to each of a plurality of additional feature vectors stored within a vector space data structure;

select one or more of the additional feature vectors, based on the comparisons of the feature vector to the plurality of additional feature vectors;

retrieve, from a content repository, one or more media content files corresponding to the one or more selected additional feature vectors; and render selectable representations of the one or more media content files via the user interface;

wherein the retrieved media content files comprise a plurality of image files, and wherein the method further comprises, prior to receiving the text input data via the user interface;

receiving and storing each of the plurality of image files in the content repository;

using an image classification software tool to identify one or more image features within each of the plurality of image files;

generating one or more image tags for each of the plurality of image files, based on the image features identified within the image files; and generating the plurality of additional feature vectors stored within the vector space data structure, corresponding to the plurality of image files in the content repository, based on the image features identified within the image files.

16. The computer-readable storage medium of claim 15, wherein the instructions further cause the one or more processors to:

receive, via the user interface, a selection of a first user input component corresponding to a first media content file;

retrieve the first media content file from the content repository; and embed a representation of first media content file within a user interface region including the text input data.

17. The computer-readable storage medium of claim 15, wherein comparing the feature vector corresponding to the text input data to the plurality of additional feature vectors stored within the vector space data structure comprises:

retrieving one or more tags associated with the feature vector;

determining a subset of the plurality of additional feature vectors having one or more tags matching the one or more tags associated with the feature vector; and comparing the feature vector corresponding to the text input data, to the subset of the plurality of additional feature vectors stored within the vector space data structure.

18. The computer-readable storage medium of claim 15, wherein comparing the feature vector corresponding to the text input data to the plurality of additional feature vectors stored within the vector space data structure comprises:

for each particular feature vector of the plurality of additional feature vectors stored within the vector space data structure, calculating a Euclidean distance between the particular feature vector and the feature vector corresponding to the text input data.

* * * * *